US005603050A

United States Patent [19]
Wolford et al.

[11] Patent Number: 5,603,050
[45] Date of Patent: Feb. 11, 1997

[54] DIRECT MEMORY ACCESS CONTROLLER HAVING PROGRAMMABLE TIMING

[75] Inventors: Jeff W. Wolford, Spring; Robert A. Lester, Houston, both of Tex.

[73] Assignee: Compaq Computer Corporation, Houston, Tex.

[21] Appl. No.: 398,358

[22] Filed: Mar. 3, 1995

[51] Int. Cl.$^6$ .............................. G06F 13/00; G06F 13/28
[52] U.S. Cl. ........................... 395/821; 395/842; 395/427
[58] Field of Search ..................................... 395/842, 843, 395/846, 821, 800, 200.07, 427, 550

[56] References Cited

U.S. PATENT DOCUMENTS

| | | | |
|---|---|---|---|
| 4,600,988 | 7/1986 | Tendulkar | 395/550 |
| 5,041,962 | 8/1991 | Lunsford | 395/287 |
| 5,278,968 | 1/1994 | Koumoto | 395/800 |
| 5,287,471 | 2/1994 | Katayose et al. | 395/842 |
| 5,333,294 | 7/1994 | Schnell | 395/846 |
| 5,452,432 | 9/1995 | Macachor | 395/842 |
| 5,471,640 | 11/1995 | McBride | 395/842 |
| 5,481,756 | 1/1996 | Kanno | 395/842 |

FOREIGN PATENT DOCUMENTS

| | | |
|---|---|---|
| 539077A1 | 4/1993 | European Pat. Off. . |
| 63-085955 | 4/1988 | Japan . |
| 2211325 | 6/1989 | United Kingdom . |

OTHER PUBLICATIONS

82420/82430 PCISET, ISA and EISA Bridges, Intel Corp., pp. 17, 34, 142–148, 345, 453–462 (1993).
Peripheral Components, Intel Corp., pp. 3–14 to 3–50 (1993).
Intel 82258 Advanced Direct Memory Access Controller (ADMA), Intel Corp., pp. 1–59 (Nov. 1987).

*Primary Examiner*—Gopal C. Ray
*Attorney, Agent, or Firm*—Pravel, Hewitt, Kimball & Krieger

[57] ABSTRACT

An improved DMA controller having programmable data transfer timings. Not only is the total cycle time programmable, but the active and inactive period of the cycle are also programmable. An active timing register and an inactive timing register are used in conjunction with a countdown timer to determine the active and inactive periods of the data transfer cycle. The active time period is loaded into the timer during the active phase, with the end of the active phase being indicated by the timer timing out. Next, the inactive time period is loaded into the timer, which similarly times out to indicate the end of the inactive phase of the data transfer cycle.

17 Claims, 27 Drawing Sheets

DIRECT MEMORY ACCESS CONTROLLER HAVING PROGRAMMABLE TIMING

BACKGROUND OF THE INVENTION

1. Field of the Invention

The invention relates to direct memory access (DMA) controllers, and more particularly, to an improved DMA controller having programmable timing.

2. Description of the Related Art

To improve overall computer system performance, computer systems today include a direct memory access or DMA controller to enable I/O devices to access main memory without the intervention of the CPU. In computer systems according to the Industry Standard Architecture (ISA) or Extended Industry Standard Architecture (EISA), two 8237 DMA controllers from Intel Corporation are utilized, or in the alternative, an 8237-compatible DMA controller can be used.

The DMA controller in the ISA computer system supports either 8 or 16-bit I/O devices, while the DMA controller in the EISA system further supports 32-bit I/O devices. The DMA controller in an ISA or EISA system provides seven DMA channels, each channel capable of being programmed for several different transfer modes and timing modes. A DMA channel can operate in one of four transfer modes, which include the single transfer, block transfer, demand transfer, or cascade modes. In single transfer mode, a DMA channel performs only one data transfer for each arbitration cycle. In block transfer mode, a predetermined block of data is transferred in each arbitration cycle. In demand transfer mode, the DMA controller has the capability of continuing the data transfer until the I/O device has exhausted its data capacity. Finally, each channel of the DMA controller can also be programmed to cascade mode.

One application of cascade mode is where two 8237 devices are cascaded together. As each 8237 DMA controller includes only four DMA channels, cascading is required to obtain the seven channels. Thus, one of the channels of the first level 8237 DMA controller is programmed in cascade mode and connected to a second level 8237 DMA controller. This allows the DMA requests of the second level device to propagate through the priority network circuitry of the first level device. Thus, the cascade channel of the first level DMA controller is used only for prioritizing the second level device, and it does not output any address or control signals of its own as that would conflict with the output signals of the active channel in the second level device.

Another application of programming a channel to cascade mode is to allow an I/O device on the expansion bus to use a DMA channel for bus requests. Thus, instead of requiring the use of a separate arbiter to arbitrate between the I/O devices, the prioritization scheme between the DMA channels can be used to process requests from the I/O devices. When thus programmed, the DMA channel does not perform data transfers to a memory slave. Instead, the output signals of the DMA channel are disabled to allow the I/O device to gain control of the bus. For more detailed information on the various transfer modes of the 8237 DMA controller, refer to Peripheral Components, Intel Corp., pgs. 5-4 to 5-21 (1994), which is hereby incorporated by reference.

The 8237 type DMA controllers also use one of four timing modes: ISA compatible cycles, Type A cycles, Type B cycles and Type C or burst DMA cycles. It is noted that all the timing modes can be used when the DMA controller is programmed in the single transfer mode. However, if the 8237 DMA controller is programmed in either the block transfer mode or the demand transfer mode, then the ISA compatible timing mode cannot be used as there exists the possibility that other devices, including the refresh controller, can be locked out.

In ISA compatible timing mode, one DMA transfer is performed in eight BCLK or ISA bus clocks. In the Type A timing mode, a DMA transfer can be completed in six BCLK periods. Type B timing provides better performance than Type A timing, as it supports DMA transfers that can be executed every four BCLK periods. Both Type A and Type B timings require the use of fast memory devices. When programmed in burst DMA or Type C timing mode, the DMA cycles have characteristics that are similar to burst cycles. Thus, transfers can be performed between the memory slave device and the DMA device in one BCLK period each.

As can be seen from the discussion above, the 8237-type DMA controller provides for a number of different timing modes to compensate for different timing requirements of different components in a computer system. Thus, if a computer system is implemented with a fast memory device, then the faster DMA timing modes can be utilized. However, there are also a multitude of I/O devices each having different functional and timing requirements. It has been determined that the four timing modes provided by the 8237 DMA controller do not provide sufficient flexibility to optimize DMA performance for the timing requirements of the different I/O devices. Therefore, it is desired that a more flexible and improved DMA controller be provided.

SUMMARY OF THE PRESENT INVENTION

An improved direct memory access (DMA) controller according to the present invention allows for complete programmability of the timing of a DMA transfer. Not only is the improved DMA controller capable of varying the cycle time required for a DMA transfer, the active and inactive period of each cycle is also programmable. Two timing registers are utilized, one to define the active period and the other to define the inactive period. Active and inactive timing registers are provided for each of the plurality of channels provided by the improved DMA controller. During the active period, the value in the active timing register is loaded into a count-down timer, which provides a timeout signal when the predefined active period elapses. When the active period elapses, the improved DMA controller transitions to the inactive portion of the DMA cycle, at which time the value in the inactive timing register is loaded into the timer. When the timer times out, the completion of the DMA cycle is indicated. Both the active and inactive timing registers can be loaded with a plurality of time values, which provides for improved timing flexibility over prior DMA controllers.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
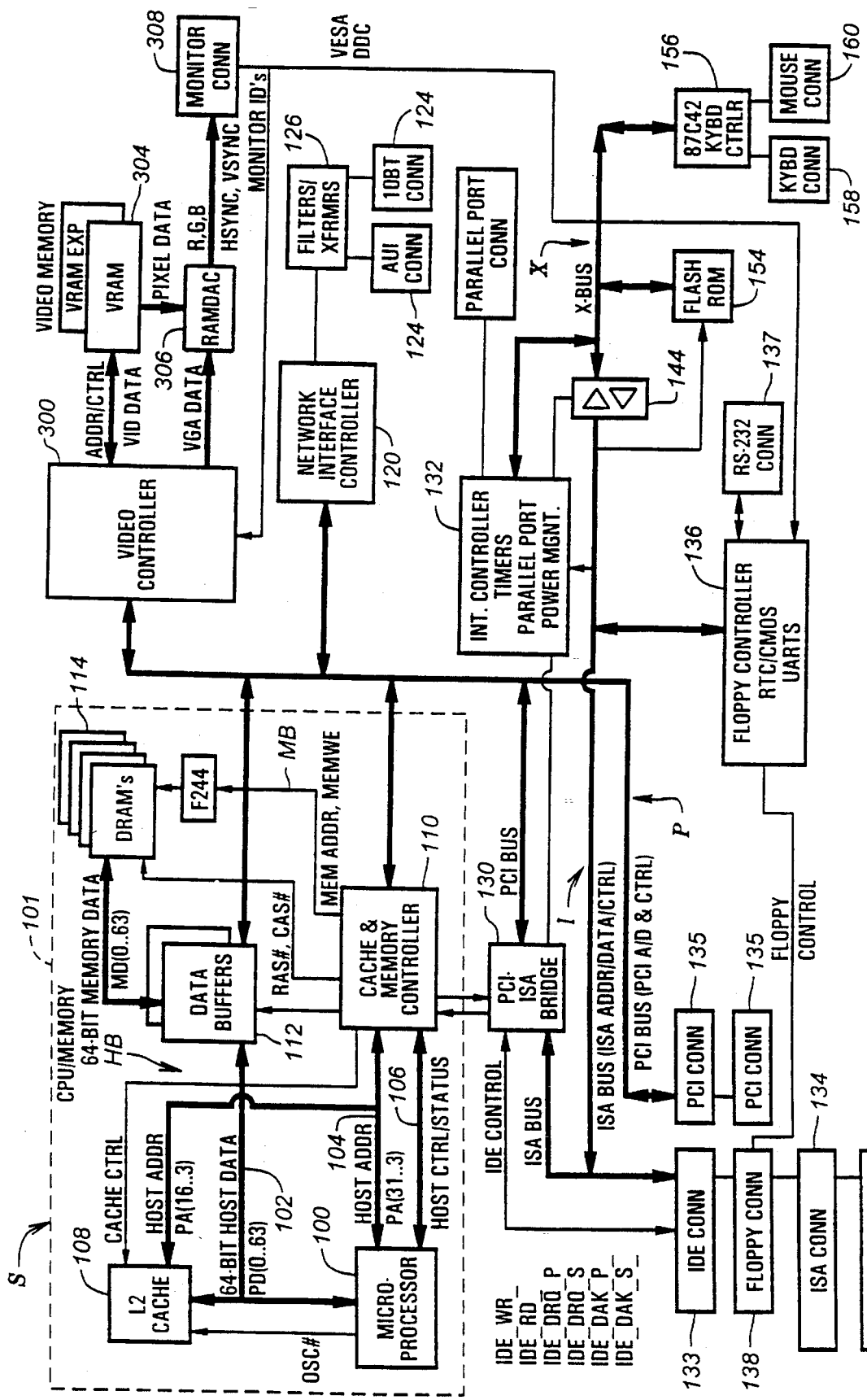
FIG. 1 is a block diagram of an exemplary computer system including arbitration logic according to the present invention.

Referring now to FIG. 1, an exemplary computer system S incorporating the preferred embodiment of the present invention is shown. In the preferred embodiment, the system board contains circuitry and slots for receiving interchangeable circuit boards. In the preferred embodiment, there are two primary buses located in the system S. The first bus is the PCI or Peripheral Component Interconnect bus P which includes an address/data portion and control signal portion. The second primary bus in the system S is the ISA bus I. The ISA bus I includes an address portion, a data portion and a control signal portion. The PCI and ISA buses P and I form the backbones of the system S.

A CPU/memory subsystem 101 is connected to the PCI bus P. The processor or CPU 100 is preferably the Pentium processor from Intel, preferably operating at an external frequency of 66 MHz, but could be an 80486 from Intel or processors compatible with the 80486 or Pentium or other processors if desired. The processor 100 provides data, address and control portions 102, 104, 106 to form a host bus HB. A level 2 (L2) or external cache memory system 108 is connected to the host bus HB to provide additional caching capabilities to improve performance of the computer systems. The L2 cache 108 may be permanently installed or may be removable if desired. A cache and memory controller and PCI bridge chip 110, such as the 82424 or 82434X chip from Intel Corporation or the chip described in patent applications Ser. Nos. 08/324,016, entitled "SINGLE BANK, MULTIPLE WAY CACHE MEMORY" and 08/324,246, entitled "MEMORY CONTROLLER WITH WRITE POSTING QUEUES FOR PROCESSOR AND I/O BUS OPERATIONS AND ORDERING LOGIC FOR CONTROLLING THE QUEUES", filed Oct. 14, 1994 and hereby incorporated by reference, is connected to the control and address portions of the PCI bus P. The bridge chip 110 is connected to the L2 cache 108 as it incorporates the cache controller and therefore controls the operation of the cache memory devices in the L2 cache 108. The bridge chip 110 is also connected to control a series of data buffers 112. The data buffers 112 are preferably similar to the 82433LX from Intel, or those described in patent applications Ser. Nos. 08/324,246 as incorporated above and 08/323,263 entitled "DATA ERROR DETECTION AND CORRECTION SYSTEM," filed Oct. 14, 1994 and now allowed and hereby incorporated by reference, and are utilized to handle memory data to a main memory array 114. The data buffers 112 are connected to the processor data portion 102 and receive control signals from the bridge chip 110. The data buffers 112 are also connected to the PCI bus P for data transfer over that bus. The data buffers 112 provide a memory data bus 118 to the memory array 114, while a memory address and memory control signal bus MB is provided from the bridge chip 110.

A video controller 300 is connected to the PCI bus P. Video memory 304 is used to store the graphics data and is connected to the video graphics controller 300 and a digital/analog converter (RAMDAC) 306. The video graphics controller 300 controls the operation of the video memory 304, allowing data to be written and retrieved as required. A video connector 308 is connected to the RAMDAC 306. A monitor (not shown) is connected to the video connector 308.

A network interface (NIC) controller 120 is connected to the PCI bus P. Preferably the controller 120 is a single integrated circuit and includes the capabilities necessary to act as a PCI bus master and slave and the circuitry to act as an Ethernet interface. Alternate Ethernet connectors 124 are provided on the system S and are connected to filter and transformer circuitry 126, which in turn is connected to the controller 120. This forms a network or Ethernet connection for connecting the system boards and computer to a local area network (LAN).

A PCI-ISA bridge 130 is provided to convert signals between the PCI bus P and the ISA bus I. The PCI-ISA bridge 130 includes the necessary address and data buffers and latches, arbitration and bus master control logic for the PCI bus, ISA arbitration circuitry, an ISA bus controller as conventionally used in ISA systems, an enhanced DMA controller preferably having two channels for interfacing with primary and secondary IDE devices through connectors 133, and an 8237-compatible DMA controller. Preferably the PCI-ISA bridge 130 is a single integrated circuit, but other combinations are possible. To reduce the number of pins required for the PCI-ISA bridge 130, the EDMA controller 204 (FIG. 2) shares the ISA SD or data bus and the upper portion of the SA or address bus to perform data transfers between the IDE devices and the main memory 114.

A series of ISA slots 134 (FIG. 1) are connected to the ISA bus I to receive ISA adapter cards. A series of IDE slots 133 are connected to the ISA bus I and the PCI-ISA bridge chip 130 to receive various IDE devices, such as hard disk drives, tape drives and CD-ROM drives. A series of PCI slots 135 are connected to the PCI bus P to receive PCI adapter cards.

A combination I/O chip 136 is connected to the ISA bus I. The combination I/O chip 136 preferably includes a floppy disk controller, real time clock (RTC), CMOS memory, two UARTs, and various address decode logic. A floppy disk connector 138 for receiving a cable to a floppy disk drive is connected to the combination I/O chip 136 and the ISA bus I. Serial port connectors 137 are also connected to the combination I/O chip 136. A data buffer 144 is connected to the address, data and control portions of the ISA bus I to provide an additional X bus for various additional components of the computer system. A flash ROM 154 receives its control, data and address signals from the X bus for data transfer.

Preferably the flash ROM 154 contains the BIOS information for the computer system and can be reprogrammed to allow for revisions of the BIOS. An 8042 or keyboard controller 156 is connected to the X bus X. The keyboard controller 156 is of conventional design and is connected in turn to a keyboard connector 158 and a mouse or pointing device connector 160.

A miscellaneous system logic chip 132 is connected to the X bus X. The miscellaneous system logic chip 132 contains counters and timers as conventionally present in personal computer systems, an interrupt controller for both the PCI and ISA buses P and I, enhanced parallel port circuitry and power management logic, as well as other miscellaneous circuitry.

This is an exemplary computer system S and other variations could readily be developed by one skilled in the art.

Figure 2:
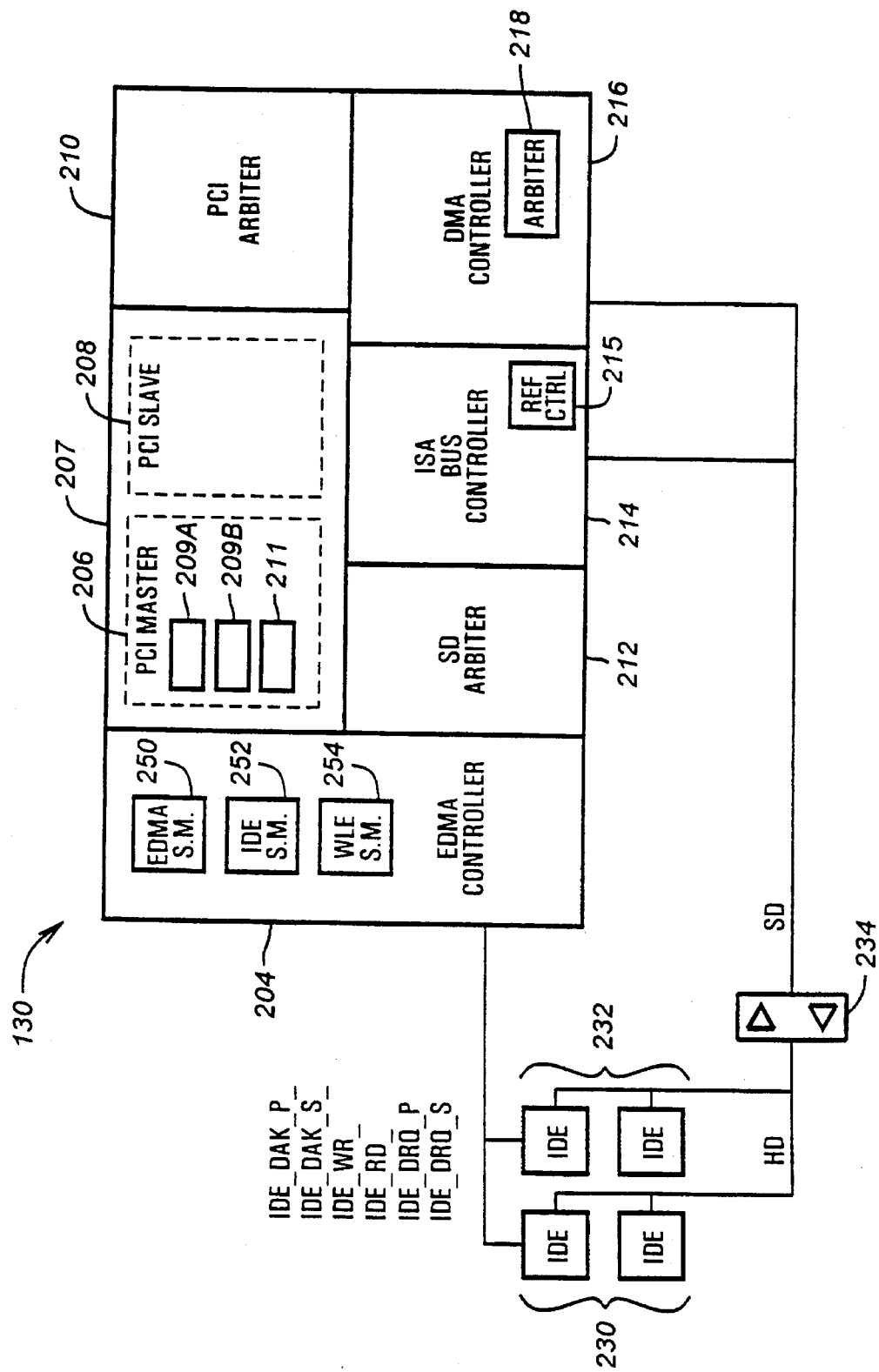
FIG. 2 is a block diagrams of a PCI-ISA bridge in the computer system of FIG. 1 and incorporating arbitration logic according to the present invention.

Referring now to FIG. 2, various control blocks of the PCI-ISA bridge 130 are shown. The PCI-ISA bridge 130 includes a PCI interface 207, which consists of PCI master logic 206 and a PCI slave logic 208. The PCI slave logic 208 is responsible for monitoring the cycles on the PCI bus P and determining when to respond to these cycles. The PCI-ISA bridge 130 is the subtractive decode agent on the PCI bus, i.e., it responds as a PCI target by asserting a signal DEVSEL* when no other PCI agent responds to the cycle. As the target, the PCI-ISA bridge 130 passes the PCI cycles to the ISA bus I. The PCI slave 208 also responds as a PCI target when it decodes cycles to internal PCI configuration registers, I/O registers or interrupt acknowledge I/O registers.

The PCI master logic 206 is responsible for running cycles on the PCI bus P on behalf of ISA bus masters, a DMA controller 216, and the enhanced DMA (EDMA) controller 204. On the PCI bus P, the PCI master logic 206 runs memory and I/O read and write cycles. The PCI master logic 206 also receives a request from the DMA controller 216 for the PCI bus P and in response asserts a signal EREQ_ to a PCI arbiter 210. Similarly the PCI master logic 206 generates EDMAREQ_ to the PCI arbiter 210 in response to an IDE request from the EDMA controller 204.

The enhanced DMA or EDMA controller 204 includes state machines 250, 252 and 254 which are described below in FIGS. 22, 24 and 25. The EDMA controller 204 also provides two channels in the preferred embodiment for supporting primary IDE devices 230 and secondary IDE devices 232 connected through connectors 133. Each channel is capable of supporting two devices configured as a master and slave. The supportable devices include hard disk drives, CD-ROMs, and tape drives. The IDE devices 230 and 232 are connected to a data bus HD, which is coupled through bi-directional data buffers 234 to the SD bus.

The control signals between the IDE devices 230 and 232 and the EDMA controller 204 are signals IDE_WR_, IDE_RD_, IDE_DRQ_P, IDE_DRQ_S, IDE_DAK_P_ and IDE_DAK_S_. The write command strobe IDE_WR_ is asserted by the EDMA controller 204 while a control byte or data word is driven into the selected IDE device, and the command strobe IDE_RD_ is asserted when a status byte or data word is retrieved from the selected IDE device. To begin a transfer operation with an IDE device, the CPU 100 generates a parallel I/O command cycle on the PCI bus P. The parallel I/O command is typically a read sector command or a write sector command. The I/O command is transmitted to the ISA bus and then to the selected IDE device. Each sector command involves the transfer of 256 bytes of data. The CPU 100 then generates a second PCI I/O cycle to write appropriate IDE control registers in the EDMA controller 204. There are two IDE control registers in the EDMA controller 204, one for the primary channel and one for the secondary channel. In the preferred embodiment, the bits written in each control register are the mask bit and the write/read bit. The mask bit indicates if the channel is masked, and the write/read bit indicates a write or read operation. The mask bits and write/read bits are described below in FIG. 23A. When the selected IDE device is ready to begin the transfer, which usually takes a relatively long time because of seek times, it asserts either of request signals IDE_DRQ_P or IDE_DRQ_S depending on if the primary or secondary channel is selected. In response, the EDMA controller 204 generates a request for the SD bus. Once the SD bus has been granted to the EDMA controller 204, the appropriate one of the acknowledge signals IDE_DAK_P_ and IDE_DAK_S_ is asserted by the EDMA controller 204. Interrupt requests from the IDE devices 230 and 232 are referred to as IRQ_P and IRQ_S and are provided to the miscellaneous system logic chip 132.

Two levels of four-double-word write gathering buffers 209A and 209B and one level of four-double-word read buffers 211 are provided in the PCI-ISA bridge 130 for data transfers between the SD and PCI buses. During reads of the IDE devices (EDMA writes to main memory 114), the EDMA controller 204 initiates a request for the PCI bus as soon as the first level four-double-word write buffer 209A is full. The data in the first level buffer 209A is then latched into the second level buffer 209B. Data transfer from the IDE devices continues until the first level is again full. This provides for a large latency period for the PCI master logic 206 to obtain control of the PCI bus P. During writes to the IDE devices (or EDMA reads of the main memory 114), the EDMA controller 204 must pause to obtain the next four-double-word of data upon completion of a read transfer as there is only one stage of read buffers 211. Only one level of read buffers is used in the preferred embodiment to reduce complexity in the design of the EDMA controller 204. As there are more disk reads than disk writes, with a variance of almost a 10-to-1 ratio, the benefits conferred by using two four-double-word read buffers would be relatively small.

As a result of the above features, it has been found that use of the EDMA controller 204 according to the preferred embodiment reduces PCI bandwidth utilization of up to 95% versus conventional 8237 DMA (with type B timing) controllers for IDE data transfers.

For added flexibility, the timing for completing a data transfer, i.e., one word out of the 256 bytes of data in a sector, by the EDMA controller 204 between the SD and PCI buses is also completely programmable, as fully described below. The EDMA timing is programmable via configuration I/O registers in the PCI-ISA bridge 130. This provides added advantages over conventional 8237 DMA controllers, which allow for limited timing selectibility between the ISA-compatible timing mode, Type A timing mode, Type B timing mode, or Type C timing (or burst) mode.

The DMA controller 216 in the PCI-ISA bridge 130 includes seven channels, each providing 24 bits of memory address. The DMA controller 216 presents an 8-bit interface and is programmed with 8-bit I/O instructions. The DMA controller 216 supports 8 or 16-bit DMA transfers to memory on the PCI bus P and responds only to I/O devices on the ISA bus I. The DMA controller 216 is effectively equivalent to the conventional chained 8237 pair used in conventional EISA computer systems.

The DMA controller 216 interfaces with an ISA bus controller 214, also on the PCI-ISA bridge 130 in the preferred embodiment. The ISA bus controller 214 includes a refresh controller 215 for running refresh cycles on the ISA bus I. The DMA interface in the ISA bus controller 214 translates status signals provided by the DMA controller 216 into appropriate bus cycles. The ISA bus controller 214 also includes other logic blocks, including the PCI bus interface logic, address converting and sequencing logic, data buffer control logic, and ISA bus master interface logic. During cycles on the ISA bus I controlled by an ISA bus master, the ISA bus controller 214 interprets control signals on the ISA bus I for transmission to the PCI bus P. The ISA bus controller 214 also generates ISA control signals during CPU and DMA cycles. During PCI cycles, the ISA bus interface logic interprets signals from the PCI bus interface for driving onto the ISA bus I.

The ISA bus interface logic determines the type of cycle being run from three signals: EGNT_ which is driven by the PCI arbiter 210 to indicate that the ISA bus I has control of the PCI bus P;, EMAST16_ which indicates a 16-bit ISA master has control of the ISA bus I; and REFRESH_ which indicates a refresh cycle. If the signal EGNT_ is deasserted, then that indicates a PCI-to-ISA cycle. If the signals EGNT_ and EMAST16_ are asserted low and the signal REFRESH_ is deasserted high, then that indicates a 16-bit ISA bus master has control of the ISA bus I. If the signal EGNT_ is asserted and the signals REFRESH_ and EMAST16_ are deasserted, then control of the ISA bus I is in the DMA controller 216. If the signals EGNT_ and REFRESH_ are asserted, then an ISA bus master has control of the ISA bus I and is providing a refresh cycle. If the signals EGNT_ is deasserted and REFRESH_ is asserted, then the refresh controller 215 has control of the ISA bus I. It is noted this cycle is not propagated to the PCI bus P as refreshes on the ISA bus I by the refresh controller 215 are hidden.

The arbitration scheme in the PCI-ISA bridge 130 is divided among three logic blocks: the PCI arbiter 210, an SD arbiter 212, and an arbiter 218 in the DMA controller 216. The PCI arbiter 210 preferably supports a total of seven masters: five external masters and two internal masters. The external masters include four general purpose external PCI masters, such as the video controller 300 and NIC 120, and the bridge chip 110. The two internal masters are 1) the DMA controller 216 and 2) the EDMA controller 204. The PCI arbiter 210 implements a least-recently-used or LRU prioritization scheme. The PCI-ISA bridge 130 itself does not have any higher priority than any of the other PCI masters—its priority is determined solely by the LRU algorithm except when the signal LOCK_ is asserted and a lock cycle is in progress on the PCI bus P, the signal EGNT_ is masked until the locked cycle is completed.

As will be described below in more detail, the PCI arbiter 210 implements a mechanism to minimize bus thrashing when a PCI master is retried by a target. A target generates a retry to notify the PCI master that the target is currently unable to complete the bus transaction. For additional details on retry cycles, refer to the PCI Specification.

The SD arbiter 212 determines which device gets control of the SD or ISA data bus. The SD arbiter 212 works in conjunction with the ISA bus arbiter 218A to determine which master gets control of the ISA bus I. Devices that can control the SD bus are PCI masters (for PCI-to-ISA cycles), the refresh controller 215, the EDMA controller 204, the DMA controller 216 and 16-bit ISA bus masters. If there are no requests for the SD bus, the SD arbiter 212 "parks" the PCI slave on the ISA bus I to minimize the latency for PCI-to-ISA cycles. This will be described in more detail below in FIG. 15. The refresh controller 215 is the second highest priority requester in the SD arbiter 212. Granting refresh cycles such a high priority should not impact overall system performance, as refresh cycles occur infrequently, i.e., approximately every 15 microseconds. The EDMA controller 204 has the next higher priority in the SD arbiter 212. The IDE devices connected through IDE connectors 133 use the SD bus for transferring the data.

However, the EDMA controller 204 can be preempted off the SD bus in one of two ways. The first is referred to as bus master preemption, which occurs when a refresh or DMA request is pending. If the EDMA controller 204 is bus master preempted, the request of the EDMA controller 204 is deasserted after a page miss has been reached to allow the refresh controller 215, DMA controller 216, or ISA I/O device to gain control of the bus. The second way of preempting the EDMA controller 204 is referred to as slave preemption, which occurs when a PCI master needs to run a cycle to the ISA bus I. When this happens, the EDMA controller 204 completes its current data transfer before it gives up the SD Bus. However, the EDMA controller 204 asserts a signal BLK_MASK to indicate that it was slave preempted and wants access to the ISA bus I after the PCI-to-ISA cycle is completed. The signal BLK_MASK prevents the IDE request for the SD bus from being masked by a DMA or refresh controller request.

The device having the lowest priority for access to the SD bus is the DMA controller 216 or ISA I/O device. The DMA controller 216 gains control of the SD bus in one of two situations. First, it may request control for running DMA cycles. In the preferred embodiment, the DMA controller 216 may also request control of the SD bus if an ISA bus master needs to run a cycle on the ISA bus I. This is accomplished by programming the DMA channel assigned to the 16-bit ISA I/O device in cascade mode. Thus, a granted request by the I/O device will cause the DMA controller 216 to disable its outputs (except the request and acknowledge signals to the I/O device) to enable the I/O device to gain control of the bus. The DMA request is masked if there is any EDMA data in the SD-to-PCI write posting buffers 209A or 209B. This allows the EDMA data to avoid the two microsecond time-out on the ISA bus I once the DMA controller 216 or ISA bus master gains access to the ISA bus I. This also greatly simplifies the logic in the PCI interface logic 207 as it is concerned only with one source of data at a time.

The other arbiter in the arbitration scheme according to the present invention is the arbiter 218 in the DMA controller 216. The arbiter 218 determines which type of device has priority in the next ISA bus cycle. In the preferred embodiment, the devices that are capable of requesting control of the ISA bus I are the six PCI masters, the DMA controller 214, seven ISA bus masters via the DMA controller 214, and the refresh controller 215. The arbiter 218 implements a two-way "ping-pong" or alternating priority scheme which has two requestor types. The first requestor type includes the DMA controller 214 and ISA bus masters, while the second requestor type includes the other devices. Once the first requestor type gains control of the ISA bus I, it becomes the lowest priority for the subsequent arbitration cycle. This forces the DMA controller 216 or ISA bus master to give up control of the ISA bus I to allow access by the refresh controller 215, PCI bus masters and EDMA controller 204.

If the DMA controller 216 is granted priority in the current arbitration cycle, the DMA arbiter 218 then performs an arbitration between the seven channels of the DMA controller 216 to determine which DMA channel wins. In the preferred embodiment, each of the seven channels can be programmed to cascade mode to allow 16-bit ISA bus masters to go through the DMA controller 216 to request control of the ISA bus I.

The DMA arbiter 218 in the 8237-compatible DMA controller 216 determines the priority of its channels based on either the fixed or rotating priority scheme, as is known to those skilled in the art. For more information on 8237-compatible DMA controllers, refer to Peripheral Components, Intel Corp., pp. 5-4 to 5-21 (1994), which is hereby incorporated by reference.

Figure 3:
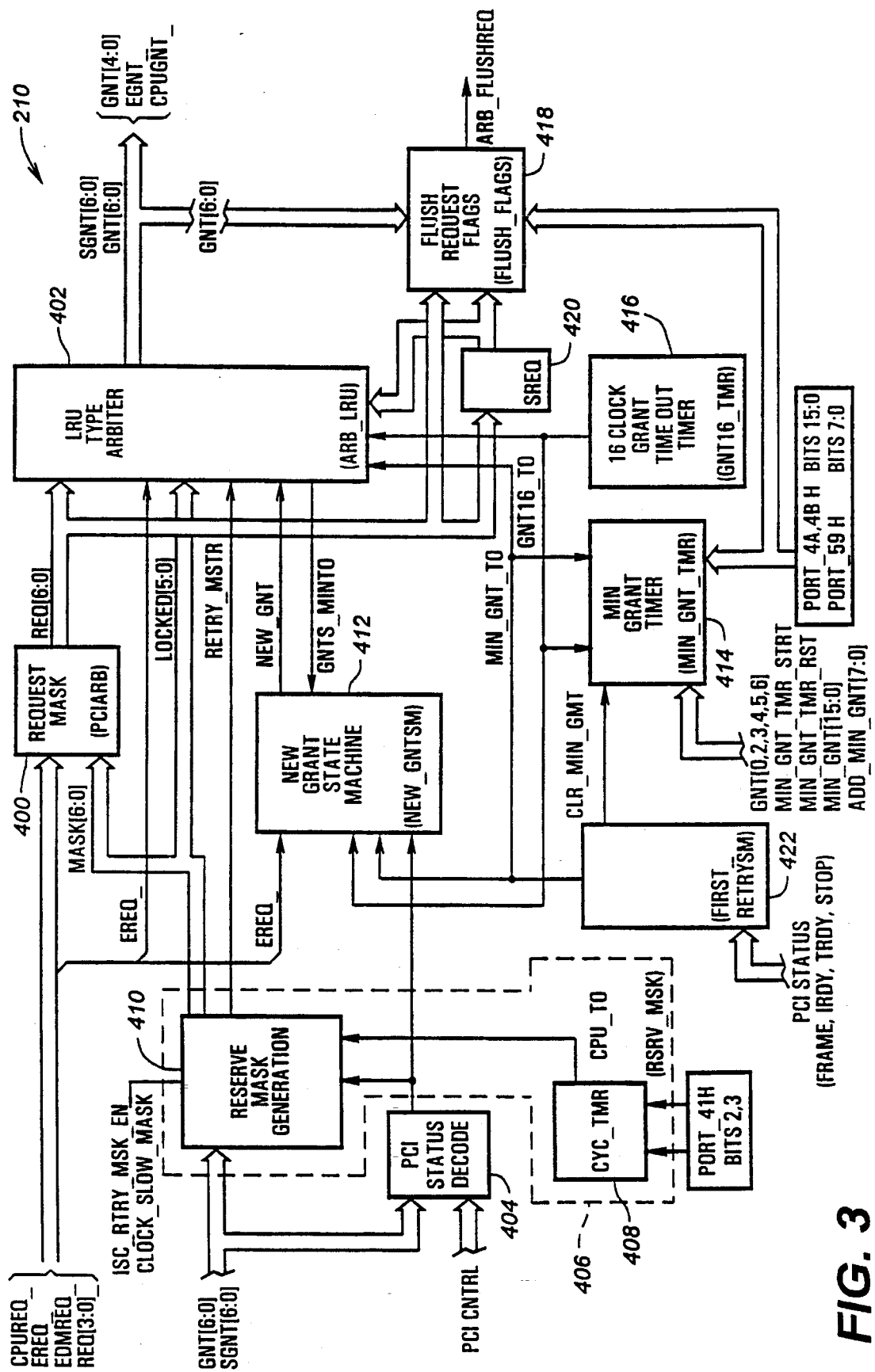
FIG. 3 is a block diagram of a PCI arbiter in the arbitration logic of FIG. 1.

Referring now to FIG. 3, the PCI arbiter 210 is illustrated in greater detail. Seven request signals, CPUREQ_, EREQ_, EDMAREQ_ and REQ_[3:0] are provided to request mask logic 400. The signal CPUREQ_ is the request from the bridge chip 110 to indicate a request from the CPU 100, the signal EREQ_ is the request from one of the ISA bus devices, the signal EDMAREQ_ is the request from the EDMA controller 204, and the signals REQ_[3:0] are the requests from other PCI masters, including the video controller 300 and NIC 120. In this description, a signal mnemonic ending in an underline or an asterisk indicates that it is an active low signal, while an exclamation point indicates an inverted signal.

The request mask logic 400 produces signals REQ[6:0] from the signals CPUREQ_, EREQ_, EDMAREQ_, and REQ_[3:0]. The signals REQ[6:0] are provided to a LRU type arbiter 402. The REQ_[6:0] signals correspond to request signals EDMAREQ_, REQ[5:2], EREQ_, and CPUREQ_, respectively. The output of the arbiter 402 is a series of signals referred to as the GNT[6:0] and SGNT[6:0] signals. The GNT[6:0] signals are used to develop, respectively, the EDMAGNT_, GNT_[5:2], EGNT_, and CPUGNT_ signals which are respectively the responses to the REQ[6:0] request signals provided to the request mask logic 400. The signal GNT[0] is designated for the CPU bridge chip 110. The signal GNT[1] is designated for the ISA bus I and is driven internally in the PCI-ISA bridge 130. The signals GNT[5:2] are designated as general purpose grant lines and can be used in whichever configuration as desired. The signal GNT[6] is driven internally in the PCI-ISA bridge 130 and is designated for the EDMA controller 204.

The SGNT[6:0] signals are the synchronized versions of the GNT signals, that is, they have been latched by a series of D-type flip-flops clocked on the PCICLK signal of the PCI bus P. The GNT[6:0] and SGNT[6:0] signals are provided to PCI status decode logic 404, which also receives PCI control signals from the PCI bus P. Miscellaneous PCI cycle status signals are provided by the status decode logic 404. The SGNT signals are also provided to reservation and mask logic generally referred to as 406. As illustrated, the reservation and mask logic 406 includes two portions, a cycle timer 408, which receives two bits from an arbitrary I/O port, and reservation and mask generation logic 410, which receives signals ISC_RTRY_MASK_EN and CLOCK_SLOW_MASK. The output of the reservation and mask generation logic 410 is seven signals referred to as the MASK[6:0] signals, the priority masking signals, and five signals referred to as the LOCKED[5:2,0] signals, which indicate which particular PCI bus master has locked the PCI bus P. Signals LOCKED[6] and LOCKED[1] are not provided as the EDMA controller 204 and the ISA devices are not capable of running locked cycles on the PCI bus P. Additionally, a signal referred to as RETRY_MSTR or retry master is provided to indicate that a master has been disconnected and a retry cycle has occurred.

The MASK signals are provided to the request mask logic 400, while the LOCKED signals and the RETRY_MSTR signal are provided to the LRU-type arbiter 402. In addition, the LRU-type arbiter 402 receives the EREQ_ signal to determine if an ISA bus request is active. The EREQ_ signal is also provided to a new grant state machine 412, which is utilized to indicate when a new master can be granted control of the PCI bus P.

Certain timers are associated with the grant phase, including the minimum grant timer 414 and a grant timeout timer 416. Twenty-four bits of I/O from arbitrary ports are connected to the minimum grant timer 414, which also receives the GNT[0,2:6] signals and signals referred to as MIN_GNT_TMR_STRT, MIN_GNT_TMR_RST or minimum grant timer start and reset signals. The minimum grant timer 414 also receives 24 I/O bits MIN_GNT[15:0] and ADD_MIN_GNT[7:0], which determine the minimum grant times for the various PCI bus masters. The minimum grant timer 414 produces two output signals referred to as the MIN_TMR_TO signal and the MIN_GNT_TO signals. Both of the signals indicate that the minimum grant timer 414 has timed out and that a new grant can occur.

The minimum grant timer 414 extends the normal grant time of a requesting PCI bus master by a given programmed value, which is determined from configuration registers written during power up. The timer 414 is shared between grant lines GNT[6:2,0]. For grant lines GNT[0,3,4], the maximum programmable time is 54 PCICLK clocks. For grant lines GNT[2,5,6], the maximum programmable time is 248 PCICLK clocks. It is noted that the minimum grant timer 214 is not associated with the grant line GNT[1] as the ISA bus I is not subject to the minimum grant time.

The output of the grant timeout timer 416 is the GNT16_TO signal and is provided to indicate that an arbitration should occur as a sufficient period, preferably 16 PCICLK clocks, has elapsed without a bus master starting activity. In addition, the LRU-type arbiter 402 produces a signal referred to as the GNTS_MINTO signal to the new grant state machine 412 for reasons to be detailed below. The various blocks are detailed in the following description.

The PCI arbiter 210 also includes a flush request block 418 which generates a signal ARB_FLUSHREQ. The signal ARB_FLUSHREQ is generated for grant lines GNT [2:6], which as noted earlier are the general purpose grant lines and the internal grant line for the EDMA controller 204. If the minimum grant time for a particular grant line GNT[x] is not assigned to value 0 and the corresponding request signal REQ[x] is asserted, the signal ARB_FLUSHREQ is asserted to drive a flush request signal FLUSHREQ_ to the bridge chip 110. Similarly, an ISA request indicated by DHOLD will also cause the flush request signal FLUSHREQ_ to be asserted.

When the CPU 100 posts a write to a CPU-to-PCI queue in the bridge chip 110, or when the CPU 100 has locked a particular device on the PCI bus P, it has been found that the bridge chip 110 would continuously retry cycles to a PCI master even if no data coherency problems exist. This problem exists for the Intel 82424 and 82434 chips, as well as for the bridge chip described in U.S. patent Ser. Nos. 08/324,016 and 08/324,246. If the PCI master was assigned a non-zero minimum grant time, then there would be a period of inactivity until the minimum grant timer 414 times out. This degraded overall performance of the PCI bus P. To prevent this problem from occurring, the PCI-ISA bridge 130 asserts the FLUSHREQ_ signal to flush the CPU-to-PCI write queue and to prevent further posting to the write queue.

The flush request block 418 receives signals REQ[6:2], SREQ[6:2], GNT[6:2], MIN_GNT[15:0], ADD_MIN_GNT[7:0], MIN_GNT_TO, and ARB_FLUSHREQ_EN. The signals SREQ[6:2] are provided by synchronizing logic 420, which synchronizes the REQ[6:0] signals to the positive edge of PCICLK to generate the SREQ[6:0] signals. The SREQ[6:0] signals are also provided to the LRU-type arbiter 402. The signal ARB_FLUSHREQ_EN is provided by a configuration register, which if set high enables the ARB_FLUSHREQ signal.

The PCI arbiter 210 also includes a first retry state machine 422. If a cycle requested by a PCI master is retried by a target on the first cycle, the minimum grant timer 414 is cleared to remove the PCI master from the PCI bus P. This optimizes overall bus performance as it is likely in this case that the target will take a while to remove whatever condition made the target unable to respond to the master. However, if the target asserts retry in the second or later cycles, then the minimum grant timer 414 remains enabled as it is likely the target will be able to respond within a few PCICLK clocks.

Figure 4:
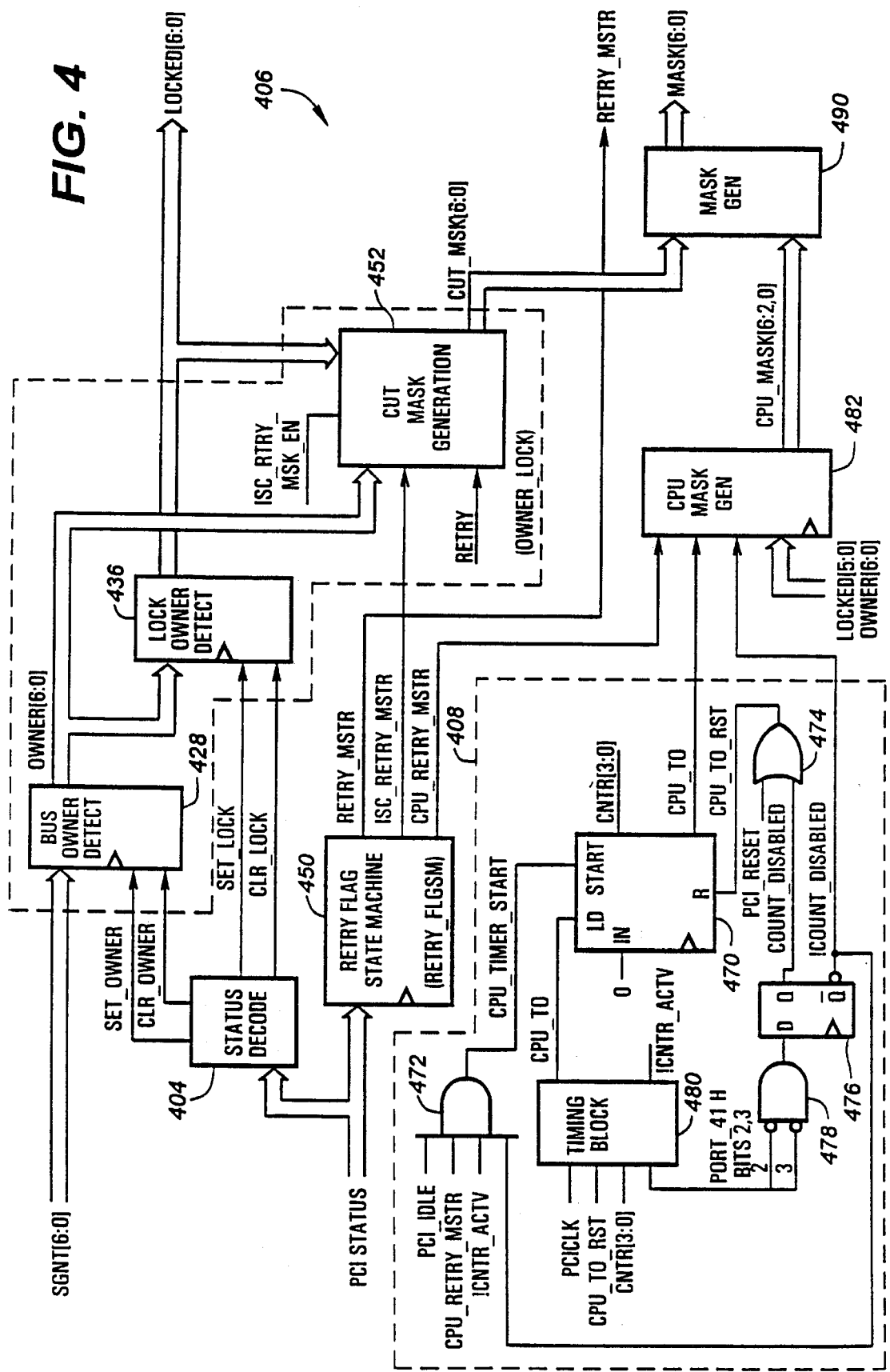
FIG. 4 is a block diagram of the reservation and masking logic of the PCI arbiter of FIG. 3.
Figure 5A:
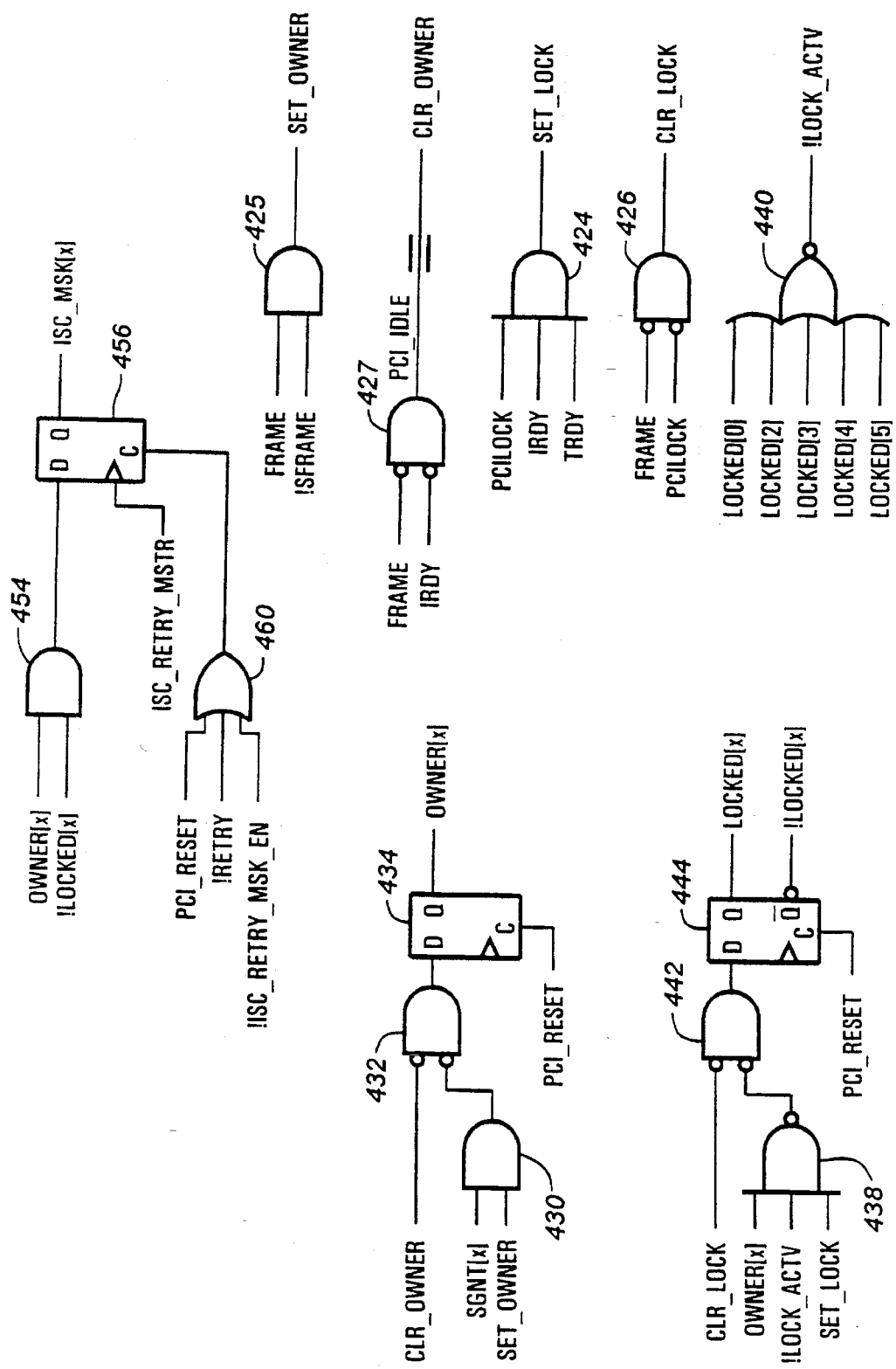
FIGS. 5A and 5B are a schematic diagram of logic associated with the reservation and masking logic of FIG. 4.

Referring now to FIG. 4, the reservation and mask logic 406 is illustrated. The status decode block 404 receives the PCI status signals and provides four signals, the SET_OWNER, CLR_OWNER, SET_LOCK and CLR_LOCK signals. Development of these signals is shown in FIG. 5A, to which reference is now made. A signal referred to as the FRAME signal is provided as one input to a two-input AND gate 425. The FRAME signal is inverted from the PCI FRAME_ signal, which indicates when asserted by a PCI master that a bus transaction is beginning and when deasserted that a transaction is concluded. The second input is the !SFRAME signal, which is a synchronized and inverted version of the FRAME signal. The output of the AND gate 425 is the SET_OWNER signal.

The CLR_OWNER signal is equated to a signal referred to as PCI_IDLE which is provided as the output of a two-input NOR gate 427. The inputs of the NOR gate 427 are the FRAME and IRDY signals. The IRDY signal is inverted from the PCI signal IRDY_, which indicates when asserted a bus master's ability to complete the data phase of the current transaction. The signals FRAME and IRDY being driven low indicate that the current bus master has concluded the transaction on the PCI bus P and that the PCI bus P is idle. The SET_LOCK signal is provided as the output of a three-input AND gate 424, whose inputs are the IRDY signal, the TRDY signal and the PCILOCK signal. The TRDY signal is inverted from the PCI TRDY_ signal, and indicates when asserted that the target is able to complete the current data phase of the transaction. The signal PCILOCK is inverted from the PCI LOCK_ signal, which indicates that an atomic operation may require multiple transactions to complete, e.g., read-modify-write operation. The CLR_LOCK signal is provided at the output of a two-input NOR gate 426, whose inputs are the FRAME and PCILOCK signals.

The SGNT[6:0] signals and the SET_OWNER and CLR_OWNER signals are provided as inputs to a bus owner detect logic 428 (FIG. 4). The bus owner detect logic 428 is used to provide a series of latched output signals referred to as OWNER[6:0], which refer to the owner of the PCI bus P. Detailed logic in the bus owner detect circuitry 428 is illustrated in FIG. 5A. The SET_OWNER signal is provided as one input to a two-input NAND gate 430, whose second input receives the SGNT[x] signal, x being equal to 0–6 for the seven grant lines. Only one example or channel of the logic is illustrated, the remaining portions being duplicated. This illustration of a single channel for exemplary purposes is utilized whenever possible in this description.

The output of the NAND gate 430 is provided as one input to a two-input NOR gate 432, whose second input receives the CLR_OWNER signal. The output of the NOR gate 432 is provided to the D input of a D-type flip-flop 434, which receives the PCI_RESET signal, that is the reset signal on the PCI bus P, at its clear input and produces the OWNER[x] signal at its non-inverting output. The flip-flop 434 is clocked by the PCICLK signal. It is noted in FIG. 5A that no connection is shown to the clock input of the flip-flop 434 and this is used uniformly throughout the drawings to indicate that the clocking input is the PCICLK signal. Where it is otherwise, a signal is provided to the clocking input of the particular flip-flop. The various PCICLK signal connections to the flip-flops have been omitted for clarity.

The OWNER[5:2,0], SET_LOCK and CLR_LOCK signals are provided as inputs to lock owner detect logic 436 (FIG. 4). The output of the locked owner detect logic 436 is the LOCKED[5:2,0] signals. Detailed development of the lock owner detect circuitry 436 is illustrated in FIG. 5A. The OWNER[x] signal is provided as one input to a three-input NAND gate 438. The second input to the NAND gate 438 is the SET_LOCK signal, while the third input is the !LOCK_ACTV or not lock active signal. The !LOCK_ACTV signal is produced at the output of a five-input NOR gate 440, which receives the signals LOCKED[5:2,0]. The output of the NAND gate 438 is provided as one input to a two-input NOR gate 442, whose second input receives the CLR_LOCK signal. The output of the NOR gate 442 is provided to the D input of a D-type flip-flop 444, which is cleared by the PCI_RESET signal. The non-inverting output of the flip-flop 444 is the LOCK[x] signal, while the inverted output provides the !LOCK[x] signal, where x equals 0 and 2–5.

The PCI status signals are also provided to a retry flag state machine 450 (FIG. 4). The retry flag state machine 450 is clocked by the PCICLK signal. The outputs of the retry flag state machine 450 are signals RETRY_MSTR signal, ISC_RETRY_MSTR, and CPU_RETRY_MSTR. The ISC_RETRY_MSTR signal is used to indicate that a retry has been issued by the PCI-ISA bridge 130 and that the cycle which has been aborted was addressed to either the bridge 130 itself or to the ISA bus I. The conditions of this retry are further described below. The CPU_RETRY_MSTR signal indicates a retry initiated by a PCI master other than the PCI-ISA bridge 130. The ISC_RETRY_MSTR signal is used to mask off the bus request of the particular master which was retried by the PCI-ISA bridge 130 until the cycle can be run without a need for a further retry, while the CPU_RETRY_MSTR signal is used to mask off the request from the bus owner where the target is a device other than the PCI-ISA bridge 130. This allows the device that initiated the retry an opportunity to complete the condition that caused the retry. The signal RETRY_MSTR is asserted high if either of the ISC_RETRY_MSTR or CPU_RETRY_MSTR signals is high.

Figure 6:
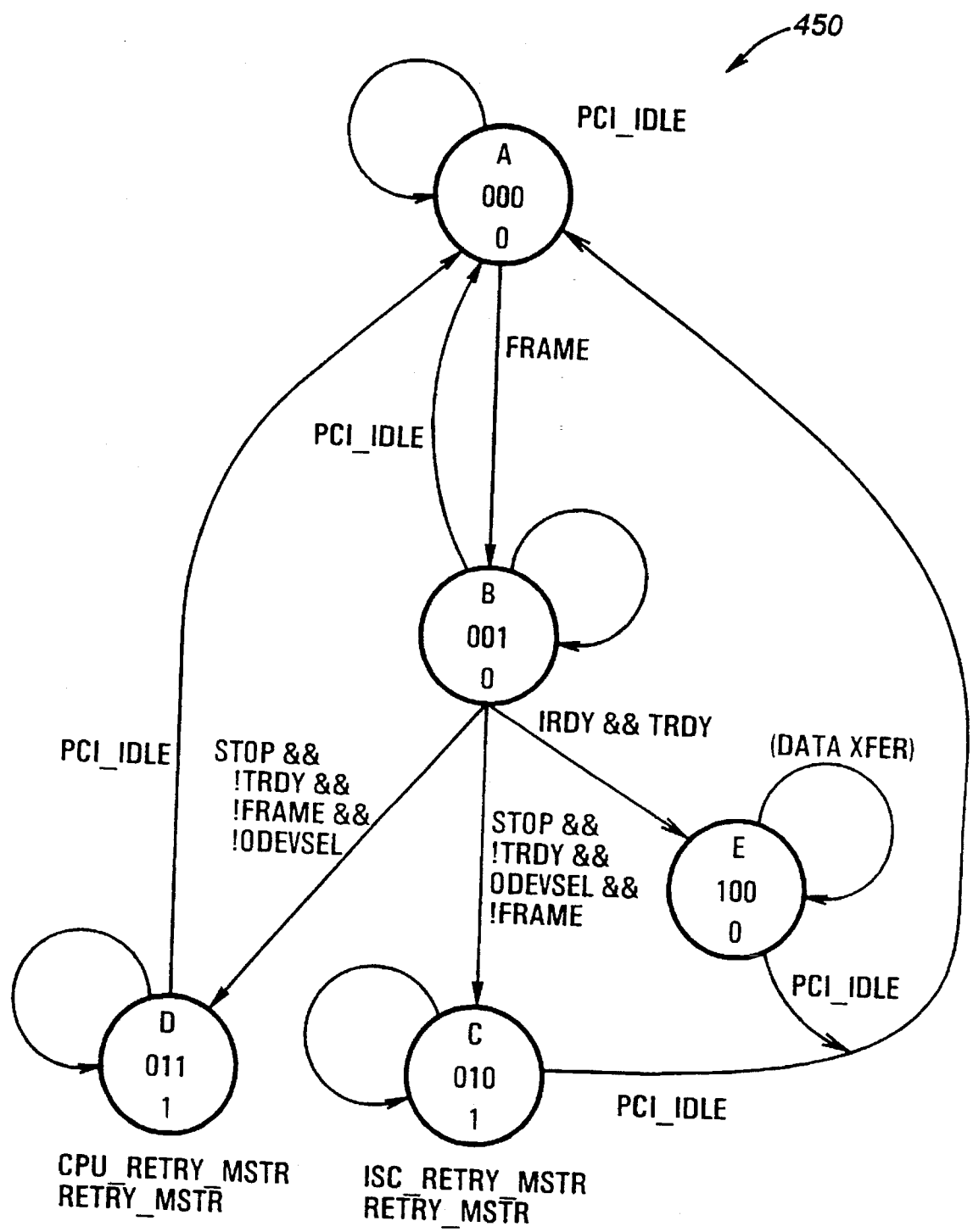
FIG. 6 is a state machine for tracking cycles to indicate when a retry has occurred to prevent re-prioritization.

The retry flag state machine 450 is illustrated in FIG. 6. Operation of the state machine commences at state A upon receipt of the PCI_RESET signal. When the FRAME signal is asserted, indicating that a PCI cycle is active, control proceeds to state B. Otherwise, control remains at state A. If the PCI_IDLE signal is asserted in state B, indicating that the PCI bus P has gone idle, control returns to state A.

For the ensuing discussion, a signal STOP is defined as being the inverted state of the PCI STOP_ signal, which indicates when active that a target is requesting the current master to stop bus transaction. A signal ODEVSEL is generated in the PCI-ISA bridge 130, and its inverted state drives the PCI DEVSEL_ signal. The DEVSEL_ signal is driven low by a target when the target decodes its address on the PCI bus P in the current cycle.

If the STOP signal is asserted, and the TRDY, ODEVSEL and FRAME signals are not asserted, control proceeds to state D. This indicates an operation on the PCI bus P with a bus master other than the PCI-ISA bridge 130. In state D, the signals CPU_RETRY_MSTR and RETRY_MSTR are asserted.

If the STOP signal is asserted, the TRDY signal is deasserted, the FRAME signal is deasserted, and the ODEVSEL signal is asserted, control proceeds to state C. This indicates an operation with the PCI-ISA bridge 130 as the target, and the PCI-ISA bridge 130 has sent a retry to the bus master. In state C, the signals ISC_RETRY_MSTR and RETRY_MSTR are asserted. In state B, if both signals IRDY and TRDY are asserted, indicating that both the current bus master and target are ready to complete the data phase of the current transaction on the PCI bus P, then control proceeds to state E, regardless of the state of the STOP signal. The state machine remains in state E until the data has been transferred. When the PCI bus P goes idle, as indicated by the signal PCI_IDLE, the state machine transitions from state E back to state A.

Similarly, the state machine returns to state A from either state C or D if the signal PCI-IDLE is detected asserted.

Thus the state machine 450 indicates when a cycle has been retried and whether it was directed to the ISA bus I or a device under control of the PCI-ISA bridge 130, or to a PCI bus target other than the PCI-ISA bridge 130.

The OWNER[6:0] and LOCKED[5:2,0] signals and the ISC_RETRY_MSTR signal are provided to the mask generation logic 452 (FIG. 4), which also receives a signal referred to as the ISC_RETRY_MSK_EN or ISC retry mask enable signal from a bit in an arbitrary I/O port. This bit is used to enable or disable operation of the feature wherein the bus request signal of a requesting bus master which has been retried based on an access to the PCI-ISA bridge 130 is masked until the cycle can be completed without a further retry. When this feature is disabled, which is not preferable, then the master may repeatedly retry prior to the data being available. The output of the mask generation logic 452 is the ISC_MSK[5:2,0] signals. As the PCI-ISA bridge 130 will not initiate a retry in a cycle that it generated, there exists no need for signals ISC_MSK[1] and ISC_MSK[6].

Further details of the logic are provided in FIG. 5A. The OWNER[x] and !LOCKED[x] signals are the inputs to a two-input AND gate 454, where x is equal 0 and 2–5. The output of the AND gate 454 is connected to the D input of a D-type flip-flop 456. The non-inverted output of the flip-flop 456 is the ISC_MSK[x] signal. The D flip flop 456 is clocked on the rising edge of the signal ISC_RETRY_MSTR. The clear input of the flip-flop 456 is connected to the output of an OR gate 460 which receives the PCI_RESET, !RETRY and !ISC_RETRY_MSK_EN signals. The RETRY signal is provided under several conditions. First, a cycle is directed to the ISA bus I, but another cycle is already in progress on the ISA bus I. One example is when a prior master has posted a write operation to the ISA bus I and that write operation is occurring. Second, a cycle is directed to the ISA bus I when a refresh cycle on the ISA bus I is pending or is in progress. The third condition is when the PCI-ISA bridge 130 is the responding PCI slave, a lock has been set and the requesting bus master is not the locking bus master. This condition occurs as the PCI-ISA bridge 130 must not execute a cycle as a locked resource to any master except the one placing the lock. The final condition occurs when the system clock is changing frequency and the master requesting the PCI bus P is not the CPU 100 (bridge chip 110). The RETRY signal is asserted when any of these events occur and is removed or negated when the assertion event is completed, such as the lock being released, the posted write completing, the refresh completing or the system clock frequency change completing as indicated by the signal CLOCK_SLOW_MASK being deasserted. The PCI-EISA bridge 130 can obviously determine when it is unlocked and can determine the other three events as it performs the posted write operation, includes the refresh controller and monitors the state of the signal CLOCK_SLOW_MASK. Therefore if a cycle initiated by a bus master and directed to the PCI-ISA bridge 130 is retried, and the PCI_ISA bridge 130 is not locked by the bus master, then the corresponding ISC_MSK bit is set to allow the master's bus request to be masked until the retry source event is completed as indicated by the signal RETRY being deasserted.

As mentioned above, there are certain conditions when a PCI master is retried when the target is not the PCI-ISA bridge 130. In this situation, it is desirable to mask the request from the current bus owner so that the target device that initiated the retry can complete the condition that caused the retry. The current bus owner is masked off for a certain period, and it is desirable the masking period be programmable. To this end, two bits from an arbitrary I/O port are utilized to define four options. The 00 value indicates that masking is disabled, while the other three combinations refer to 4, 8 and 16 PCICLK signal delays. These two bits are provided to the inputs of timing block 480 (FIG. 4), which is shown in more detail in FIG. 5B. The timing block 480 provides output signals !CNTR_ACTV, which indicates when true that a CPU timer 470 (FIG. 4) is inactive, and CPU_TO, which indicates the time-out condition for the timer 470. The timer 470 is preferably a four-bit timer providing output bits CNTR[3:0] to the logic block 480. If the timeout signal CPU_TO is asserted, the load input of the timer 470 is activated to load the value 0×0000 into the timer 470. The timer 470 is clocked on the rising edge of the PCICLK signal, and it is started upon receipt of a signal which is provided by the output of a four-input AND gate 472. The inputs to the AND gate 472 are the PCI_IDLE signal, the CPU_RETRY_MSTR signal, the !CNTR_ACTV signal and the !COUNT_DISABLED signal. So when the timer 470 is not disabled as indicated by !COUNT_DISABLED, and not currently active as indicated by !CNTR_ACTV, and a retry cycle has been initiated as indicated by CPU_RETRY_MSTR, and the PCI bus P is idle because of the retry, then the timer 470 is started.

The timer 470 is reset by the output, referred to as the CPU_TO_RST signal, of a two-input OR gate 474. One input to the OR gate 474 is the PCI_RESET signal and the other input is provided by the non-inverting output of a D-type flip-flop 476. The D input of the flip-flop 476 receives the output of a two-input NOR gate 478 which receives at its inputs the two bits to define the timeout interval. The inverted output of the flip-flop 476 is the !COUNT_DISABLED signal.

Figure 5B:
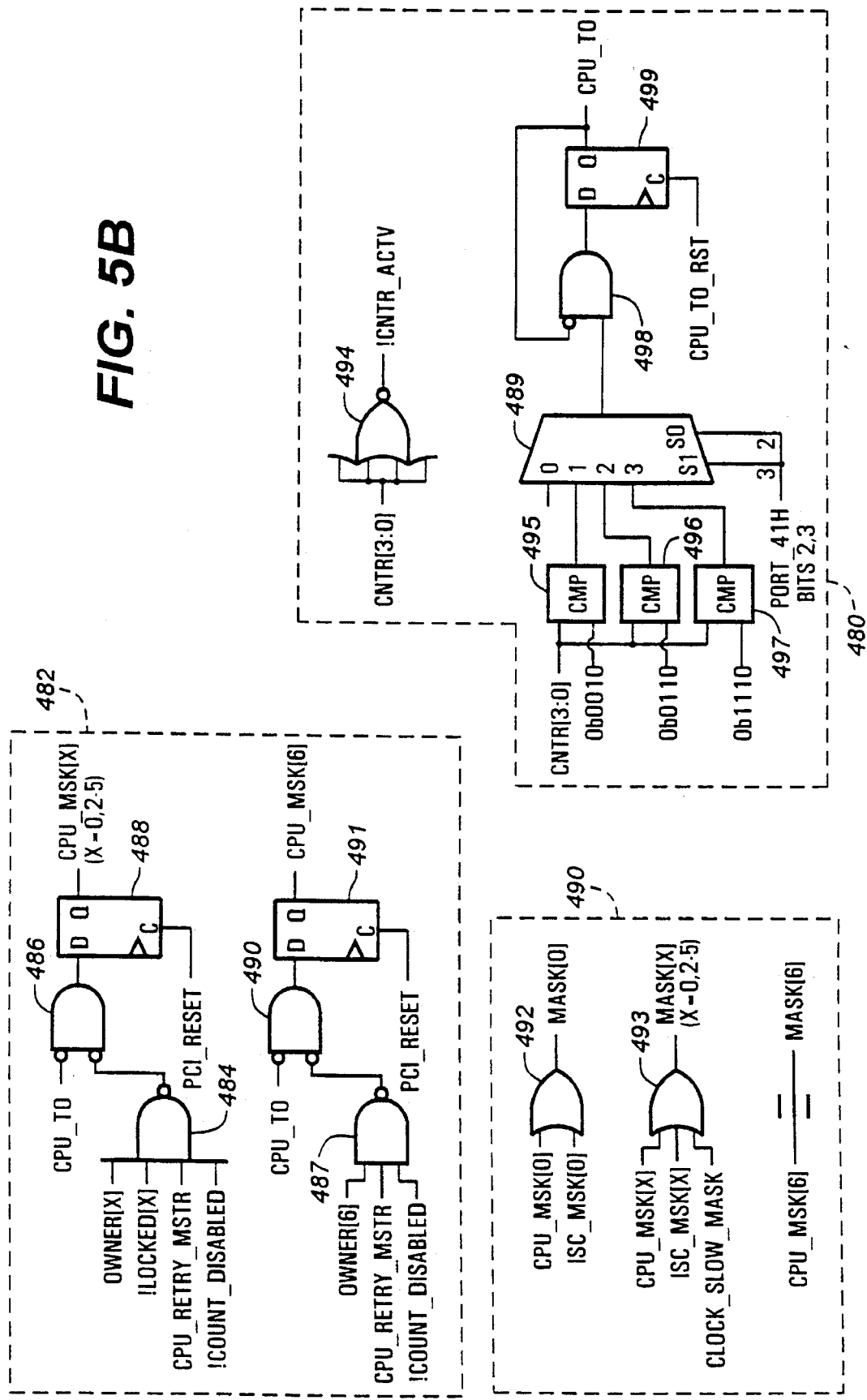

The timer output bits CNTR[3:0] are provided to the inputs of the logic block 480 (FIG. 5B), as are the signals PCICLK and CPU_TO_RST. Referring now to FIG. 5B, the logic block 480 is shown. A four-input NOR gate 494 receives the CNTR[3:0] bits. If all four CNTR[3:0] are low, then the NOR gate 494 drives the signal !CNTR_ACTV high. The signal CPU_TO is provided by a D-type flip-flop 499, which is clocked on the rising edge of the PCICLK signal. The D input of the flip flop 499 is connected to the output of an AND gate 498. One input of the AND gate 498 is connected to the inverted state of the signal CPU_TO, while the other input is connected to the output of a 4-to-1 multiplexor 489. The select inputs of the multiplexor 489 are connected to the two bits from the arbitrary I/O port for selecting the timing interval.

The 1, 2 and 3 inputs of the multiplexor 489 are connected to the outputs of comparators 495, 496 and 497, respectively. The 0 input is a "don't care" condition. The comparators 495, 496 and 497 compare the CNTR[3:0] bits with the values 0b0010, 0b0110 and 0b1110, respectively. Thus, if the select inputs of the multiplexor 489 are driven with the value 0b01, the CPU_TO signal is asserted when the timer 470 counts to 0b0010 to effectively force a masking interval of 4 PCICLK clocks. If the select inputs of the multiplexor 489 are driven with the value 0b10, then the CPU_TO signal is asserted when the timer 470 counts to 0b0110, which effectively forces a masking interval of 8 PCICLK clocks. Finally, if the select inputs of the multiplexor 489 are driven with the value 0b11, then the CPU_TO signal is asserted when the timer 470 reaches the value 0b1110, which effectively forces a masking interval of 16 PCICLK clocks.

The CPU_RETRY_MSTR, CPU_TO and !COUNT_DISABLED signals are provided to the CPU mask generation logic 482, which provides the CPU_MSK[6:2,0] signals. It is noted that a CPU_MSK[1] signal is not provided as the ISA bus request is not subject to masking in the preferred embodiment. The CPU mask generation logic 482 further receives signals LOCKED[5:2,0] and OWNER[6:2, 0]. Details of the CPU mask generation logic 482 are provided in FIG. 5B for the generation of the CPU_MSK [5:2,0]. The CPU_RETRY_MSTR signal is provided as one input to a four-input NAND gate 484, with the other inputs receiving the !COUNT_DISABLED signal, the OWNER[x] signal and the !LOCKED[x] signal, with x equal to 0 and 2–5. The output of the NAND gate 484 is provided as one input to a two-input NOR gate 486 with the second input receiving the CPU_TO signal. The output of the NOR gate 486 is provided to the D input of a D-type flip-flop 488, whose non-inverted output provides the CPU_MSK[x] signal. The flip-flop 488 is clocked by the PCICLK signal and is cleared by the PCI_RESET signal. Thus, the CPU_MSK[x] signal is asserted when the CPU_RETRY_MSTR signal is asserted if the cycle initiated by the bus owner x is not locked and the timer 470 is not disabled.

The CPU_MSK[6] signal is provided by a D-type flip-flop 491, which is also clocked by the PCICLK signal and cleared by the PCI_RESET signal. The D input of the flip-flop 491 is connected to the output of a NOR gate 490, whose first input receives the signal CPU_TO and whose other input is connected to the output of a three-input NAND gate 487. The NAND gate 487 receives input signals OWNER[6], CPU_RETRY_MSTR, and !COUNT_DISABLED. Thus, the EDMA controller 204 is masked when it is the owner of the PCI bus P, the timer 470 is not disabled, and a target other than the PCI-ISA bridge 130 asserts a retry cycle. Each of the CPU_MSK[6:2,0] signals are cleared low when the timeout signal CPU_TO is asserted high.

The ISC_MSK[6:2,0] and CPU_MSK[6:2,0] signals are provided to mask generation logic 490 as is the signal CLOCK_SLOW_MASK. The output of the mask generation logic 490 is the MSK[6:2,0] signals to indicate which bus request signals are to be masked from the actual prioritization process. Details of the circuitry are provided in FIG. 5B. The signal MASK[0] is provided by an OR gate 492, which receives the CPU_MSK[0] and ISC_MSK[0] signals. The signals MASK[x], x equal to 2–5, is provided by an OR gate 493, which receives the signals CPU_MSK[x], ISC_MSK[x] and CLOCK_SLOW_MASK. Thus, while the system clock frequency is being changed as indicated by the signal CLOCK_SLOW_MASK, requests from bus masters 2–5 are masked. The signal MASK[6] is simply equated with the signal CPU_MSK[6], as there is no corresponding ISC_MSK[6] signal.

Figure 7:
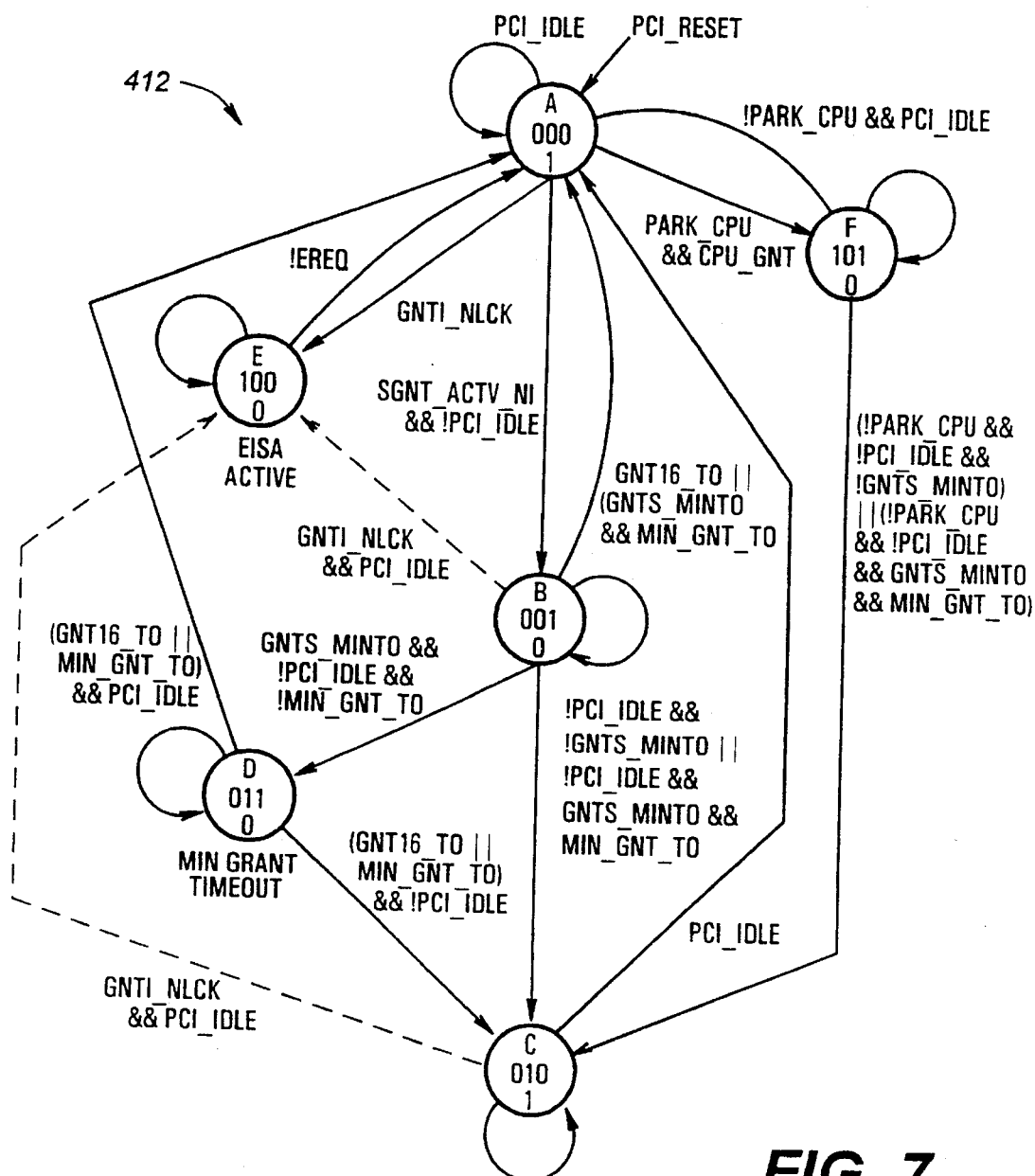
FIG. 7 is a state machine for determining when a new master has been granted the bus.
Figure 12:
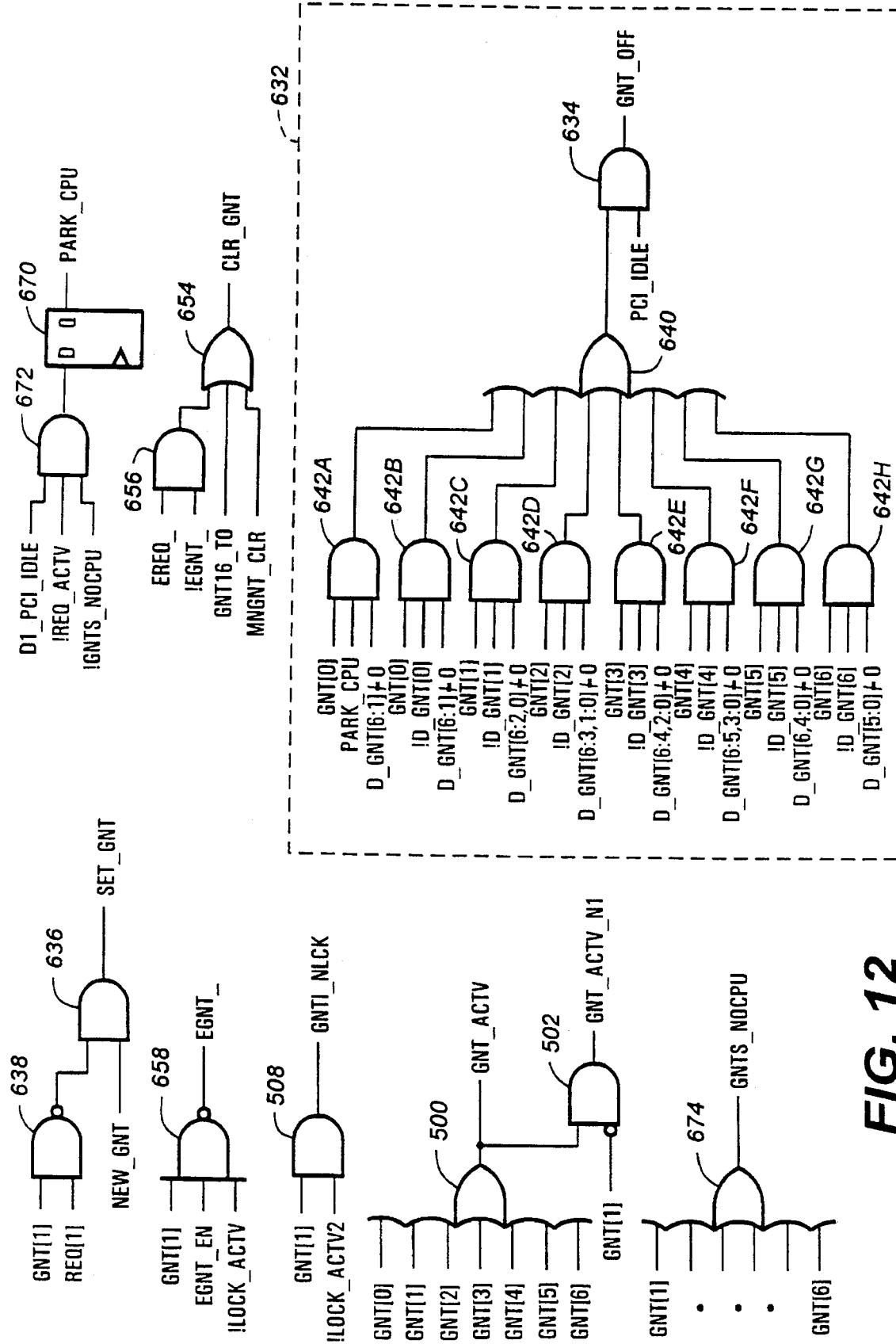

The operation of the new grant state machine 412 is illustrated in FIG. 7, which as explained above tracks the grant and bus activity to determine when new grants are issued and when current grants are removed. Control begins at state A upon receipt of the PCI_RESET signal. State A is the idle state which indicates that no activity is currently occurring on the PCI bus P. If there is an active grant as indicated by the GNT_ACTV signal, control proceeds to state B. The GNT_ACTV signal is produced as a seven-input OR gate 500 (FIG. 12). The seven inputs to the OR gate 500 are the GNT[6:0] signals. The GNT_ACTV signal is also provided as one input to a two-input AND gate 502, whose other input is inverted and receives the GNT[1] signal. The output of the AND gate 502 is the GNT_ACTV_N1 or grant active except for ISA grant signal. The SGNT_ACTV_N1 signal is the synchronized version of the GNT_ACTV_N1 signal. Thus, control proceeds to state B when the signal GNT_ACTV_N1 is asserted and the signal PCI_IDLE is deasserted.

Figure 13:
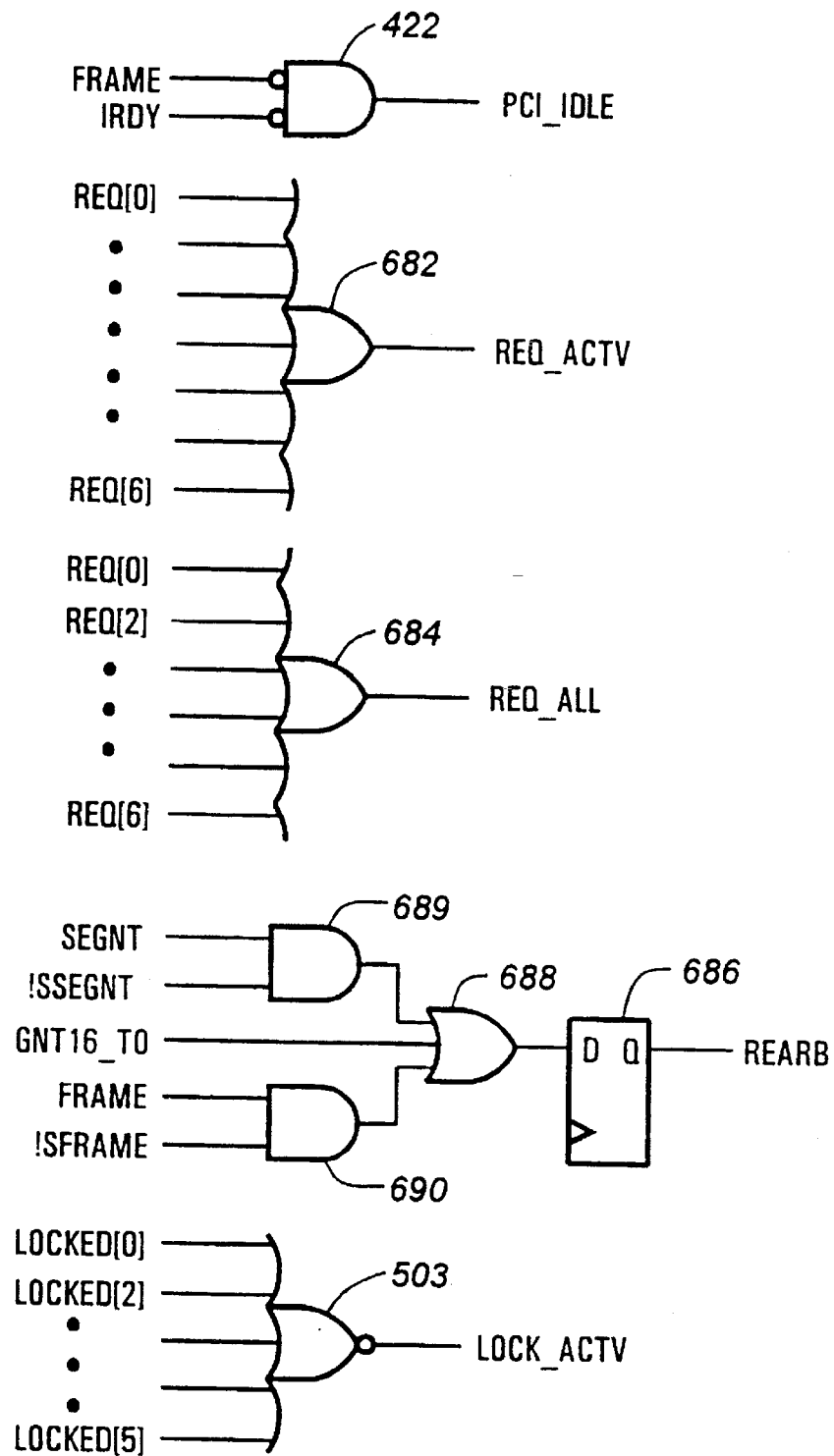

Control proceeds from state A to state E if the GNT1_NLCK signal is present, indicating that the ISA bus I has control of the PCI bus P and no lock signal is active, as indicated by the LOCK_ACTV2 signal. The GNT1_NLCK signal is provided by the output of a two-input AND gate 508 (FIG. 12). The inputs to the AND gate 508 are the GNT[1] signal and the !LOCK_ACTV signal. The LOCK_ACTV signal is produced by the output of a six-input OR gate 503 (FIG. 13) whose inputs are the LOCKED[0,2:5] signals. Control proceeds from state A to state F if the PARK_CPU signal is asserted and the CPUGNT (GNT[0]) signal is asserted. PARK_CPU is an indication that no one has requested the bus and therefore the CPU is given priority as the default owner. In all other cases, control remains at state A.

Summarizing, state B is the active state for all grants except the CPU (when it is indicated as being parked on the PCI bus P) and the ISA bus I because of special requirements for the ISA bus I. State E is the active grant state for the ISA grant. State F is the active grant state for parking the CPU. New grants are disabled in all three states B, E and F, and is indicated by a signal NEW_GNT being deasserted low.

Control returns from state E to state A when the !EREQ signal is true, that is, when the ISA request signal is not present. Otherwise, control remains at state E. Thus, once the ISA bus I has gained ownership of the PCI bus P, it remains there until its operation is completed.

Control proceeds from state B back to state A if the GNT16_TO signal is true or if the GNTS_MINTO and MIN_GNT_TO signals are true. As indicated above, the GNT16_TO signal indicates that 16 PCICLK cycles have elapsed without activity on the bus after a change in ownership, while the GNTS_MINTO and MIN_GNT_TO signal term indicates that certain masters having minimum grant times have control of the bus and the minimum grant timer 414 has timed out. Control proceeds from state B to state D when the GNTS_MINTO signal is true, the PCI_IDLE signal is not asserted and the MIN_GNT_TO signal is not asserted. This is an indication that the minimum grant timer 414 is enabled but has not expired and the bus master is active on the bus so that no grants are disabled. Control proceeds from state B to state C when the PCI_IDLE signal is deasserted and the GNTS_MINTO signal is deasserted or if the PCI_IDLE signal is deasserted and the GNTS_MINTO and MIN_GNT_TO signals are asserted. This indicates that the bus is active and it has either timed out or is not subject to a minimum grant time. In a case which should not normally occur, but which is inserted in case of failure, control proceeds from state B to state E when the GNT1_NLCK and PCI_IDLE signals are asserted. Otherwise control remains at state B.

Control proceeds from state D back to state A if the PCI_IDLE signal is true and the GNT16_TO signal is true or if the MIN_GNT_TO signal is true, indicating either a period of sufficient inactivity without a bus master taking control of the bus or the minimum grant timer 414 has expired and the bus is idle. Control proceeds from state D to state C if the bus is not idle as indicated by the !PCI_IDLE signal, the MIN_GNT_TO signal is true or the GNT16_TO signal is true. This is a case when the bus master is still active after the minimum grant time or the bus master has gone idle for 16 PCICLK clocks. Otherwise, control remains at state D.

Control proceeds from state C to state A when the PCI_IDLE signal is asserted, indicating that the PCI bus P is idle. Control proceeds from state C to state E in the improper condition where the GNT1_NLCK and PCI_IDLE signals are asserted. Otherwise control remains at state C.

Control proceeds from state F back to state A if the bus is idle and the !PARK_CPU signal is asserted indicating that the PCI bus P is no longer parked with the CPU. Control proceeds from state F to state C under two conditions, the first of which is that the !PARK_CPU signal is true, the !PCI_IDLE signal is true and the !GNTS_MINTO signal is true. This term is used when the CPU is not to be the default master, the bus is not idle and a bus master with the minimum grant timer 414 enabled is not in control. The second condition for the transfer is if the !PARK_CPU signal is true, the !PCI_IDLE signal is true, the GNTS_MINTO signal is true and the MIN_GNT_TO signal is true, indicating that the minimum grant time has elapsed and the bus is not idle. In all other cases control remains at state F.

Figure 8:
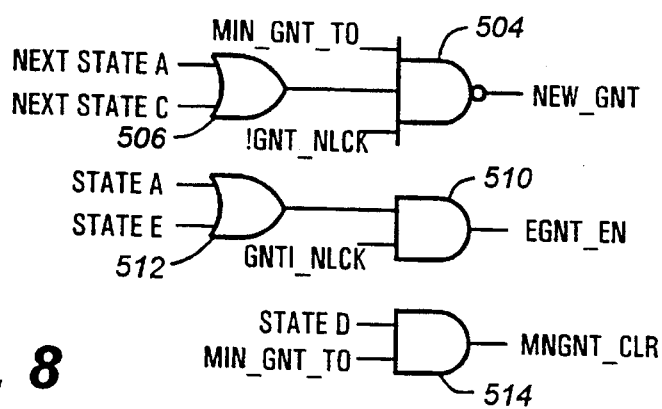
FIG. 8 is a schematic diagram of logic associated with the state machine of FIG. 7.

FIG. 8 illustrates logic for generating the outputs of the new grant state machine 412. A NEW_GNT signal is provided as the output of a three-input AND gate 504. The MIN_GNT_TO signal and the !GNT1_NLCK signals are two inputs to the AND gate 504, while the third input is provided by the output of a two-input OR gate 506. The inputs to the OR gate 506 are signals that indicate that the next state of the new grant state machine 412 will be state A or state C. Thus the NEW_GNT signal is active when the ISA grant or lock is not active, and either the bus has gone idle or the minimum grant timer 414 (FIG. 3), if any, has expired. An EGNT_EN or ISA grant enable signal is provided as the output of a two-input AND gate 510 (FIG. 8), one of the inputs receiving the GNT1_NLCK signal. The other input is provided by the output of a two-input OR gate 512, whose inputs indicate that the state machine is in state A or state E. Thus the EGNT_EN signal is active when either the bus is idle or the ISA bus I is in control of the PCI bus P. The EGNT_EN is used to enable the EGNT_ signal, which is the ISA grant line. The final output of the new grant state machine 412 is a MNGNT_CLR signal, which is provided as the output of a two-input AND gate 514 whose inputs receive a signal that indicates that the state machine is in state D and the MIN_GNT_TO signal. The MNGNT_CLR signal is one condition for clearing the GNT[6:0] lines.

The minimum grant timer 414 (FIG. 3) is designed so that particular devices, in the preferred embodiment, particularly the CPU, the video controller 300, the network interface controller (NIC) 120, the EDMA controller 204, and other devices as can later be added to the system, can have certain minimum grant or bus access times to allow them to do at least certain minimal operations. This is in contrast and different from the GNT_TO timer 416, which is used to determine if a device has not responded within the first 16 PCICLKs after receiving the PCI bus P, in which case mastership is transferred. The MIN_GNT timer logic 414 assures that once the particular device obtains the bus, it has it for a minimum number of PCICLK cycles. To this end twenty-four data bits are provided to the timer 414 to specify the minimum times for the four particular devices in the preferred embodiment. When the minimum grant timer 414 is started, this time value is loaded into a countdown timer which then counts down to zero.

Figure 9:
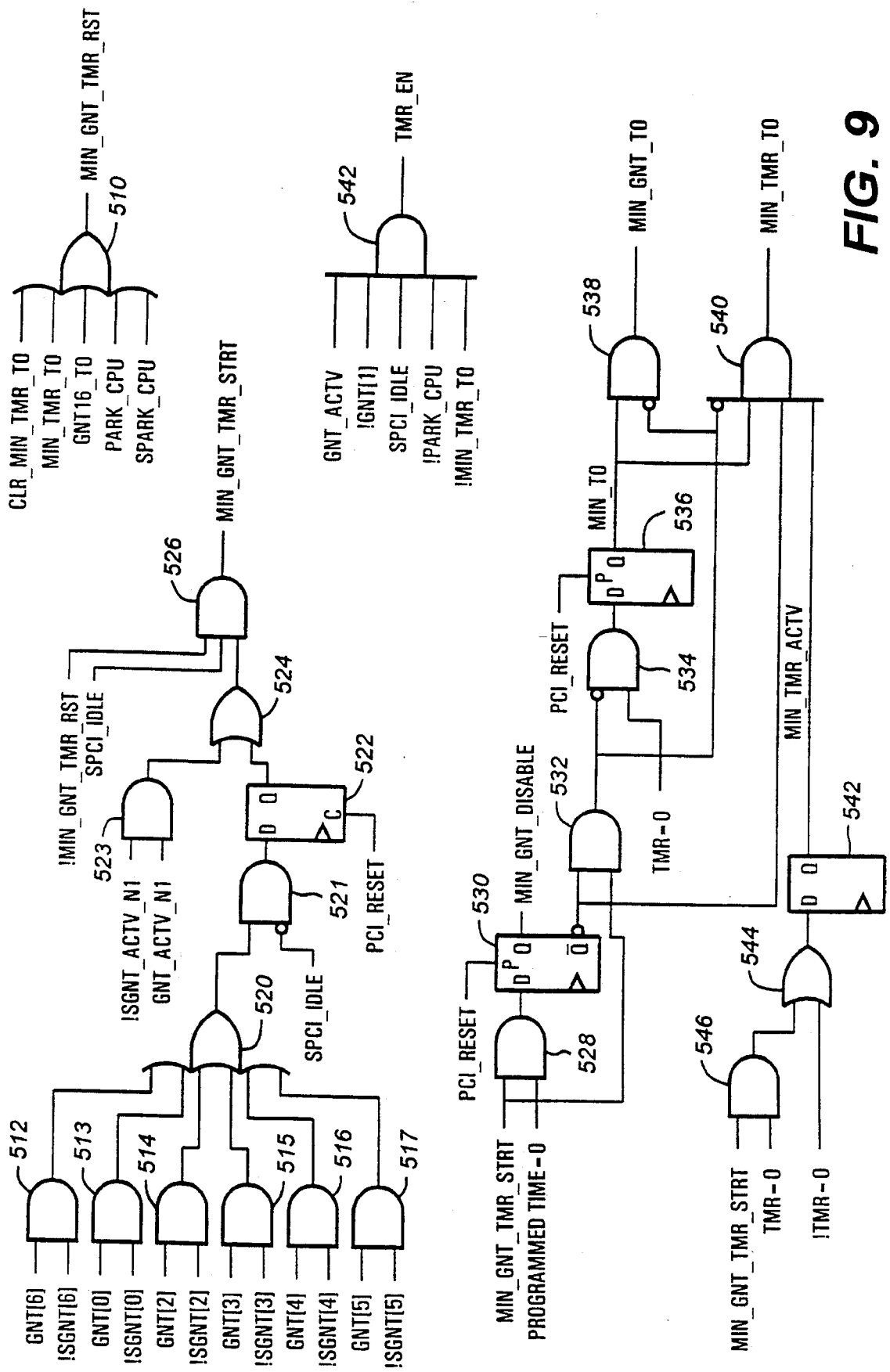
FIG. 9 is a schematic diagram of logic and circuitry associated with a minimum grant timer associated with the PCI arbiter of FIG. 3.

Referring now to FIG. 9, the timer 414, which is clocked by the PCICLK signal, receives a signal referred to as MIN_GNT_TMR_RST or minimum grant timer reset. This signal is provided as the output of a five-input OR gate 510. The five inputs to the OR gate 510 are the MIN_TMR_TO signal, which is actually an output of the minimum grant timer 414; the GNT16_TO signal, to indicate that the initial idle bus time has elapsed; the PARK_CPU signal, which indicates that the CPU is parked by default on the PCI bus P; an SPARK_CPU signal, which is the PARK_CPU signal synchronized to the PCICLK signal; and a CLR_MIN_GNT_TO signal, provided by the first retry state machine 422 (FIG. 3) to indicate that a retry was issued in the first cycle, and as a result, the minimum grant timer 414 should be cleared. The first retry state machine 422 is described below in FIG. 14. When the MIN_GNT_TMR_RST signal is high, the minimum grant timer 414 is reset.

The MIN_GNT_TMR_STRT signal is used to start the timer 414. To this end, the GNT[6] and !SGNT[6] signals are provided to the two inputs of AND gate 512. Similarly, the GNT and !SGNT signals for bus masters 0, 2, 3, 4, and 5 are provided to the inputs of AND gates 513, 514, 515, 516, and 517, respectively. The outputs of the AND gates 512–517 are provided to the 6 inputs of an OR gate 520, whose output is provided to one input of a two-input AND gate 521. The other input of the AND gate 521 receives the inverted state of the signal SPCI_IDLE. The output of the AND gate 521 indicates that a new grant has been issued to a bus master while the PCI bus P was in an active state.

The output of the AND gate 521 is provided to the D input of a D-type flip flop 522, which is clocked on the PCICLK signal and reset by PCI_RESET. The non-inverting output of the flip flop 522 is connected to one input of a two-input OR gate 524, whose other input is connected to the output of a two-input AND gate 523. The inputs of the AND gate 523 receive the GNT_ACTV_N1 and !SGNT_ACTV_N1 signals. As noted above, the signal GNT_ACTV_N1 indicates that one of the grant lines GNT[6:0], other than GNT[1], has been asserted. The signal !SGNT_ACTV_N! is the inverted version of the GNT_ACTV_N1 signal delayed by one PCICLK clock. The output of AND gate 523 indicates also that a new grant has been asserted.

The output of the OR gate 524 is provided to one input of a three-input AND gate 526, whose other inputs receive the SPCI_IDLE and !MIN_GNT_TMR_RST signals. Thus the timer 414 is started when the PCI bus P is idle, the minimum grant timer 414 is not being reset, and a new grant has been provided to one of the bus masters.

The MIN_GNT_TMR_STRT signal is provided to one input of a two-input AND gate 528. The second input of the AND gate 528 receives an indication that the timer 414 has been programmed with a minimum count time of zero for a particular bus master. The output of the AND gate 528 is provided to the D input of a D-type flip-flop 530, whose preset input is connected to the PCI_RESET signal. The flip flop 530 is preset high. The non-inverting output of the flip-flop 530 is the MIN_GNT_DISABLE signal, which is used to stop the timer 414. The inverted output of the flip-flop 530 is connected to one input of a two-input AND gate 532, with the other input receiving the MIN_GNT_TMR_STRT signal. The output of the AND gate 532 is provided to an inverted input of a two-input AND gate 534, with the other input receiving a signal TMR=0 indicating that the timer 414 has counted down to 0. The output of the AND gate 534 is provided to the D input of a D-type flip-flop 536, with the PCI_RESET signal being provided to the preset input. The output of the flip-flop 536 is the MIN_TO or minimum timeout signal, which is provided to one input of a two-input AND gate 538 and to one input of a four-input AND gate 540. The second input to the AND gate 538 is inverted and is connected to the output of the AND gate 532. Similarly, the output of the AND gate 532 is connected to an inverted input of the AND gate 540. The inverted output of the flip-flop 530 is connected to the third input of the AND gate 540, while the non-inverted output of a D-type flip-flop 542 is connected to the fourth input of the flip-flop 540. The D input of the flip-flop 542 receives the output of an OR gate 544, whose inputs are the !TMR=0 signal, which indicates that the timer 414 has not counted down to zero after being loaded, and the output of a two input AND gate 546, whose inputs are the MIN_GNT_TMR_STRT signal and the TMR=0 signal.

The output of the AND gate 538 is the MIN_GNT_TO signal while the output of the AND gate 540 is the MIN_TMR_TO signal. Thus, in this manner, when the MIN_GNT_TMR_STRT signal is received, the timer 414 is loaded with the proper value and commences down counting operations. This continues until the timer 414 reaches zero, at which time the MIN_GNT_TO signal and the MIN_TMR_TO signal are asserted to indicate a timeout. However, if the minimum grant timer 414 is programmed with the value zero, then the MIN_GNT_TO and MIN_TMR_TO signals are disabled, as is the timer 414.

It has been noted that the grant timeout timer 416 (FIG. 3) counts a 16 PCICLK period when a bus master has ownership but the PCI bus P is idle. The timer 416 is enabled by the output of a five-input AND gate 542 (FIG. 9). The inputs to the AND gate 542 are the !GNT[1] signal; the SPCI_IDLE signal, which is the synchronized version of the PCI_IDLE signal; the !PARK_CPU signal; the !MIN_TMR_TO signal; and the GNT_ACTV signal, which indicates one of the grant lines GNT[6:0] has been asserted. Thus the timer 416 is activated when the minimum grant timer 414 has not timed out, any of the bus masters has been granted the bus, except for the ISA bus I, and the PCI bus P is idle but not by default to the CPU. The timer 416 then counts for 16 PCICLK periods and then issues the GNT16_TO signal to indicate that it has timed out.

Figure 10:
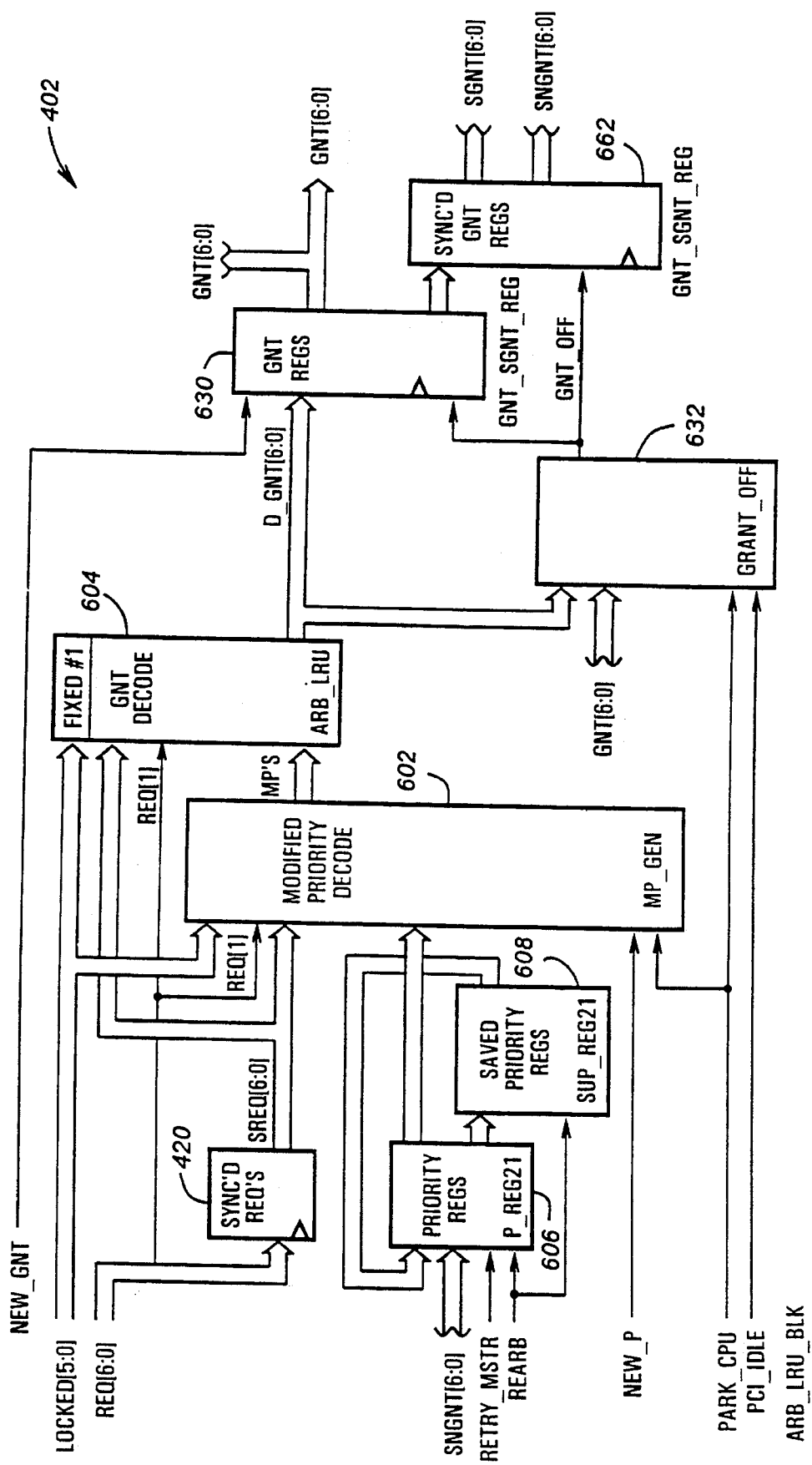
FIG. 10 is a block diagram of the LRU arbiter in the PCI arbiter of FIG. 3.

FIG. 10 shows a more detailed block diagram of the LRU type arbiter logic 402. The REQ[6:0] signals are provided to the SYNC_REQ block 420 which contains a series of seven D-type flip-flops clocked by the PCICLK signal. The SYNC_REQ block 420 synchronizes the REQ[6:0] signals to produce the SREQ[6:0] signals. The SREQ[6:0] signals are provided to the modified priority decoder 602 and to the actual grant decoder or arbiter 604, as is the signal REQ[1]. Further, the LOCKED[5:2,0] signals are provided to both the grant decoder 604 and the modified priority decoder 602.

A series of priority registers 606 are used to determine the particular priority of the various masters with respect to each other. To this end, signals SNGNT[6:0], which are the SGNT[6:0] signals synchronized to the negative edge of the PCICLK signal are provided to priority registers 606, as are the RETRY_MSTR and REARB signals. In addition, the output signals of saved priority registers 608 are provided to the priority registers 606. The output signals of the priority registers 606 are provided to the saved priority registers 608 and to the modified priority decode logic 602. The modified priority logic 602 also receives the PARK_CPU signal to be utilized when no master is requesting the PCI bus P.

Figure 11:
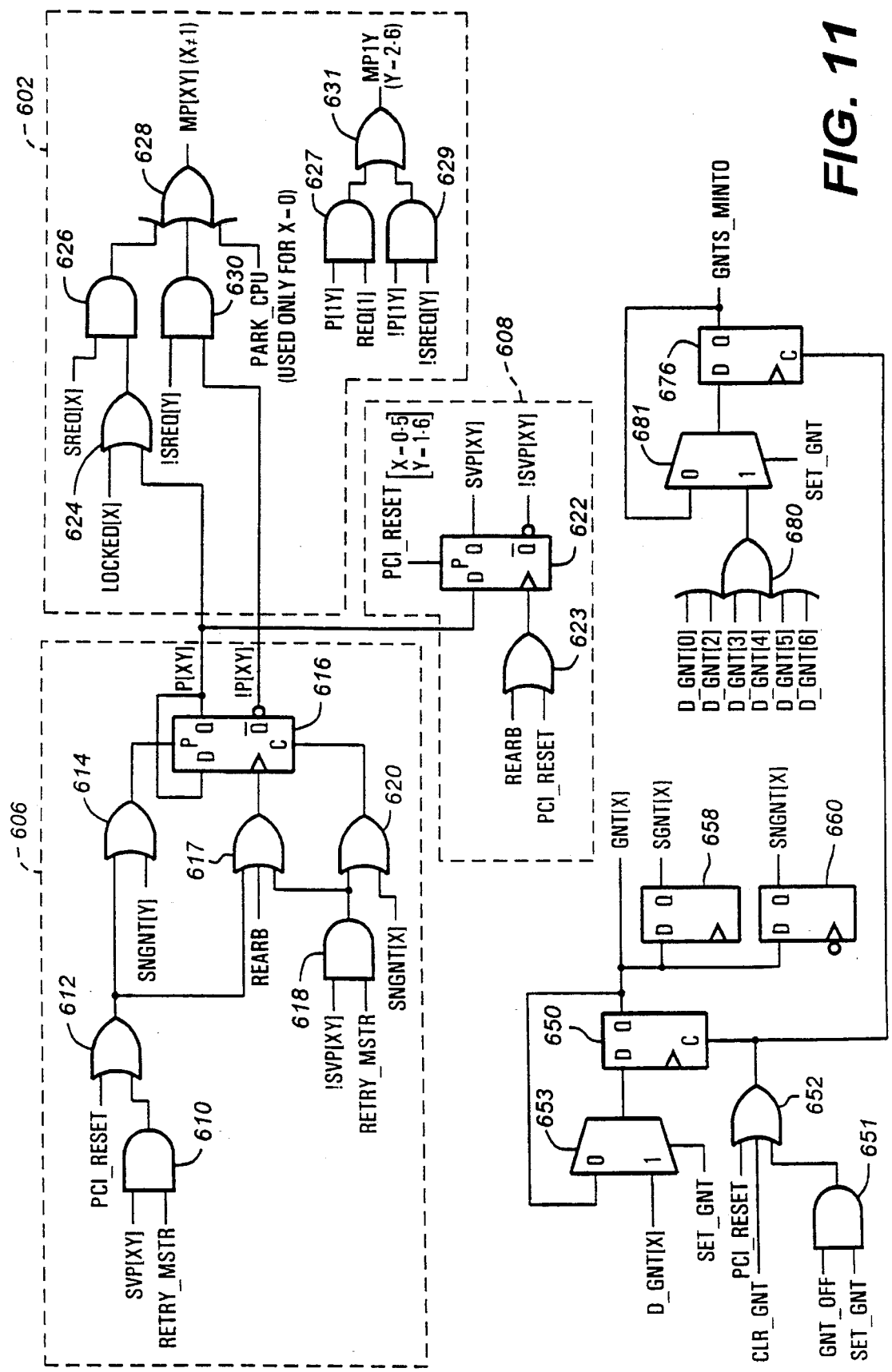
FIGS. 11, 12 and 13 are schematic diagrams of circuitry associated with the arbiter of FIG. 10.

A more detailed schematic of the modified priority decode logic 602 and the priority and saved priority registers 606 and 608 is provided in FIG. 11. It is noted that 21 bits are stored by the priority register 606 and the saved priority register 608. This corresponds to 1 bit for each combination of bus masters. As an example, 1 bit is provided for bus master 0 versus bus master 6, one for bus master 0 versus bus master 5 and so forth. In the following discussion, this is referred to as bits X and Y with X being the first bus master and Y being the second bus master in the particular stored bit. The following description applies for X equal to 0–5 and Y equal 1–6. The priority signals P[XY] and saved priority signals SVP[XY] are as follows in the preferred embodiment: P01, P02, P03, P04, P05, P06, P12, P13, P14, P15, P16, P23, P24, P25, P26, P34, P35, P36, P45, P46, P56; and SVP01, SVP02, SVP03, SVP04, SVP05, SVP06, SVP12, SVP13, SVP14, SVP15, SVP16, SVP23, SVP24, SVP25, SVP26, SVP34, SVP35, SVP36, SVP45, SVP46, SVP56.

The SVP[XY] or saved priority [XY] signal is provided as one input to a two-input AND gate 610. The other input is the RETRY_MSTR signal. The output of the AND gate 610 is provided as one input to a two-input OR gate 612, whose other input is the PCI_RESET signal. The output of the OR gate 612 is provided as one input to an OR gate 614, whose other input is the SNGNT[Y] signal. The output of the OR gate 614 is provided to the preset input of a D-type flip-flop 616. The !SVP[XY] signal is provided as one input to a two-input AND gate 618, with the other input receiving the RETRY_MSTR signal. The output of the AND gate 618 is provided as one input to a two-input OR gate 620, whose other input receives the SNGNT[X] signal. The output of the OR gate 620 is provided to the clear input of the flip-flop 616. It is noted that the preset and clear inputs of the flip-flop 616 are synchronous. The clocking signal to the flip-flop 616 is provided by the output of an OR gate 617 which receives the REARB signal and the outputs of the OR gates 612 and 618 as inputs.

The non-inverted output of the flip-flop 616 is the P[XY] or priority XY bit and this is provided to the D input of the flip-flop 616 and to the D input of a D-type flip-flop 622. The PCI_RESET signal is provided to the preset input of the D-type flip-flop 622. The non-inverting output of the flip-flop 622 is the SVP[XY] signal, while the inverted output provides the !SVP[XY] signal. The flip-flop 622 is clocked by the output of an OR gate 623, whose inputs are the REARB and PCI_RESET signals.

For the following discussion, the case of X equal to 1 is excluded. The P[XY] signal is also provided as one input to a two-input OR gate 624, with the second input being the LOCKED[X] signal. The output of the OR gate 624 is provided to a two-input AND gate 626, whose second input is the SREQ[X] signal. The output of the AND gate 626 is one input to an OR gate 628, whose output is the MP[XY] or modified priority XY signal. The !P[XY] signal is provided as one input of a two-input AND gate 630, whose other input is the !SREQ[Y] signal. It is noted that the !REQ[1] signal is utilized in the 1 or ISA channel, instead of the !SREQ[1] signal. The output of the AND gate 630 is the second input to the OR gate 628. The third input to the OR gate 628 is the PARK_CPU signal, in the case of the channels including the CPU, i.e., where X is equal to 0, and is not utilized in other channels. The signals provided by the OR gate 628 are MP01, MP02, MP03, MP04, MP05, MP06, MP23, MP24, MP25, MP26, MP34, MP35, MP36, MP45, MP46, and MP56.

For the case of X equal to 1 and Y equal to 2–6, the MP[1Y] signals are provided by a two-input OR gate 631. The inputs of the OR gate 631 are connected to the outputs of AND gates 627 and 629. The inputs of AND gate 627 receive signals P[1Y] and REQ[1], while the inputs of AND gate 629 receive signals !P[1Y] and !SREQ[Y].

In this manner, when a master is retried, the saved priority bit is saved in the flip-flop 616, but if not retried, the master loses priority with respect to all masters. Therefore, should a master have to be retried, it retains its priority with regard to all other masters, so it can have priority access to regain the bus upon its next request. However, if it is not being retried, then priority is flipped with respect to its other master. The modified priority decode logic 602, detailed in AND and OR gates 624, 626, 627, 628 629, 630, and 631, is utilized to allow only requesting masters to enter the arbitration. If, for instance, a master has lower absolute priority, i.e. has been used more recently then another master, but that second master is not requesting the bus, the effective priority utilized in the arbitration is flipped, so that the requesting master has priority over all non-requesting masters.

The equations for the grant decode logic 604 are shown below.

| | |
|---|---|
| CPU_REQ = | SREQ0 \|\| PARK_CPU |
| D_GNT[0] = | MP01 && MP02 && MP03 && MP04 && MP05 && MP06 && (!LOCK_REQ_ACTV \|\| LOCKED[0]) && CPU_REQ |
| D_GNT[1] = | MP12 && MP13 && MP14 && MP15 && MP16 && (!MP01 && !LOCK_REQ_ACTV) && REQ[1] |
| D_GNT[2] = | MP23 && MP24 && MP25 && MP26 && (!MP02 && !MP12 && !LOCK_REQ_ACTV \|\| LOCKED[2]) && SREQ[2] |
| D_GNT[3] = | MP34 && MP35 && MP36 && (!MP03 && !MP13 && !MP23 && LOCK_REQ_ACTV \|\| LOCKED[3]) && SREQ[3] |
| D_GNT[4] = | MP45 && MP46 && (!MP04 && !MP14 && !MP24 && !MP34 && !LOCK_REQ_ACTV \|\| LOCKED[4]) && SREQ[4] |
| D_GNT[5] = | MP56 && (!MP05 && !MP15 && !MP25 && !MP35 && !MP45 && !LOCK_REQ_ACTV \|\| LOCKED[5]) && SREQ[5] |
| D_GNT[6] = | (!MP06 && !MP16 && !MP26 && !MP36 && !MP46 && !MP56 && !LOCK_REQ_ACTV) && SREQ[6] |

The LOCK_REQ_ACTV signal is asserted if a LOCKED signal and the corresponding SREQ signal is asserted. Thus, the signal LOCK_REQ_ACTV is asserted if the signals LOCKED[0] and SREQ[0] are asserted, or the signals LOCKED[2] and SREQ[2] are asserted, or the signals LOCKED[3] and SREQ[3] are asserted, or the signals LOCKED[4] and SREQ[4] are asserted, or the signals LOCKED[5] and SREQ[5] are asserted. Therefore, it can be seen that the particular grant is provided when all of the modified priority bits point to that particular bus master, that bus master has either locked the bus or no lock requests are active and that master is requesting the bus. As noted above, the LOCKED signal does not exist for bus master 1 or 6 as the ISA bus I and the EDMA controller 204 cannot run locked cycles on the PCI bus P.

The outputs of the grant decoder 604 (FIG. 10) are the D_GNT[6:0] signals which are provided to the grant storage registers 630 and to the grant off logic 632. The grant off logic 632 also receives the GNT[6:0] signals as well as the PARK_CPU and PCI_IDLE signals. The grant off logic 632 provides the GNT_OFF signal, which is used to guarantee one PCICLK of dead time between grants. Thus, if it is detected that two grant lines are to transition at the same time, i.e., one grant line is being deasserted while another grant line is being asserted when the PCI bus P is idle, then the grant off logic 632 forces all grants inactive for one PCICLK clock to comply and ensure the required dead time between grants during an idle PCI bus P.

The grant off logic 632 is shown in more detail in FIG. 12. The GNT_OFF signal is produced as the output of a two-input AND gate 634, one input which is the PCI_IDLE signal. The other input to the AND gate 634 is the output of an eight-input OR gate 640. The first input to the OR gate 640 is provided by the output of a three-input AND gate 642A, which receives at its inputs the GNT[0] signal, the PARK_CPU signal and a signal indicating that the D_GNT [6:1] signals are not equal to 0b000000. The other inputs of the OR gate 40 are connected to the outputs of three-input AND gates 642B–H. The inputs to the AND gates 642B–H receive, respectively, signals GNT[0], !D_GNT[0], and a signal indicating D_GNT[6:1] not equal 0b000000; signals GNT[1], !D_GNT[1] and a signal indicating D_GNT[6:2, 0] not equal 0b000000; signals GNT[2], !D_GNT[2] and a signal indicating D_GNT[6:3,1:0] not equal 0b000000; signals GNT[3], !D_GNT[3] and a signal indicating D_GNT[6:4,2:0] not equal 0b000000; signals GNT[4], !D_GNT[4] and a signal indicating D_GNT[6:5,3:0] not equal 0b000000; signals GNT[5], !D_GNT[5] and a signal indicating D_GNT[6,4:0] not equal 0b000000; and signals GNT[6], !D_GNT[6] and a signal indicating D_GNT[5:0] not equal 0b000000. The GNT_OFF signal is provided to clear the grant register 630 (FIG. 10) to force all grant lines inactive for one PCICLK clock when the bus ownership is changing while the PCI bus P is idle.

The grant registers 630 are shown in more detail in FIG. 11. The D_GNT[X] signal, X equal 0–6, is provided to the 1 input of a multiplexor 653, which is selected by the signal SET_GNT. The output of the multiplexor 653 is connected to the D input of a D-type flip flop 650, whose non-inverting output provides the GNT[X] signal. The GNT[X] signal is fed back to the 0 input of the multiplexor 653. The clear input of the flip-flop 650 receives the output of a three-input OR gate 652, which at its inputs receive the PCI_RESET signal, the CLR_GNT signal and the output of an AND gate 651. The AND gate 651 receives signals GNT_OFF and SET_GNT. The SET GNT signal is produced as the output of a two-input AND gate 636 (FIG. 12), one input of which is the NEW_GNT signal and the other of which is the output of a two-input NAND gate 638. The inputs to the NAND gate 638 are the GNT[1] and REQ[1] signals, indicating that the ISA bus I is requesting and has been granted the PCI bus P. Thus, the SET_GNT signal is provided when a new grant is to occur and the ISA bus I is not the current master or requesting the PCI bus P.

The CLR_GNT signal is provided as the output of a three-input OR gate 654 (FIG. 12). The inputs to the OR gate 654 are the MNGNT_CLR and GNT16_TO signals and the output of a two-input AND gate 656 which receives the EREQ_ and !EGNT_ signals. Thus, the EGNT_ signal is cleared on the next rising edge PCICLK when the ISA request EREQ_ is deasserted while the signal EGNT_ is asserted. The EGNT_ signal is provided as the output of a three-input NAND gate 658 whose inputs are the GNT[1], EGNT_EN and !LOCK_ACTV signals. The MNGNT_ CLR and EGNT_EN signals are provided by the logic shown in FIG. 8. Thus, the CLR_GNT signal is used to clear the grant register 650 when a bus master has been idle on the PCI bus P for more than 16 PCICLK clocks, the ISA request EREQ_ has gone away while the ISA grant signal EGNT_ is asserted, or the minimum grant timer 414 has expired while the bus owner is still active on the PCI bus P.

The GNT[x] signal is also provided to the D inputs of D-type flip-flops 658 and 660 (FIG. 11). The non-inverted output of the flip-flop 658 is the SGNT[x] or synchronized grant signal, while the non-inverted output of the flip-flop 660 produces the SNGNT[x] signal because the flip-flop 660 is clocked on the falling edge of the PCICLK signal. Thus the flip-flops 658 and 660 are included in the synchronized grant register 662 of FIG. 10.

One signal utilized in the new grant state machine 412 was the GNTS_MINTO signal, which is also generated in the synchronized grant register 662 (FIG. 10). This signal is produced at the output of a D-type flip-flop 676 (FIG. 11). The clear input to the flip-flop 676 is provided by the output of the OR gate 652. The D input of the flip-flop 676 is provided by the output of a multiplexor 681, whose 0 input receives the signal GNTS_MINTO and whose 1 input is connected to the output of a six-input OR gate 680. The inputs of the OR gate 680 receive the D_GNT[6:2,0] signals. These are the particular bus masters which have minimum grant times.

Certain miscellaneous logic and signals have been discussed in this description and the logic is as follows. The PARK CPU signal is produced by the non-inverting output of a D-type flip-flop 670 (FIG. 12). The D-input of the flip-flop 670 is connected to the output of a three-input AND gate 672. The inputs to the AND gate 672 are the PCI_IDLE signal, the !REQ_ACTV or inverted request active signal, and the !GNTS_NOCPU signal. The GNTS_NOCPU signal is produced at the output of a six-input OR gate 674 which receives at its inputs the GNT[6:1] signals. Thus the PARK_CPU signal is active when the bus has been idle, no requests are active and there are no grants to masters other than the CPU.

The REQ_ACTV or request active signal is produced at the output of a seven-input OR gate 682 (FIG. 13) which receives at its inputs the REQ[6:0] signals. Similarly, the REQ_ALL signal is produced as the output of a six-input OR gate 684 which receives at its inputs all of the request signals except for REQ[1], that is, the ISA request.

The final signal is the REARB signal, which is produced at the non-inverting output of a D-type flip- flop 686, whose D input is connected to the output of a three-input OR gate 688. One input to the OR gate 688 is the GNT16_TO signal, while the second input is connected to the output of a two input AND gate 690. The FRAME signal and the !SFRAME signal or inverted, synchronized FRAME signal are provided to the AND gate 690. The final input to the OR gate 688 is connected to the output of a two-input AND gate 689, whose inputs receive signals SEGNT and !SSEGNT. The SEGNT signal is the EGNT signal or ISA grant line synchronized to the PCICLK signal. The !SSEGNT signal is the inverted version of SEGNT delayed by one PCICLK clock. The REARB or rearbitration signal indicates that access to the PCI bus P must be rearbitrated for the next cycle, as indicated by the assertion of the timeout signal GNT16_T0, new assertion of the signal SEGNT, or new assertion of the FRAME signal.

Figure 14:
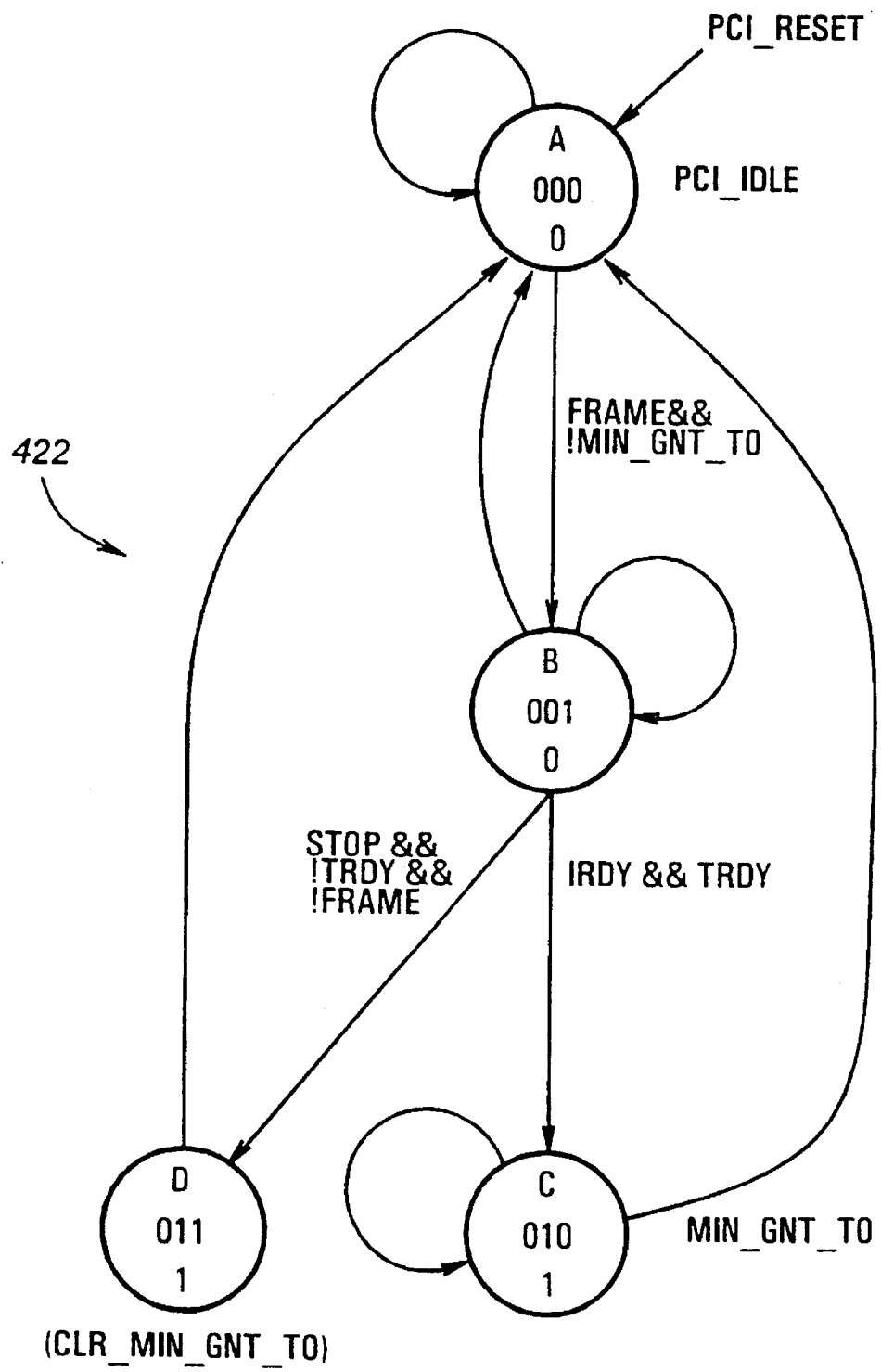
FIG. 14 is a state diagram of a first retry state machine in the PCI arbiter of FIG. 3.

Referring now to FIG. 14, the state diagram of the first retry state machine 422 (FIG. 4) is shown. On the rising edge of the signal PCI_RESET, the state machine begins in state A, which is the idle state. In state A, if the state machine detects the assertion of the signal FRAME while the signal MIN_GNT_TO is deasserted, it transitions to state B. Otherwise, it remains in state A. Thus, in a bus cycle with the minimum grant timer 414 enabled, the first assertion of the signal FRAME causes the state machine 422 to transition out of its idle state. The state machine 422 remains in state B until it either detects a retry cycle or a data transfer cycle. A retry cycle is indicated by the assertion of the STOP signal with the signals TRDY and FRAME both deasserted. When a retry cycle is detected, the state machine transitions from state B to state D.

If the PCI target is capable of completing the data phase of the current cycle, it asserts the signal TRDY. Thus, when the IRDY and TRDY signals are both asserted, that indicates that the bus master and target are ready to perform a data transfer. As a result, the state machine transitions from state B to state C. Otherwise, the state machine remains in state B.

Once in state C, the data transfer state, the state machine 422 remains in state C until the minimum grant timer 414 times out, as indicated by the assertion of the MIN_GNT_TO signal. When the signal MIN_GNT_TO is detected asserted, the state machine transitions from state C back to state A.

In state D, the state machine asserts the signal CLR_MIN_GNT_TO to clear the minimum grant timer 414. As noted earlier, the CLR_MIN_GNT_TO signal is provided to one input of the OR gate 510 (FIG. 9) to drive the signal MIN_GNT_TMR_RST. From state D, the state machine returns to state A on the next rising edge of PCICLK. Thus, effectively, the minimum grant timer 414 is cleared to allow the current bus master to immediately relinquish control of the bus when the target retries the master in the first cycle, i.e., before TRDY is asserted.

Figure 15:
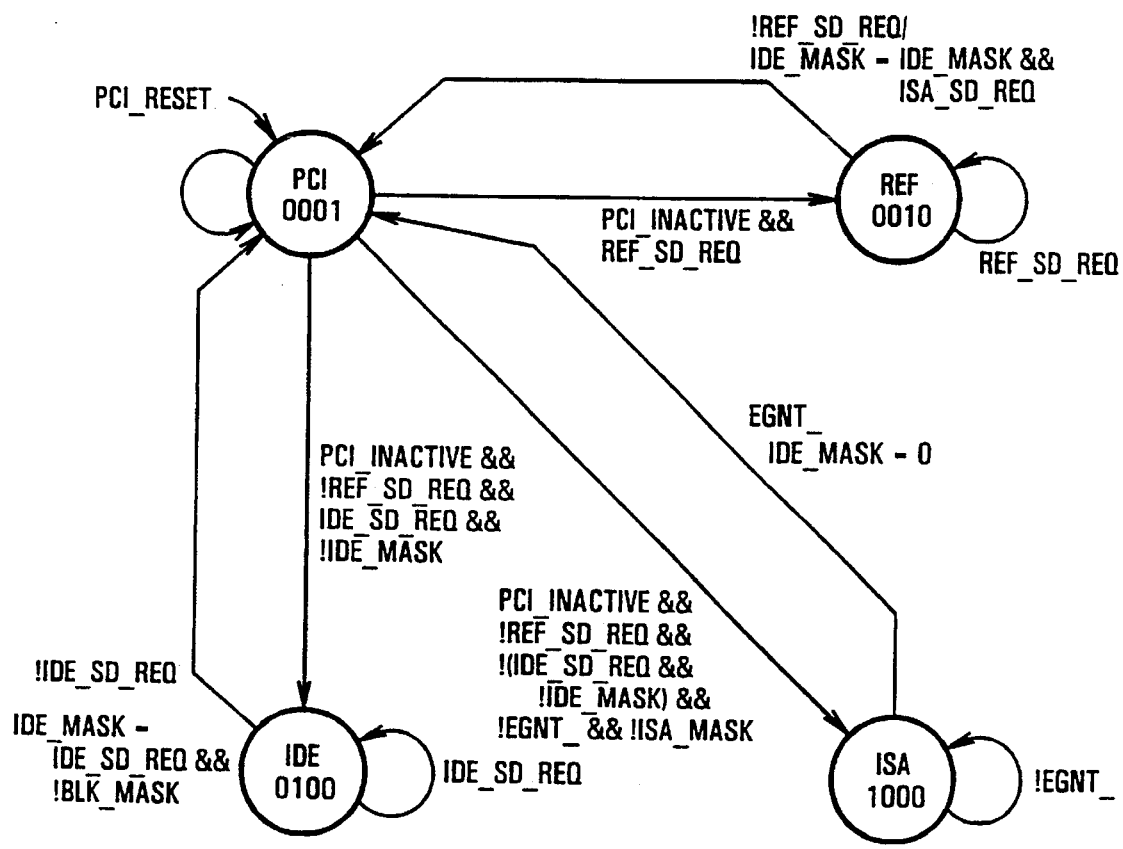
FIG. 15 is a state diagram of an SD arbiter for arbitrating for the data portion of the ISA expansion bus in the computer system of FIG. 1.
Figure 15:
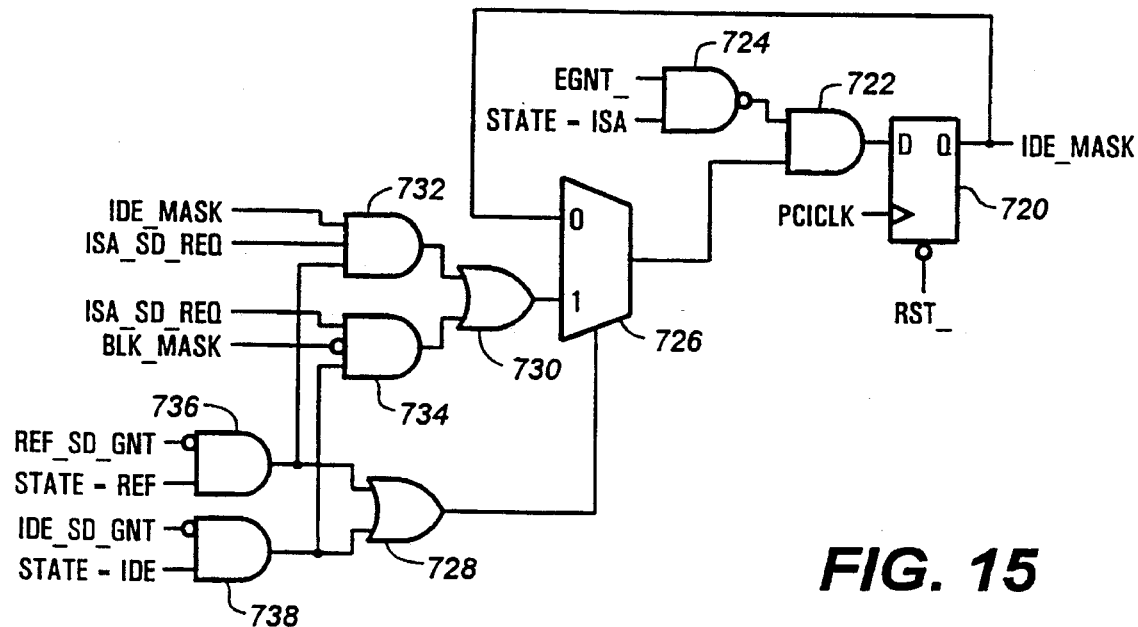

Referring now to FIG. 15, a state machine in the SD arbiter 212 is shown. The state machine contains 4 states: PCI, REF, IDE and ISA. The PCI state is the reset and default state, where PCI-to-ISA cycles are allowed to run. The REF state allows refresh cycles to be run on the ISA bus I by the refresh controller 215. In the IDE state, the EDMA controller 204 is allowed to run data cycles to the IDE interface. As indicated above, data transfers with the IDE devices require use of the SD bus on the ISA bus I. In the ISA state, the DMA controller 216 is allowed run DMA cycles on the ISA bus. Further, in the ISA state, a selected ISA bus master is allowed to run cycles on the ISA bus I through a cascaded DMA channel in the DMA controller 216.

Requests that come into the SD arbiter 212 are labeled REF_SD_REQ, IDE_SD_REQ, and ISA_SD_REQ. The request line REF_SD_REQ is provided by the non-inverting output of a D-type flip-flop 700 (FIG. 16A), which is clocked on the rising edge of PCICLK. The D input of the flip-flop 700 is a signal RHOLD, which indicates a refresh request from the ISA bus arbiter 218A. The request line ISA_SD_REQ is provided by the non-inverting output of a D-type flip-flop 702, which is also clocked by PCICLK. The D input of the flip-flop 702 is connected to a signal DHOLD, which is a request for the ISA bus I from the ISA bus arbiter 218A. The request line IDE_SD_REQ is provided by the EDMA controller 204 to indicate a request for the ISA bus I by the IDE devices.

On assertion of the signal PCI_RESET, the state machine in the SD arbiter 212 enters state PCI. In state PCI, a signal PCI_SD_GNT is asserted high to indicate that the PCI bus P has access to the ISA bus I. If the signal REF_SD_REQ is asserted, and a signal PCI_INACTIVE is also asserted, the state machine transitions from state PCI to state REF. The signal PCI_INACTIVE indicates that the PCI slave 208 is not currently active, a PCI-to-ISA cycle is not posted, there is no cycle running on the ISA bus I, a posted write cycle is not in progress, and the PCI-ISA bridge 130 is not locked by a PCI master. In state REF, a signal REF_SD_GNT is asserted high. The signal REF_SD_GNT is provided to the 1 input of a multiplexor 704, whose 0 input receives a signal RHLDA. The select input of the multiplexor receives a signal BCLKSM_NST_B, which indicates that the ISA bus clock BCLK has transitioned high. The output of the multiplexor 704 is provided to the D input of a D-type flip-flop 706, which is clocked on the rising edge of PCICLK. The output of the D flip-flop 706 drives the signal RHDLA, which is an acknowledge signal provided to the refresh controller 215 (FIG. 2). In response to the signal RHDLA, the refresh controller 215 takes control of the ISA bus I to run a refresh cycle. It is noted in the preferred embodiment, while the refresh cycle is running on the ISA bus I, the PCI arbiter 212 is free to rearbitrate its requests and to grant the PCI bus P to any PCI master that wins the arbitration, as explained above in FIGS. 3–14.

In state REF (FIG. 15), the SD arbiter state machine transitions back to state PCI if the signal REF_SD_REQ is deasserted, indicating that the refresh operation has completed. In the transition back to state PCI, an output signal IDE_MASK is equated to IDE_MASK and ISA_SD_REQ. The signal IDE_MASK is used to mask off the EDMA request line IDE_SD_REQ. Thus, the IDE request is masked if the signal IDE_MASK is already set high and the ISA request signal is high. When that condition is true, the priority in the next arbitration cycle belongs to the ISA bus I over the IDE request. The SD arbiter state machine stays in state REF when the REF_SD_REQ signal is asserted.

From state PCI, the state machine transitions to state IDE if the signals PCI_INACTIVE, !REF_SD_REQ, IDE_SD_REQ, and !IDE_MASK are all true. This indicates that a REFRESH request has not been asserted, the EDMA request line has been asserted, and the EDMA request line has not been masked by the IDE_MASK signal. In state IDE, a signal IDE_SD_GNT is asserted high and provided to the EDMA controller 204 to indicate it has been granted the ISA bus I. In state IDE, if the EDMA request line IDE_SD_REQ is deasserted by the EDMA state machine 230, the state machine transitions from state IDE to state PCI. Otherwise the state machine remains in state IDE. As explained above, the EDMA controller 204 can be preempted off the SD bus under two conditions: it can be bus master preempted by a request from the DMA controller 216, an ISA bus master, or the refresh controller 215; the EDMA controller 204 can be slave preempted by a PCI master desiring to run a cycle on the ISA bus I. In the transition from state IDE to state PCI, the signal IDE_MASK is equated with ISA_SD_REQ and !BLK_MASK. The signal BLK_MASK is asserted high by the EDMA controller 204 when it is slave preempted by a PCI master needing to run a cycle on the ISA bus I. Assertion of the signal BLK_MASK blocks masking of the IDE_SD_REQ signal by maintaining the signal IDE_MASK low.

The bus master preemption signal BM_PRE is provided by an OR gate 710 (FIG. 16A), which receives the signals ISA_SD_REQ and REF_SD_REQ, indicating that a refresh or a DMA request is pending. This causes the EDMA controller 204 to be bus master preempted, causing the IDE request line to be masked when it gives up the SD bus. After the ISA cycle or refresh cycle is completed, the IDE request line is unmasked.

Finally, the SD arbiter state machine transitions from state PCI to state ISA if the signals PCI_INACTIVE, !REF_SD_REQ, !EGNT_, and !ISA_MASK are all true and either the signal IDE_SD_REQ is deasserted or the signal IDE_MASK is asserted. This indicates that a REFRESH request has not been asserted, an IDE request has not been asserted or the IDE mask bit is set high, the ISA bus I has been granted access to the PCI bus P, and the EDMA controller 204 is not requesting the PCI bus P or running an IDE cycle on the PCI bus P. The ISA_MASK signal is provided by an OR gate 708, whose inputs receive signals IDE_REQ and IDE_BUSY. The signal IDE_REQ indicates that the EDMA controller 204 is requesting control of the PCI bus P, and the signal IDE_BUSY indicates that an IDE cycle is running on the PCI bus P.

In state ISA, a signal ISA_SD_GNT is asserted high. This indicates to the DMA controller 216 or ISA bus master that it now has control of the ISA bus I. The SD arbiter state machine remains in state ISA until the signal EGNT_ is deasserted high. In that case, the state machine transitions from state ISA back to state PCI, asserting the signal IDE_MASK low.

The logic for generating the signal IDE_MASK is described as follows. The signal IDE_MASK is provided by a D-type flip-flop 720, which is clocked by the signal PCICLK and reset by RST_. The D input of the flip-flop 720 is connected to the output of an AND gate 722, whose inputs are connected to the outputs of a NAND gate 724 and a multiplexor 726. The inputs of the NAND gate 724 receive the signal EGNT_ and a signal indicating that the SD arbiter is in state ISA. The 0 input of the multiplexor 726 receives the signal IDE_MASK, and the 1 input is connected to the output of an OR gate 730. The select input of the multiplexor 726 is connected to the output of an OR gate 728, whose inputs are connected to the outputs of AND gates 736 and 738. The inputs of the AND gate 736 receive the inverted state of the signal REF_SD_GNT and a signal indicating that the SD arbiter is in state REF, and the inputs of the AND gate 738 receive the inverted state of the signal IDE_SD_GNT and a signal indicating that the SD arbiter is in state IDE. The inputs of the OR gate 730 are connected to the outputs of AND gates 732 and 734. Two inputs of the AND gate 732 receive the signals IDE_MASK and ISA_SD_REQ, and the third input is connected to the output of the AND gate 736. Two inputs of the AND gate 734 receive the signal ISA_SD_REQ and the inverted state of the signal BLK_MASK, and the third input is connected to the output of the AND gate 738.

Thus, when the state machine transitions from state REF back to state PCI, the state of the signal IDE_MASK is determined by the output of the AND gate 732. When the state machine transitions from state IDE back to state PCI, the state of IDE_MASK is determined by the output of AND gate 734. When the state machine transitions from state ISA back to state PCI, the signal IDE_MASK is set low by the output of the NAND gate 724. If none of the above transitions are occurring, the signal IDE_MASK remains unchanged.

Figure 16A:
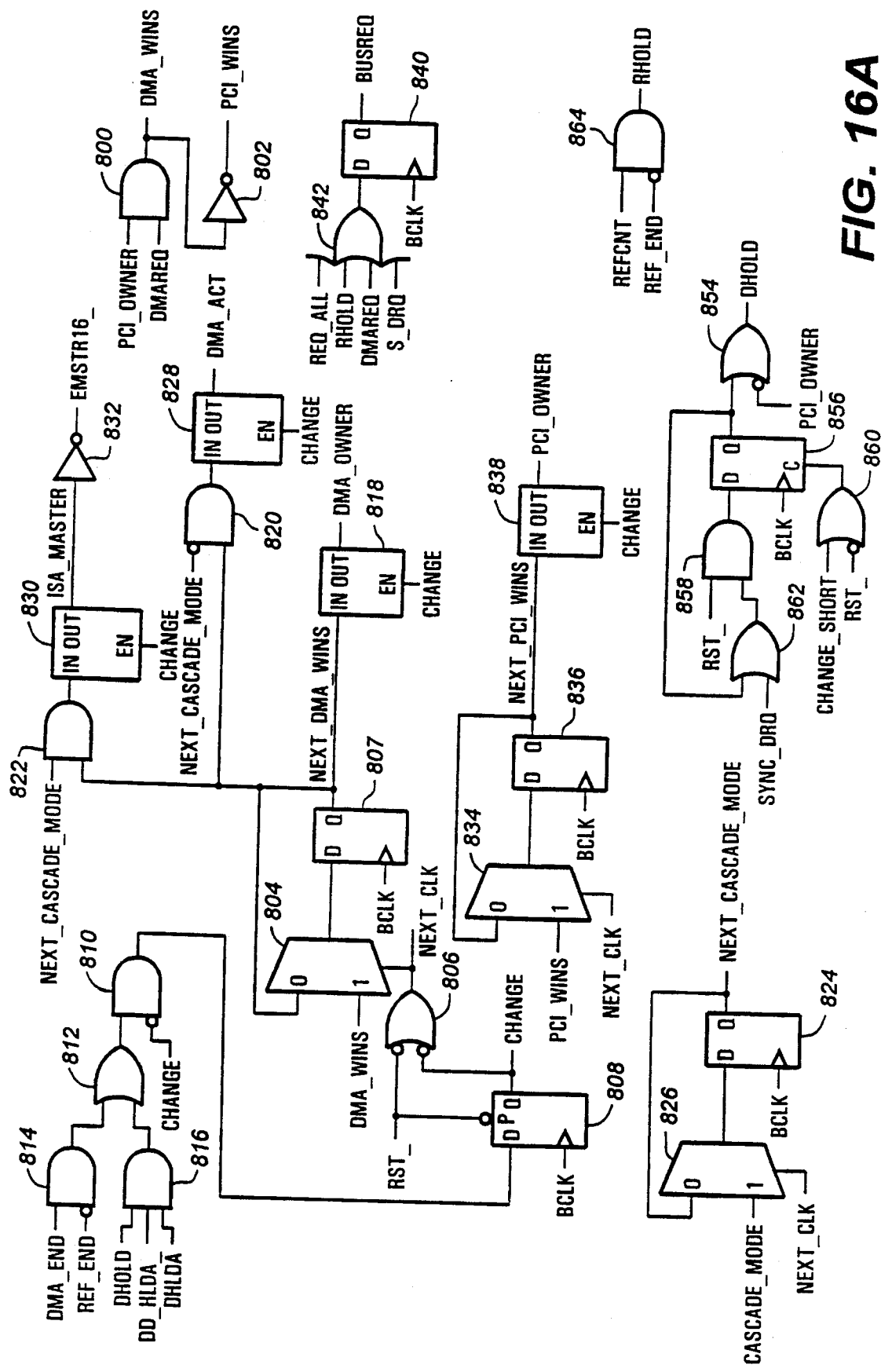
FIGS. 16A and 16B are a schematic diagram of logic in a DMA arbiter to control access of the DMA controller and ISA I/O devices to the ISA bus.
Figure 16B:
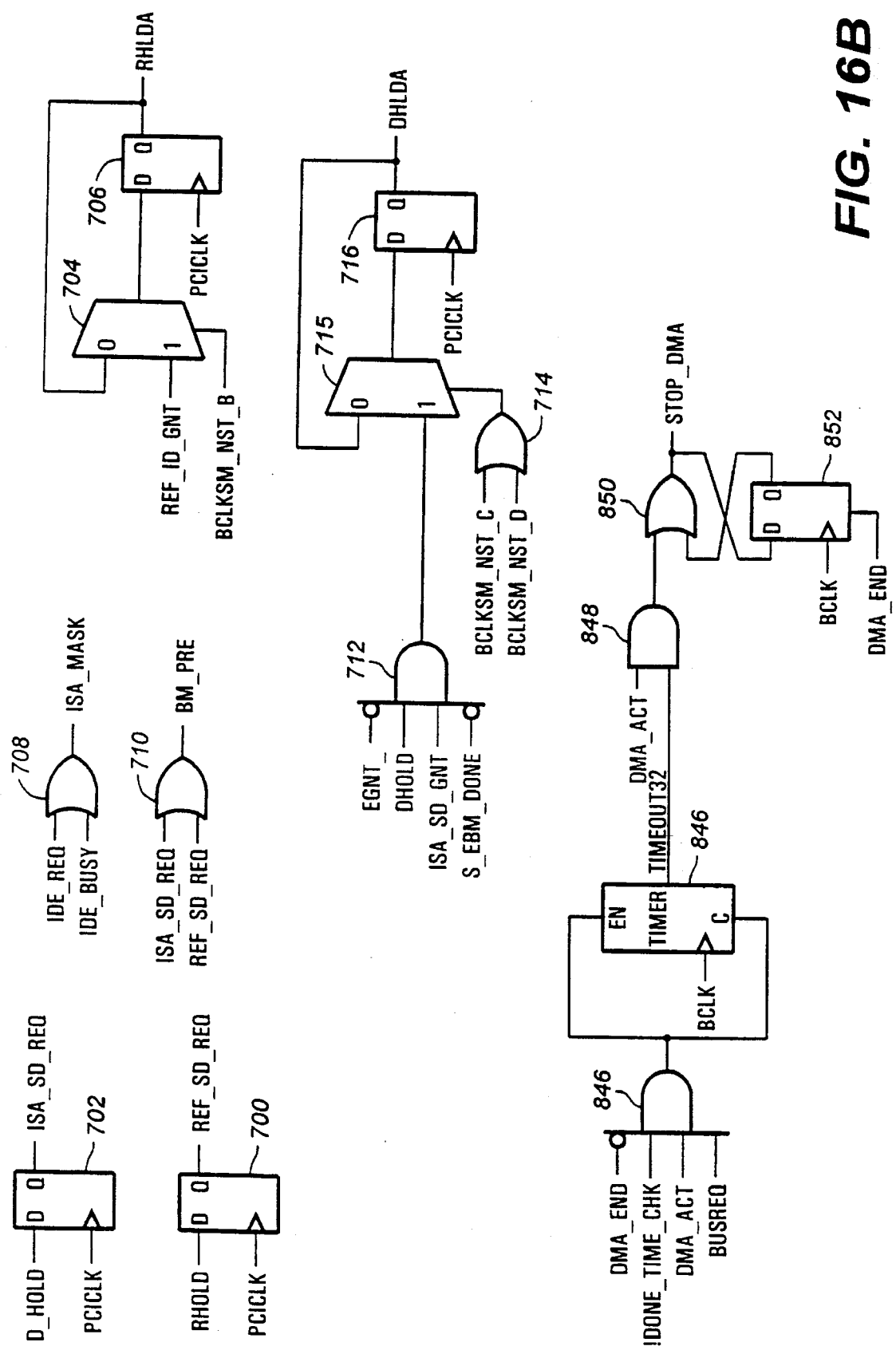

Referring now to FIGS. 16A and 16B, portions of the DMA controller 216 are shown. As explained earlier, arbitration for the ISA bus I is determined by a two way "ping-pong" priority system. The DMA controller 216 and the ISA bus masters are categorized as one requestor type, while the PCI masters, refresh controller 215 and EDMA controller 204 are categorized as the other requestor type. Once the DMA requestor type has gained control of the ISA bus I, it is assigned the lowest priority for the succeeding arbitration cycle. The first requestor type is indicated by a signal DMA_WINS, and the second requestor type is indicated by a signal PCI_WINS. The signal DMA_WINS is provided by an AND gate 800, whose inputs receive signals PCI_OWNER and DMAREQ. The signal PCI_OWNER indicates that the DMA controller 216 or a 16-bit ISA master is not currently the owner of the ISA bus I. As a result, the DMA requestor type should be given priority in the next arbitration cycle. The signal DMAREQ indicates that the DMA controller 216 has asserted a request. The signal DMA_WINS is provided to the input of an inverter 802, whose output drives the signal PCI_WINS.

The signal DMA_WINS is also provided to the 1 input of a multiplexor 804, whose output is connected to the D input of a D-type flip-flop 806. The flip-flop 806 is clocked on the rising edge of a signal BCLK_, which is the inverted version of the ISA system clock BCLK. The output of the flip-flop 806 provides a signal NEXT_DMA_WINS, which is fed back to the zero input of the multiplexor 804. The select input of the multiplexor 804 is connected to the output of a NAND gate 806, whose inputs receive a signal RST_ or system reset and a signal CHANGE. The output of the NAND gate 806 provides a signal NEXT_CLK, which is an indication to determine the next winner.

The signal CHANGE is provided by the non-inverting output of a D-type flip-flop 808, which is clocked by the BCLK signal. The flip-flop 808 is preset high by the system reset signal RST_. The D input of the flip-flop 808 is connected to the output of an AND gate 810, whose first input receives the inverted state of the signal CHANGE and whose second input is connected to the output of an OR gate 812. The inputs of the OR gate 812 are connected to the outputs of AND gate 814 and 816. The first input of the AND gate 814 receives a signal DMA_END or end of DMA cycle, and the second input receives the inverted state of a signal REF_END or refresh end cycle. The inputs of the AND gate 816 receive signals DHOLD, which when asserted indicates a request from the DMA controller 216 or an ISA bus master, a signal DHLDA or the DMA grant acknowledge signal, and a signal DD_HLDA_ which is the inverted version of DHLDA delayed by one BCLK clock. Assertion of the signal CHANGE thus indicates the end of a DMA cycle or the grant of a new DMA request. Assertion of the signal CHANGE causes the priority between the first requestor type and the second requestor type to toggle.

The acknowledge signal DHLDA is provided by the PCI interface portion of the ISA bus controller 214. It is driven by the non-inverting output of a D-type flip-flop 716, which is clocked by the PCICLK signal. The D input of the flip-flop 716 is provided by a multiplexor 715, whose 1 input is connected to the output of an AND gate 712 and whose 0 input is connected to the signal DHLDA. The select input of the multiplexor 715 is connected to the output of an OR gate 714. The inputs of the OR gate 714 receive signals BCLKSM_NST_C and BCLKSM_NST_D. The inputs of the AND gate 712 receive signals DHOLD, ISA_SD_GNT, the inverted state of signal EGNT_, and the inverted state of a signal S_EBM_DONE. The signal S_EBM_DONE indicates that the PCI master logic 206 is executing a posted write cycle on the PCI bus P. Thus, in response to a DHOLD request, assertion of the EGNT_ signal, and assertion of the grant signal ISA_SD_GNT by the SD arbiter 212, and the ISA bus controller 214 is not currently completing a data transfer operation, the grant acknowledge signal DHLDA is asserted on the rising edge of PCICLK while the BCLK signal is falling low or is already low, as indicated by the signals BCLKSM_NST_C and BCLKSM_NST_D, respectively. This ensures that the signal DHLDA satisfies various setup and hold time requirements with respect to the DMA controller 216.

The signal NEXT_DMA_WINS provided by the flip-flop 807 is provided to the input of a latch 818, one input of an AND gate 820 and one input of an AND gate 822. The output of the latch is a signal DMA_OWNER, and the latch is enabled by the signal CHANGE. Thus, when the state of the signal CHANGE is asserted high, the state of the signal NEXT_DMA_WINS is passed through the latch 818 to the signal DMA_OWNER. The signal DMA_OWNER indicates that the DMA controller 216 or an ISA bus master has priority in the current arbitration cycle.

The other input of the AND gate 820 is connected to the inverted state of a signal NEXT_CASCADE_MODE, which is provided by the non-inverting output of a D-type flip-flop 824. The flip-flop 824 is clocked by the signal BCLK_, and its D input is connected to the output of a multiplexor 826. The 0 input of the multiplexor 826 is connected to the signal NEXT_CASCADE_MODE and the 1 input is connected to a signal CASCADE_MODE. The signal CASCADE_MODE indicates that the selected channel of the DMA controller 214 can be programmed in cascade mode. When a channel is programmed in cascade mode, that allows the ISA bus master assigned to that channel to request access to the ISA bus I through the DMA controller 216. In the preferred embodiment, each of the seven channels in the DMA controller 216 can be programmed in cascade mode. As each channel is programmed in cascade mode, arbitration for the ISA bus I between the ISA bus masters are determined by the arbitration scheme for 8237-compatible DMA channels. A 16-bit ISA bus master requests access to the ISA bus I by asserting its DRQ signal.

The output of the AND gate 820 drives the input of a latch 828, whose output provides a signal DMA_ACT. The enable input of the latch 828 is connected to the signal CHANGE. For compatibility reasons, the DMA controller 214 when programmed in the cascade mode or the ISA compatible timing cannot be preempted, i.e., it can own the ISA bus I for as long as it wishes. However, if a particular channel in the DMA controller 214 is not programmed to cascade mode or for compatible timing, then that channel can be preempted, causing the DMA controller 216 to relinquish control of the ISA bus I if a bus request is indicated by a signal BUSREQ. Assertion of the signal DMA_ACT indicates that the particular channel has not been programmed to cascade mode and therefore the channel can be preempted. Further, assertion of the signal DMA_ACT indicates that the DMA controller 216 has control of the ISA bus I.

As noted, the signal NEXT_DMA_WINS is also provided to one input of the AND gate 822, whose other input receives the signal NEXT_CASCADE_MODE. The output of the AND gate 822 is connected to the input of a latch 830, whose output provides a signal ISA_MASTER. The enable input of the latch 830 is connected to the signal CHANGE. The signal ISA_MASTER is provided to an inverter 832, which drives the signal EMSTR16_. The signal EMSTR16_ indicates that the ISA bus I has been granted to a 16-bit ISA bus master, rather than the DMA controller 216.

The signal PCI WINS is provided to the 1 input of a multiplexor 834, whose output is connected to the D input of a D-type flip-flop 836. The flip-flop 836 is clocked by the signal BCLK_ and provides a signal NEXT_PCI_WINS at its non-inverting output. The signal NEXT_PCI_WINS is fed back to the 0 input of the multiplexor 834. The select input of the multiplexor 834 receives the signal NEXT_CLK. The signal NEXT_PCI_WINS is provided to the input of a latch 838, whose output provides a signal PCI_OWNER indicating that a PCI bus master or the refresh controller 215 is the winner in the current arbitration cycle. The enable input of the latch 838 receives the signal CHANGE.

The following shows the logic necessary to preempt a DMA channel off the ISA bus I. The BUSREQ signal is provided by a D-type flip-flop 840, which is clocked by the signal BCLK_. The D input is connected to the output of an OR gate 842, which receives signals REQ_ALL or the request signals from the PCI masters, the signal RHOLD or the refresh request, the signal DMAREQ, and a signal S_DRQ or the synchronized EDMA request. Thus, a request by a PCI master, the refresh controller 215, the DMA controller 214, or the EDMA controller 204 causes the signal BUSREQ to be asserted high. The signal BUSREQ is provided to one input of a 4-input AND gate 844 (FIG. 16B), whose other inputs receive signals DMA_ACT, EN_DMA_TIME_CHK, and the inverted state of the signal DMA_END. The signal EN_DMA_TIME_CHK is an enable bit that is set high to enable DMA time out. The output of the AND gate 844 is provided to the enable input of a timer 846, which is clocked by the signal BCLK. The timer 846 is a 5-bit counter that drives a signal TIMEOUT32 high when it counts to the value 31. The inverted state of the AND gate 844 is connected to the clear input of the timer 846. Thus, when the timer 846 is not enabled, it is cleared to the value 0. The signal TIMEOUT32 is provided to one input of an AND gate 848, whose other input receives a signal DMA_ACT. The output of the AND gate 848 is connected to one input of an OR gate 850. The output of the OR gate 850 drives a signal STOP_DMA, which causes the DMA controller 214 to be forced off the ISA bus I. The signal STOP_DMA is provided to the D input of a D-type flip-flop 852, which is clocked by the signal BCLK. The non-inverting output of the flip-flop 852 is connected to the other input of the OR gate 850. The clear input of the flip-flop 852 is connected to the signal DMA_END. Generally, the signal DMA_END is asserted high at the end of a DMA cycle by the DMA controller. However, assertion of the signal STOP_DMA also causes the DMA controller to assert the signal DMA_END high on the next rising edge of BCLK. As a result, one BCLK cycle after assertion of the signal STOP_DMA, the signal DMA_END is asserted high to clear the flip-flop 852.

The signal DHOLD indicating a request from the DMA controller 216 or an ISA bus master is provided by an OR gate 854 (FIG. 16A). As noted above, the signal DHOLD is provided to the SD arbiter 212. One input of the OR gate 854 receives the inverted state of the signal PCI_OWNER, while the other input is connected to the output of a D-type flip-flop 856. Thus, the signal DHOLD is allowed to be asserted only if a PCI master does not currently have priority. The flip-flop 856 is clocked by the signal BCLK, and its D input is connected to the output of an AND gate 858. The clear input of the flip-flop 856 is connected to the output of an OR gate 860. The first input of the OR gate 860 receives the inverted state of the signal RST_ and the second input receives a signal CHANGE_SHORT, which is pulsed high for half a BCLK cycle when the signal CHANGE is asserted high. One input of the AND gate 858 receives the signal RST_ and the other input is connected to the output of an OR gate 862. The first input of the OR gate 862 is connected to the output of the flip-flop 856, and the other input receives a signal SYNC_DRQ or a synchronized DMA request. Thus, upon assertion of a DMA request, the signal DHOLD is asserted high on the next rising edge of BCLK if the system reset signal RST_ is deasserted and the signal PCI_OWNER is low.

Effectively, the ping-pong or alternating priority scheme between the first requestor type and the second requestor type forces the DMA controller 216 or 16-bit ISA bus master to give up control of the ISA bus I after it has control for one arbitration cycle. As a result, this gives the SD arbiter 212 the opportunity to provide access to the ISA bus to a PCI bus master, the EDMA controller 204, or the refresh controller 215.

The refresh request or RHOLD signal is provided by a two-input AND gate 864, which receives a signal REFCNT and the inverted state of a signal REF_END. The signal REFCNT indicates that the refresh queue is not empty, which indicates that a REFRESH is pending. In the preferred embodiment, a refresh cycle is needed approximately every 15 microseconds. The signal REF_END indicates the completion of a refresh cycle. As discussed above, the signal RHOLD is provided to the SD arbiter 212 to request control of the ISA bus I for the refresh controller 215.

Figure 17:
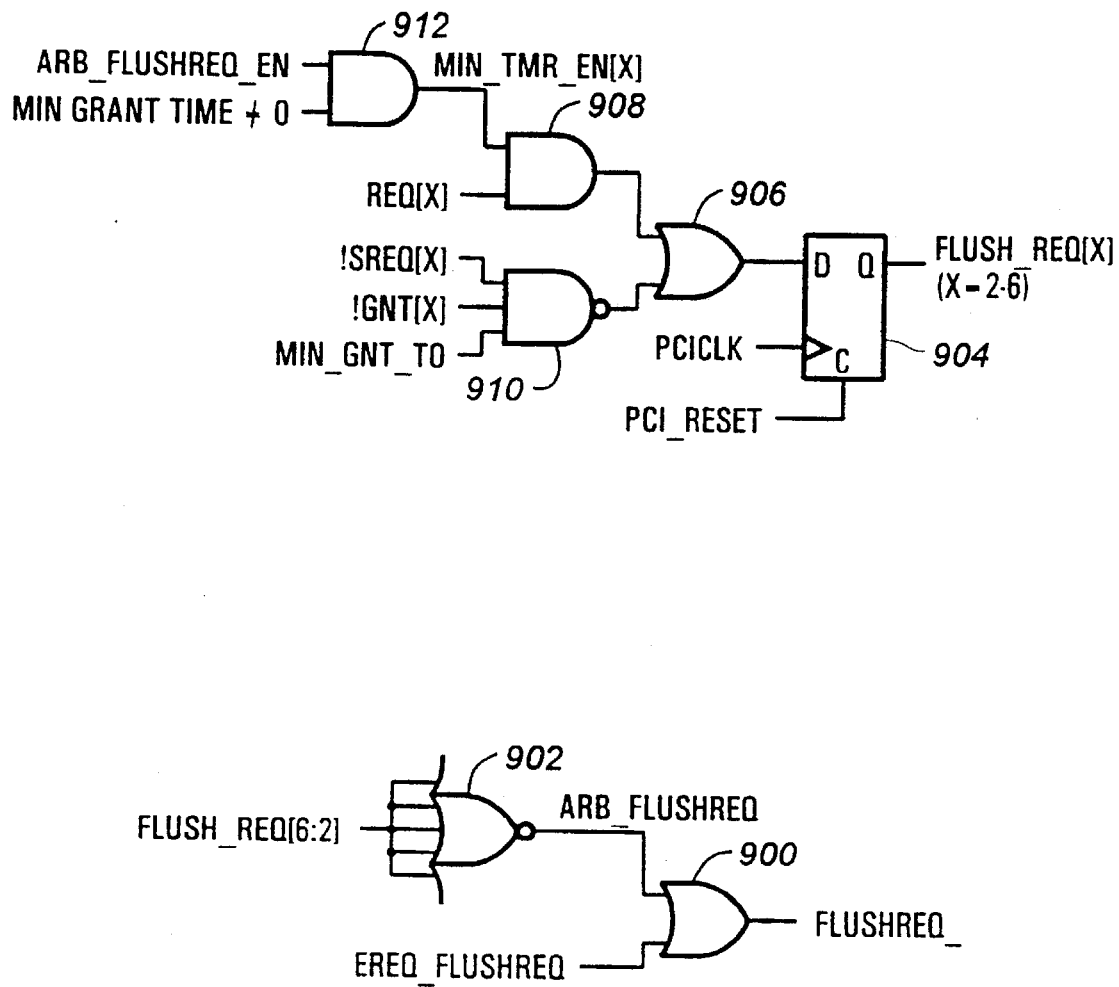
FIG. 17 is a schematic diagram of flush request logic in the computer system of FIG. 1.

Referring now to FIG. 17, logic in the flush request block 418 is shown. As noted above, a problem may arise when the CPU posts a write to the CPU-to-PCI queue of the bridge chip 110 for a processor-to-PCI write cycle, or when the PCI bus is locked by the bridge chip 110, particularly when the bridge chip 110 is implemented with the Intel 82434X bridge chip. With the Intel chip, any attempt by a PCI master to access main memory 214 while either of the above two conditions is true will result in the bridge chip 110 asserting a retry to the PCI master. Thus, if the minimum grant timer 414 for the PCI master is enabled (that is, not loaded with the value 0), then this will result in the PCI master not transferring any data for the remainder of the minimum grant time. This adversely affects bus performance. To overcome this problem, the flush request logic 418 asserts the FLUSHREQ_ signal while one of the REQ[6:2] signals is asserted.

The signal FLUSHREQ_ is provided by a NOR gate 900, whose first input receives a signal EREQ_FLUSHREQ and whose second input is connected to the output of an OR gate 902. The signal EREQ_FLUSHREQ is asserted high when a state machine EREQ_SM (FIG. 18) in the PCI master logic 206 detects a request from the ISA bus I. The five inputs to the OR gate 902 are connected to signals FLUSH_REQ[6:2]. The signal FLUSH_REQ[X], X equal to 2-6, is provided by a D flip-flop 904. The D flip-flop 904 is clocked by PCICLK, and its clear input is connected to PCI_RESET. The D input of the flip-flop 904 is connected to the output of a two-input OR gate 906, whose first input is connected to the output of an AND gate 908 and whose second input is connected to the output of a three-input NAND gate 910. The inputs of the AND gate 908 receive signals REQ[X] and MIN_TMR_EN[X]. The signal REQ[X] is provided by the request mask logic 400. The signal MIN_TMR_EN[X] is provided by a two-input AND gate 912, whose first input receives a signal ARB_FLUSHREQ_EN which enables the assertion of the signal ARB_FLUSHREQ. The second input of the AND gate 912 is provided by a signal indicating that the minimum grant timer 414 for the selected PCI master is not loaded with the value zero.

The inputs of the AND gate 910 receive signals !SREQ[X], !GNT[X] and MIN_GNT_TO. Thus, once a PCI master other than the bridge chip 110 obtains control of the PCI bus P, the signal FLUSHREQ_ remains asserted until the bus master deasserts its request line. This prevents the bridge chip 110 from posting cycles to its write posting queue while a PCI master is accessing main memory 114.

As noted earlier in FIG. 14, further optimization is provided by clearing the minimum grant timer 414 when a retry occurs in the first cycle of a transaction. This allows another PCI master to gain control. However, the flush request signal FLUSHREQ_ is maintained asserted until the first PCI master is again able to get back onto the PCI bus P in the next arbitration cycle to complete its transaction.

Figure 18:
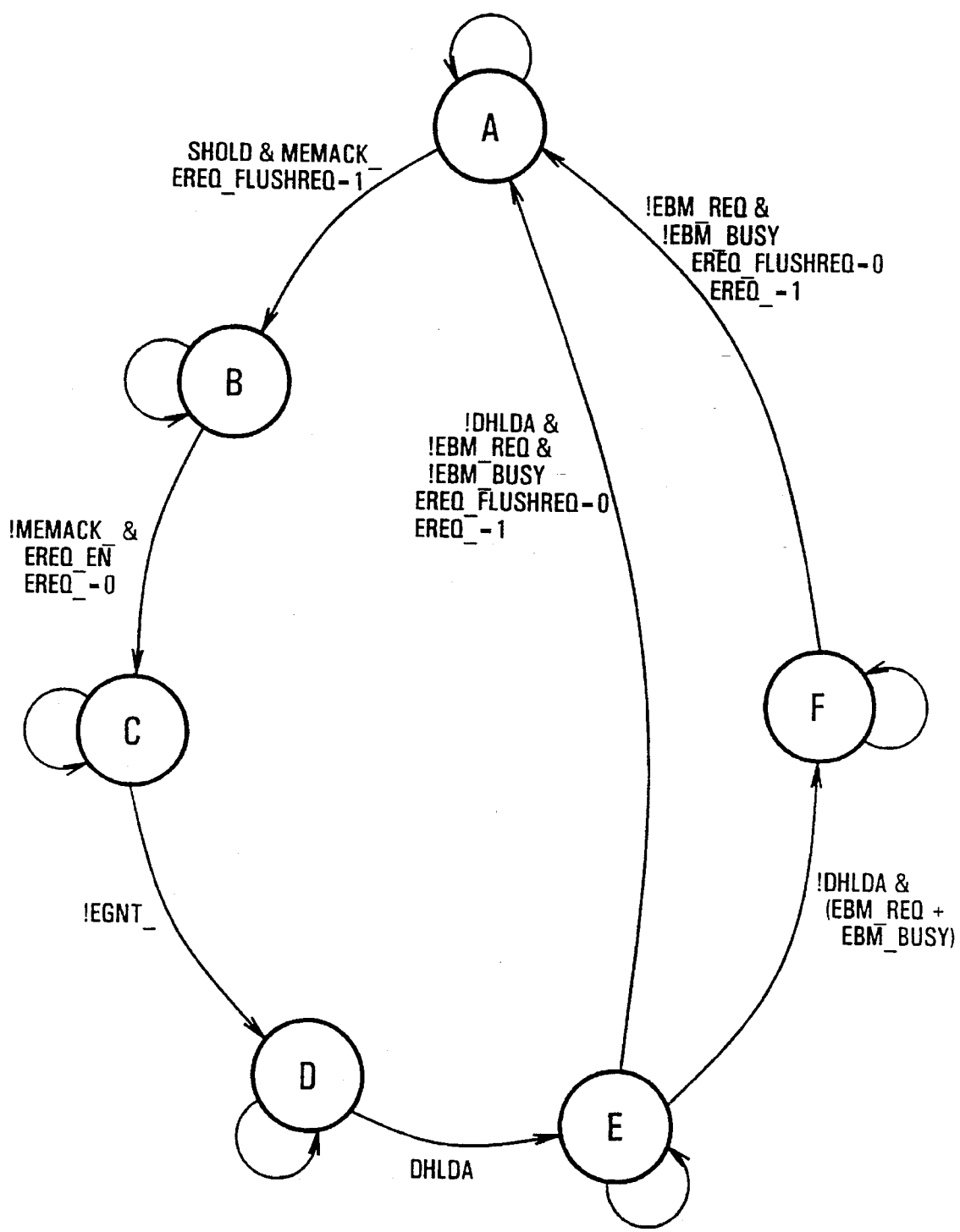
FIG. 18 is a state diagram of a state machine for monitoring requests from bus masters on the ISA bus of FIG. 1.

Referring now to FIG. 18, the state machine EREQ_SM is shown. On system reset RST_, the state machine enters state A. On the assertion of a signal SDHOLD or synchronized version of the DHOLD signal, and the assertion of a signal MEMACK_ for acknowledging the receipt of the signal FLUSHREQ_, the state machine transitions to state B. Thus, upon receipt of a request from the DMA controller 216, the state machine checks the state of MEMACK_ to ensure that another PCI master does not already have the signal FLUSHREQ_ asserted. In the transition to state B, the signal EREQ_FLUSHREQ is set high. It is noted that once the signal EREQ_FLUSHREQ is set to a particular value, its state remains unchanged until noted otherwise.

The state machine remains in state B until the signal MEMACK_ is asserted low to acknowledge the FLUSHREQ_ signal and a signal EREQ_EN is set high. The signal EREQ_EN indicates that the EDMA controller 216 is off the SD bus, that all the EDMA data buffers are flushed and that the EDMA controller 204 does not have the signal BLK_MASK asserted. As a result, sufficient time would be allowed for an ISA bus master to gain control of the ISA bus I.

Thus, if signals !MEMACK_ and EREQ_EN are true, the state machine transitions to state C and asserts the signal EREQ_ low to indicate to the PCI arbiter 210 a request from the ISA bus I. The signal EREQ_ once set low stays low until otherwise noted. The state machine remains in state C until the grant signal EGNT_ is asserted low by the PCI arbiter 210, which causes a transition to state D. Assertion of the signal EGNT_ causes the acknowledge signal DHLDA to be asserted by the ISA bus controller 214, at which time the state machine transitions to state E. The state machine remains in state E until the signal DHLDA is negated low. If both signals EBM_REQ and EBM_BUSY are deasserted low, the state machine transitions from state E back to the idle state A. The signal EBM_BUSY indicates that the PCI master logic 206 in the PCI-ISA bridge 130 is busy performing a transfer on the PCI bus P. The signal EBM_REQ is provided by the ISA bus master 214 and indicates that an ISA cycle is in progress and has not completed. In the transition from state E to state A, the signal EREQ_FLUSHREQ is deasserted low and the signal EREQ_ is deasserted high. If either of signals EBM_REQ OR EBM_BUSY is asserted high, the state machine transitions from state E to state F, where it remains until both signals EBM_REQ and EBM_BUSY are deasserted low. In the transition from state F to state A, the signals EREQ_FLUSHREQ and EREQ_ are deasserted.

Thus, an improved arbitration scheme has been described that includes multiple arbiters for arbitrating access to a PCI bus and an ISA bus. The PCI arbiter controls access to the PCI bus by various bus masters, including the CPU/main memory subsystem, various other PCI bus masters, the EDMA controller, and an 8237-compatible DMA controller. The PCI arbiter utilizes a modified LRU arbitration scheme. The EDMA controller controls data transfers between IDE devices and main memory. An SD arbiter exists to arbitrate access to the data portion (SD) of the ISA bus. The various devices that may request the SD bus include the EDMA controller, a PCI master in a PCI-to-ISA operation, the DMA controller, an ISA bus master, and the refresh controller. The SD arbiter generally assigns the highest priority to the PCI bus, followed by the refresh controller, EDMA controller, and DMA controller or ISA bus masters, noting that signals ISA_MASK and IDE_MASK may modify priority under certain cases. The DMA controller includes an arbiter for arbitrating between its channels. The DMA arbiter further includes logic to ensure that the DMA controller or ISA bus master relinquishes control of the ISA bus after one arbitration cycle.

Figure 19:
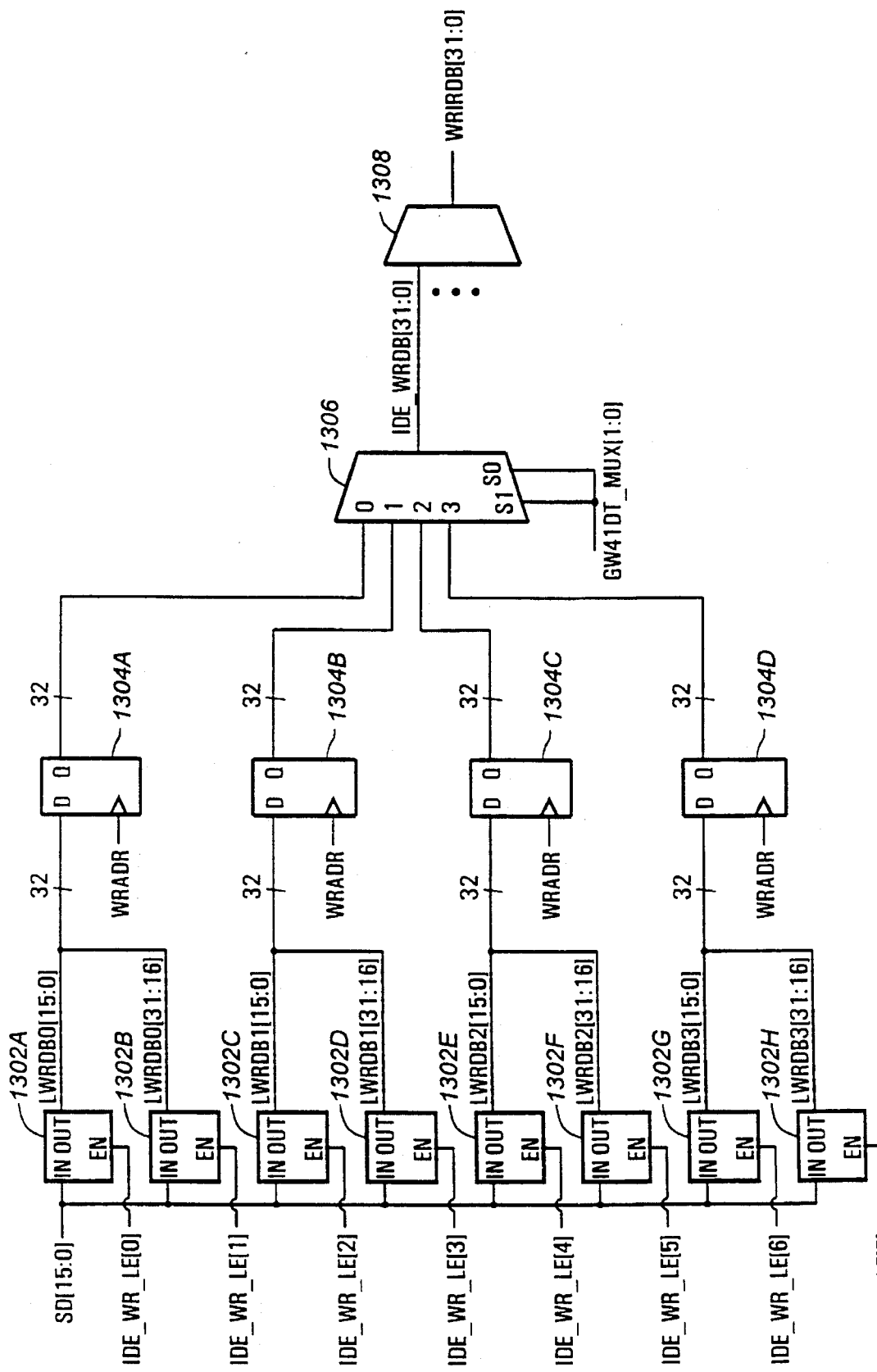
FIG. 19 is a schematic diagram of write data buffers in the PCI-ISA bridge of FIG. 2.

As noted above, the PCI master logic 206 (FIG. 2) includes two four-double-word buffers 209A and 209B in the path from the IDE devices to main memory 114. Referring now to FIG. 19, the first set of four-double-word buffers 209A comprise latches 1302A–H. The inputs to the latches 1302A–H are connected to the 16-bit SD bus or SD[15:0]. The enable inputs of the latches 1302A–H are connected, respectively, to write latch enable signals IDE_WR_LE[0:7]. The outputs of the latches 1302A–H provide, respectively, LWRDB0[15:0], LWRDB0[31:16], LWRDB1[15:0], LWRDB1[31:16], LWRDB2[15:0], LWRDB2[31:16], LWRDB3[15:0], and LWRDB3[31:16]. Thus, when a latch enable signal IDE_WR_LE[X] is asserted high, the state at the input of the corresponding latch will be passed through to the output of the latch.

The second set of four-double-word buffers 209B comprise four 32-bit registers 1304A–D, which are all clocked on the rising edge of an address/data register clock or a signal WRADR provided by the PCI master logic 206 to latch in PCI address and data at appropriate times during PCI cycles. In this case, the WRADR signal is used to clock in the data from the first stage buffers 1302A–H into the second stage buffers 1304A–D during the data phase of the PCI master logic 206. The inputs of the registers 1304A–D are connected, respectively, to signals LWRDB0[31:0], LWRDB1[31:0], LWRDB2[31:0], and LWRDB3[31:0], and their outputs provide signals RWRDB0[31:0], RWRDB1[31:0], RWRDB2[31:0], and RWRDB3[31:0], which are in turn provided to the 0, 1, 2 and 3 inputs of a multiplexor 1306, respectively. The output of the multiplexor 1306 provides signals IDE_WRDB[31:0], which are provided to an input of a multiplexor 1308. The multiplexor 1308 drives signals WRIRDB[31:0], which drive data to the PCI data bus PCIAD[31:0] during the data portion of a PCI cycle. The other inputs of the multiplexor 1308 are the write data in an ISA-to-PCI (including DMA) transaction, read data in a PCI-to-ISA transaction, data from internal registers in the PCI-ISA bridge 130, and read data during I/O cycles.

The S1 and S0 select inputs of the multiplexor 1306 receive signals GW41DT_MUX[1:0], respectively. The signals GW41DT_MUX[1:0] are provided by the PCI master logic 206 to route the appropriate double word of data onto the PCI data bus PCIAD during the data transfer phase of a PCI write cycle.

Figure 20:
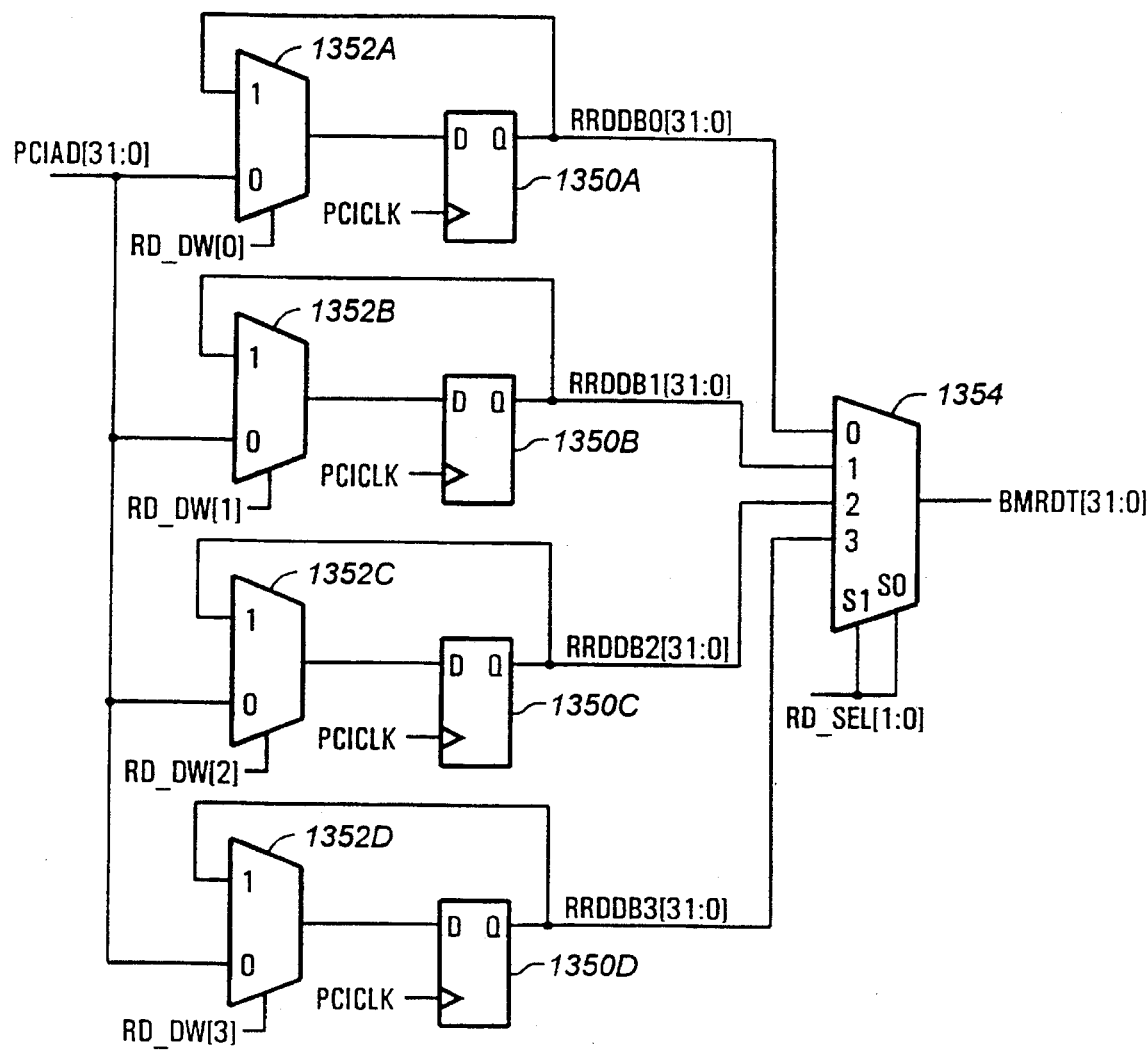
FIG. 20 is a schematic diagram of a read data buffer in the PCI-ISA bridge of FIG. 2.
Figure 20:
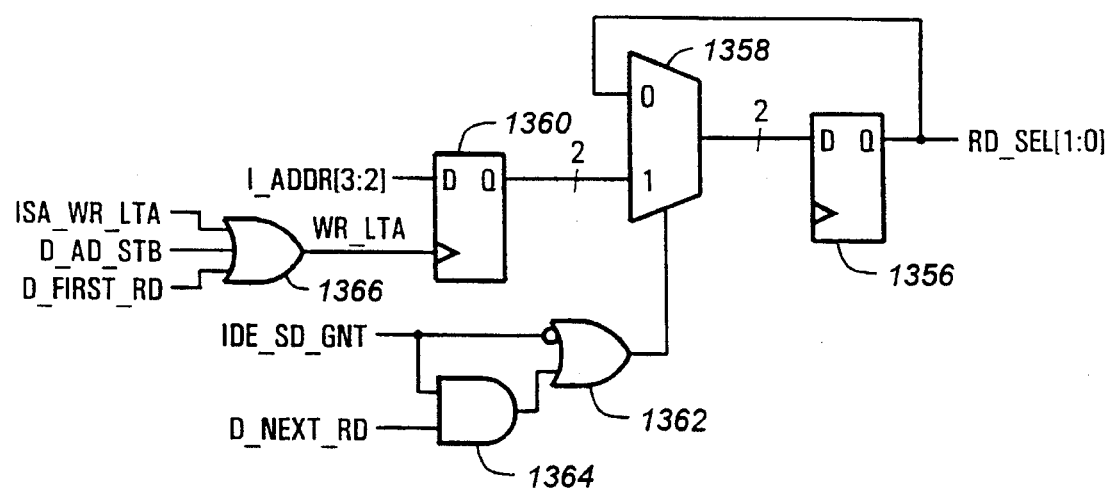

As noted above, there is only one four-double-word buffer 211 for disk writes (EDMA reads). It is noted that the buffers 211 are also used for PCI-to-ISA transfers controlled by the DMA controller 216 or ISA bus masters. As shown in FIG. 20, the read buffer comprises four 32-bit registers 1350A–D, all clocked on the rising edge of PCICLK. The inputs of the registers 1350A–D are connected to the outputs of multiplexors 1352A–D. The select inputs of the multiplexors 1352A–D receive, respectively, signals RD_DW[0:3]. The 0 inputs of the multiplexors 1352A–D are connected to the PCI address/data bus PCIAD[31:0]. The 1 inputs of the multiplexors 1352A–D are connected to the outputs of registers 1350A–D, respectively, which are referred to as signals RRDDB0[31:0], RRDDB1[31:0], RRDDB2[31:0], and RRDDB3[31:0]. The PCI master logic 206 drives the RD_DW[X] signal low to indicate when an appropriate double word of data is valid on the PCI data bus PCIAD for transfer into the read buffer 211.

The outputs of the registers 1350A–D are provided to the 0, 1, 2 and 3 inputs of a multiplexor 1354, whose output provides signals BMRDT[31:0]. The signals BMRDT[31:0] are multiplexed onto the 16-bit SD bus for data transfer to the selected IDE device. The S1 and S0 select inputs of the multiplexor 1354 receive signals RD_SEL[1:0].

The signals RD_SEL[1:0] are provided by a 2-bit register 1356, which is clocked by PCICLK. The input of the register 1356 is connected to the output of a 4-to-2 multiplexor 1358, whose 0 input receives the signals RD_SEL[1:0] and whose 1 input is connected to the output of a register 1360. The select input of the multiplexor 1358 is connected to the output of an OR gate 1362, whose first input receives the inverted state of the signal IDE_SD_GNT and whose second input is connected to the output of a two-input AND gate 1364. The inputs of the AND gate 1364 receive signals IDE_SD_GNT and D_NEXT_RD. As described earlier in FIG. 15, the signal IDE_SD_GNT indicates that the SD bus has been granted to the EDMA controller 204. The IDE next read signal D_NEXT_RD is provided by the IDE state machine 252 and indicates when the next address is available to adjust the data multiplexed select signals RD_SEL[1:0] and to indicate a buffer HIT_MISS_.

The register 1360 is clocked by the rising edge of a signal WR_LTA, and its D input receives address signals I_ADDR[3:2], which are bits 3 and 2 of the IDE address. The signal WR_LTA is provided by the output of a three-input OR gate 1366, whose inputs receive an ISA bus master or DMA address latch signal ISA_WR_LTA, an IDE address strobe D_AD_STB, and an IDE first read signal D_FIRST_RD.

As explained above, the timing for an EDMA transfer is completely user programmable via PCI configuration I/O registers. There exists one set of configuration timing registers for the primary IDE devices 230 and another set of configuration timing registers for the secondary IDE devices 232. In addition to the total cycle time of an IDE transfer being programmable, the active period and inactive period within each EDMA cycle are also programmable. Thus, referring now to FIG. 21, there is a primary active timing register 1600, a secondary active timing register 1602, a primary inactive timing register 1604, and a secondary inactive timing register 1606. The registers 1600–1606 are 5-bit devices having their inputs connected to the outputs of multiplexors 1608, 1610, 1612 and 1614, respectively. The 0 inputs of the multiplexors 1608, 1610, 1612 and 1614 are connected to the outputs of the registers 1600, 1602, 1604 and 1606, respectively. The 1 inputs of the multiplexors 1608 and 1610 receive signals PCI_WRDT[4:0] which are latched versions of the PCI write data from the PCI data bus PCIAD. The 1 inputs of multiplexors 1612 and 1614 receive signals PCI_WRDT[12:8]. The select inputs of the multiplexor 1608, 1610, 1612 and 1614 receive signals TIMSEL0, TIMSEL1, TIMSEL2 and TIMSEL3, respectively. Signals TIMSEL[0:3] are asserted during configuration write cycles to program the registers 1600–1606 with the desired values to control the active and inactive periods of an EDMA cycle. Each of the registers 1600–1606 are clocked on the rising edge of the signal PCICLK, and are preset high by the inverted PCI reset or PCI_RESET_ signal.

The output of the register 1600 and the output of the register 1602 are connected to the 1 and 0 inputs of a multiplexor 1624, respectively. The multiplexor 1624 is selected by a primary/secondary signal PRI_SEC_, which when set high indicates the selection of a primary master or slave IDE device. The outputs of the registers 1604 and 1606 are connected to the 1 and 0 inputs of a multiplexor 1628, respectively, which is also selected by the signal PRI_SEC_. The outputs of the multiplexors 1624 and 1628 are provided to the 1 and 0 inputs of a multiplexor 1630, respectively, which is selected by a signal ACT_INACT_ to indicate the selection of the active or inactive time period.

When high, the signal ACT_INACT_ indicates the active period. The output of the multiplexor 1630 is connected to the 1 input of a multiplexor 1632, whose select input receives a signal LOAD_TIME. The output of the multiplexor 1632 provides signals M_CNT[4:0], which are provided to the input of a decrementer 1634. The output of the decrementer 1634, referred to as signals S_CNT[4:0], are connected to one input of a comparator 1638 and the input of a 5-bit register 1636. The comparator 1638 asserts a signal TIME_CNT_0 high when the signal S_CNT[4:0] reaches the value 0. The register 1636 is clocked on the rising edge of PCICLK and is cleared by the signal PCI_RESET_. The output of the register 1636 is fed back to the 0 input of the multiplexor 1632. Thus, the combination of the multiplexor 1632, the decrementer 1634, the register 1636, and the comparator 1638 form an active/inactive timer 1631, which begins counting from the value indicated in one of the primary or secondary timing registers 1600, 1602, 1604 or 1606. The signal TIME_CNT_0 when asserted indicates the end of either the active or inactive portion of an EDMA transfer.

Figure 21:
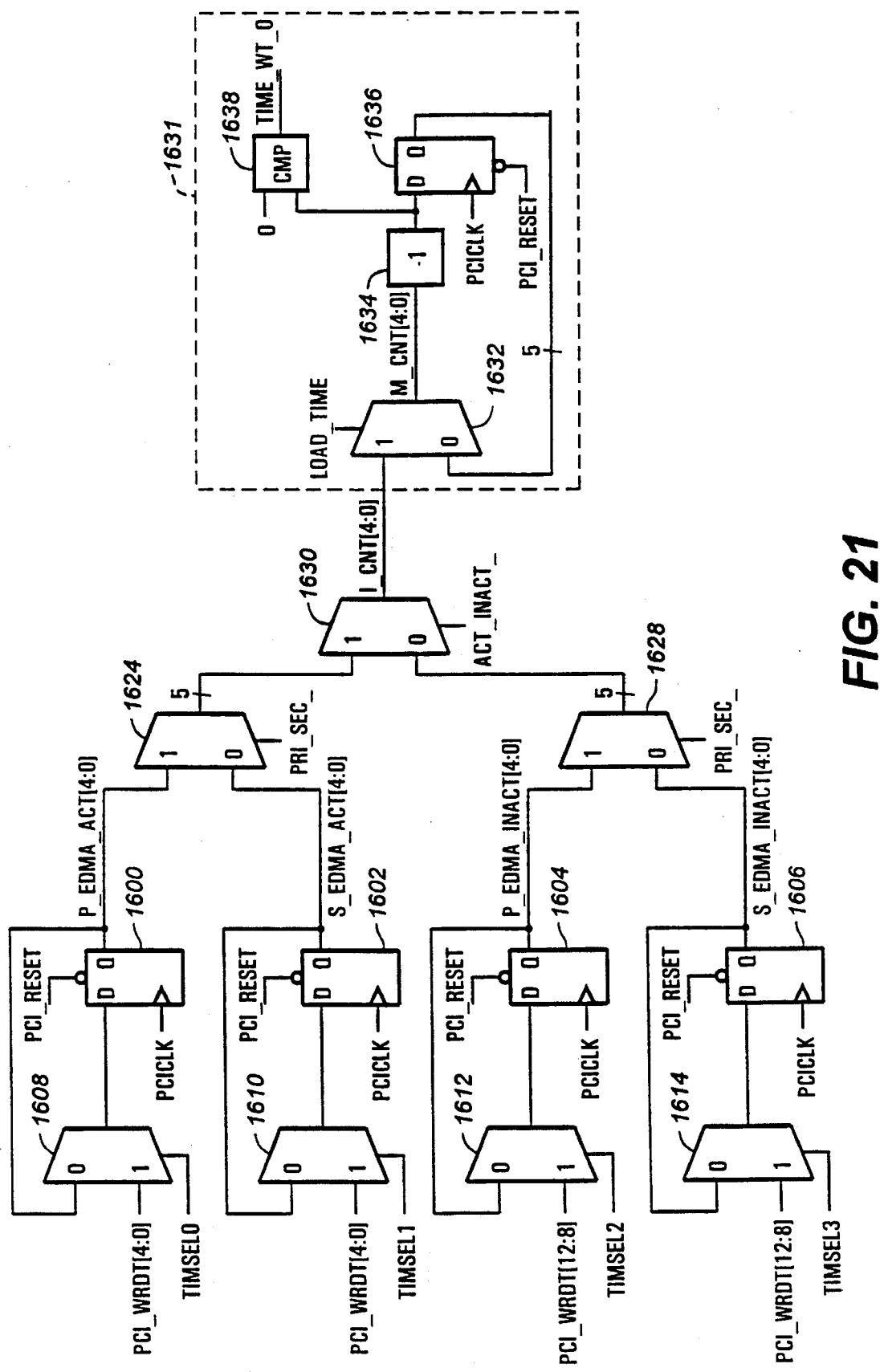
FIG. 21 is a schematic diagram of active and inactive timing registers defining the DMA transfer timing.

Thus, in accordance with the present invention, FIG. 21 shows the logic necessary to enable the programmability of the timing of an EDMA transfer.

Figure 22:
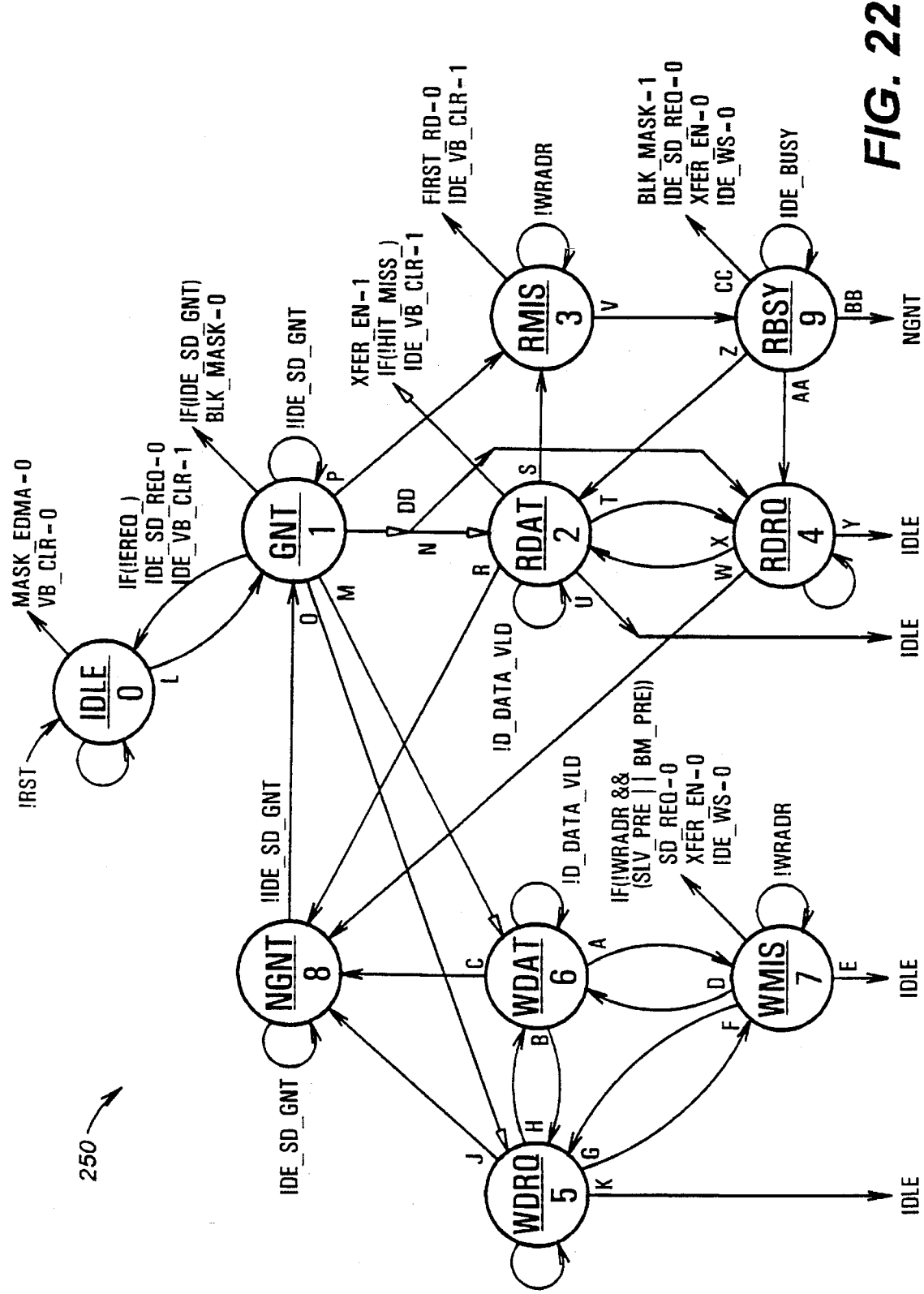
FIG. 22 is a state diagram of an EDMA state machine for controlling write and read DMA transfers.

Referring now to FIG. 22, the state diagram of the EDMA state machine 250 in the EDMA controller 204 is shown. The output signals provided by the EDMA state machine 250 include a "D_" to indicate connection to the D input of a corresponding D-type flip-flop clocked by PCICLK and cleared by the system reset RST_. The output of the flip-flop is the signal name without the "D_" prefix. In the ensuing discussion, the output signals of the EDMA state machine 250 maintain their state until changed. The exceptions are signals D_DRQ_PRE and D_FIRST_RD, which are set low on each PCICLK signal unless otherwise indicated.

On system reset, indicated by !RST_, the EDMA state machine 250 enters state IDLE. The state machine transitions out of state IDLE to state GNT if signals !IDE_SD_GNT, !IDE_BUSY, and D_IDE_IDLE are all true, the EREQ_ signal is deasserted or high, and either a primary or secondary IDE device is requesting service by the S_IDE_DRQ_P or S_IDE_DRQ_S signals. The signal IDE_SD_GNT, asserted by the SD arbiter 212 to indicate to the EDMA controller 204 that it has control of the SD bus, is checked to ensure that it is deasserted to prevent the possibility of having data from both the primary and secondary devices in the write buffers 209A and 209B. The signal IDE_BUSY being deasserted low indicates that the PCI master logic 206 is not busy with a previous write cycle. If there are still posted data in the write buffers, the signal IDE_BUSY will be asserted. The signal EREQ_ is checked to ensure that a request for the PCI bus P is not asserted by one of the ISA bus masters. The signal D_IDE_IDLE asserted indicates that the IDE state machine 252 is idle.

In the transition from state IDLE to state GNT, the signal D_IDE_SD_REQ is asserted high and provided to the SD arbiter 212 to indicate a request for the SD bus. Further, the primary/secondary signal D_PRI_SEC_ and latched write/read signal D_IDE_LW_R are assigned values depending on the state of signals S_IDE_DRQ_P (synchronized primary IDE device request) or S_IDE_DRQ_S (synchronized secondary IDE device request). If the signal S_IDE_DRQ_P is asserted, then the signal D_PRI_SEC_ is set high to indicate data transfer involving the primary IDE device. The signal D_IDE_LW_R_ is set equal to the state of a signal PRI_EDMA_W_R_ which is latched during a PCI I/O cycle to a primary IDE device and indicates if the IDE request is a read (high) or a write (low). If the signal S_IDE_DRQ_S is high, then the signal D_PRI_SEC_ is set low to indicate that the transfer involves the secondary IDE device, and the signal D_IDE_LW_R_ is set equal to the state of SEL_EDMA_W_R.

The state machine remains in state GNT until the signal IDE_SD_GNT is asserted by the SD arbiter 212 to indicate that the EDMA controller 204 has been granted control of the SD bus. There are six possible transitions out of state GNT. In all transitions out of state GNT, the signal D_BLK_MASK is set low. As indicated above, when the EDMA controller 204 is slave preempted by a PCI master, the EDMA controller 204 asserts the signal BLK_MASK to prevent masking of the IDE request in the next arbitration cycle. If the signal EREQ_ is asserted low, indicating an active request for the PCI bus P from an ISA bus master, the state machine returns to state IDLE. In the transition, the signal D_IDE_SD_REQ is set low indicating that the EDMA controller 204 is no longer requesting the SD bus, and a signal D_IDE_VB_CLR or IDE read cycle valid bit clear is set high.

If the signal EREQ_ is deasserted, the signal D_IDE_LW_R_ is set high to indicate a write cycle, and the signal S_DRQ is asserted indicating a request from one of the IDE devices, then a data write transfer from the IDE device to main memory 114 is ready to begin and the state machine transitions to state WDAT. The signal S_DRQ is provided by a multiplexor 1500 (FIG. 23B), whose 0 and 1 inputs receive the signal S_IDE_DRQ_S and S_IDE_DRQ_P, respectively. The select input of the multiplexor 1500 receives the signal PRI_SEC_. If the signal S_DRQ is deasserted, indicating that the primary or secondary IDE device is not yet ready to perform the write data transfer, the state machine transitions from state GNT to state WDRQ. In the transition from state GNT to state WDAT, a signal D_XFER_EN is set high for indicating that data transfer is enabled and for triggering the IDE state machine 252. In the transition to state WDRQ, the signal D_XFER_EN set low. In the transition to either state WDRQ or WDAT, the signal D_IDE_WS is set low. The signal IDE_WS is provided to the IDE state machine 252 to place it in a wait state while the write data buffer 209B is being emptied.

In state GNT, if the signal IDE_LW_R_ is set low indicating a read cycle, a signal HIT_MISS_ is asserted high, and the signal S_DRQ is asserted high, then the state machine transitions to state RDAT. The signal HIT_MISS_ is asserted high during a read cycle if the address is in the same page (i.e. address bits 4–27 of the current IDE cycle are the same as the previous cycle) and the data associated with the current address is indicated as being valid. The read data is indicated as being valid if the appropriate one of the signals RD_DW[0:3] indicates that valid data has been latched into a corresponding one of the registers 1350A–D. There is a bit corresponding to each double word of read data to indicate if the double word is valid. For an EDMA write cycle, the cycle is a hit if the address is in the same page and the write buffers 209A–B are not full. The signal HIT_MISS_ is provided by an OR gate 1564 (FIG. 23B) In the transition from state GNT to state RDAT, the signal D_XFER_EN is set high and the signal D_IDE_WS is set low.

The state machine transitions from state GNT to state RDRQ if the signal IDE_LW_R_ is set low, the signal HIT_MISS_ is asserted high, but the signal S_DRQ is deasserted low. The transition to state RDRQ indicates a read hit, but the request line IDE_DRQ_P or IDE_DRQ_S from the primary or secondary IDE device has not been asserted. As a result, the state machine remains in state RDRQ to wait for the assertion of S_DRQ. In the transition from state GNT to state RDRQ, signals XFER_EN and D_IDE_WS are set low.

Finally, the state machine transitions from state GNT to state RMIS if a read is indicated by the signal IDE_LW_R but the signal HIT_MISS is set low indicating that either the current address is not in the same page as the previous address or the data is not valid. In the transition from state GNT to state RMIS, the signals D_XFER_EN and D_IDE_WS are set low, and a signal D_IDE_REQ or IDE PCI master request is set high to reread the data. The signal D_FIRST_RD is also set high. The signal D_FIRST_RD is provided to the OR gate 1366 (FIG. 20) to latch in read address bits I_ADDR[3:2].

There are four possible transitions out of state WDRQ. If a signal BUF_EMPTY is asserted indicating that the write buffers are empty and either a signal BM_PRE or a signal DRQ_MASKED is asserted, then the state machine transitions to state IDLE. The bus master preemption signal BM_PRE is provided by an AND gate 1504 (FIG. 23A), which receives the signal ISA_SD_REQ or ISA request and a signal REF_SD_REQ or refresh SD request. The signal DRQ_MASKED is provided by a multiplexor 1502, whose 0 and 1 inputs receive signals SEC_MASKED and PRI_MASKED, respectively. The select input of the multiplexor 1502 receives the signal PRI_SEC_. The signals PRI_MASKED and SEC_MASKED are control register bits for indicating that I/O requests to the primary and secondary IDE devices, respectively, are masked. The transition from state WDRQ to state IDLE indicates either that there is a bus master preemption or the IDE devices are masked, but the write data buffers 209A and 209B are empty. As a result, the EDMA state machine 250 gives up control of the SD bus by setting the signal D_IDE_SD_REQ low. In the transition from state WDRQ to state IDLE, the signal D_IDE_VB_CLR is set high to clear the read data valid bits.

If, however, the term (BUF_EMPTY & (BM_PRE||DRQ_MASKED)) is not true and a slave preemption is indicated by assertion of a signal SLV_PRE, the state machine transitions from state WDRQ to state NGNT. As indicated, the EDMA controller 204 is slave preempted if a PCI master drives a cycle onto the PCI bus P with the PCI-ISA bridge 130 as the target, but the EDMA controller 204 is currently busy on the SD bus. In this case, the signal IDE_SD_REQ is set low to take the EDMA controller 204 off the SD bus. The signal BLK_MASK is set high and provided to the SD arbiter 212 (FIG. 15) to prevent the IDE_SD_REQ signal from being masked in the next arbitration cycle.

The state machine transitions from state WDRQ to state WDAT if the term (BUF_EMPTY & (BM_PRE||DRQ_MASKED)) is not true, the signal SLV_PRE is deasserted low, and the signal S_DRQ is asserted high. As noted, state WDRQ is the state in which the EDMA state machine 250 is waiting for the assertion of the signal S_DRQ which indicates either the primary or secondary IDE device is ready to perform a data transfer. If the signal S_DRQ is detected asserted, the state machine transitions to state WDAT, setting the signal D_XFER_EN high.

If the write data buffers 209A and 209B are not empty as indicated by the signal BUF_EMPTY being deasserted low, and either the signal BM_PRE or the signal DRQ_MASKED is asserted high, then the state machine transitions to state WMIS. In the transition, the PCI bus master request or D_IDE_REQ signal is set high. A signal DRQ_PRE is also set high to indicate that the IDE request has been bus master preempted. The signal DRQ_PRE interrupts the write latch state machine 254, causing it to transition to a state where the write latch enable signals IDE_WR_LE [7:0] are set to the value 0×00. This tells the write latch state machine 254 that a buffer boundary is not going to be reached and so that the write latch state machine 254 should go to the LTCH state to keep all of the write latches closed until the first level write data has been transferred to the second level write posting buffer through the assertion of WRADR.

Once in state WDAT, there are three possible transitions out of the state. The state machine remains in state WDAT if a signal D_DATA_VLD is deasserted, which is provided by the IDE state machine 252 and indicates if a data transfer to or from the IDE device has just occurred. If such a transfer has occurred, then the IDE state machine 252 asserts the signal D_DATA_VLD in the last cycle of the active period to indicate that data will be valid on the next rising edge of PCICLK. In addition, if either a signal PSID_TC is asserted high or the signal HIT_MISS_ is deasserted low, then the state machine transitions from state WDAT to state WMIS. The signal PSID_TC is provided by a multiplexor 1506 (FIG. 23A), whose 0 and 1 inputs receive signals SEC_CNT_0 and PRI_CNT_0. The select input of the multiplexor 1506 receives the primary/secondary signal PRI_SEC_. The signals PRI_CNT_0 and SEC_CNT_0 indicate that a primary or secondary byte counter, respectively, for keeping track of the number of bytes to be transferred, has decremented down to the value 0×FFFF. Thus, if the signal PSID_TC or primary or secondary IDE terminal count is asserted, then the transfer is completed. In the transition, the PCI master request or D_IDE_REQ signal is asserted. Additionally, if the signal PSID_TC is asserted, then the signal D_DRQ_PRE is asserted to cause the write latch state machine 254 to flush the write buffers and to drive the write latch enable signals IDE_WR_LE [7:0] to the value 0×00.

Further, in the transition from state WDAT to state WMIS, if any of the signals PSID_TC, BM_PRE, or !S_DRQ are true, then the signal D_XFER_EN is set low to stop the IDE state machine 252. This also causes the acknowledge line IDE_DAK_P_ or IDE_DAK_S_ to be deasserted by the state machine 254. Thus, a bus master preemption in conjunction with the completion of a data transfer or with a miss of the write buffer will cause the IDE state machine 252 to go back to its idle state instead of placing it in a wait state, as is usually the case.

However, if none of the signals PSID_TC, BM_PRE, and !S_DRQ are true, that is, the signal !HIT_MISS_ is true and a write buffer miss has occurred, then the IDE state machine 252 is placed in a wait state until the write buffers 209A and 209B free up. This is done by setting the signal D_IDE_WS high.

If the signal D_DATA_VLD is asserted, but the term (PSID_TC||!HIT_MISS_) is not true and the slave preemption or SLV_PRE signal is true, then the state machine transitions from state WDAT to state NGNT. In the transition, the signal D_BLK_MASK is set high to block the masking of the IDE SD request, the signal D_XFER_EN is set low to stop the IDE state machine 252, and the signal D_IDE_SD_REQ is set low which causes the EDMA controller 204 to give up control of the SD bus.

Finally, if the signal D_DAT_VLD is asserted, the term (PSID_TC||!HIT_MISS_) is not true, a slave preemption has not occurred, and the signal !S_DRQ is deasserted indicating that the IDE request lines have been deasserted, then the EDMA state machine 250 transitions from state WDAT to state WDRQ to wait for reassertion of the signal S_DRQ. In the transition, the signal D_XFER_EN is set low to stop the IDE state machine 252.

As discussed above, the EDMA state machine 250 transitions to state WMIS as a result of a bus master preemption, if the IDE DRQ lines are masked, or a write buffer miss occurred. There are three possible transitions out of state WMIS. The EDMA state machine 250 remains in state WMIS if the signal WRADR or write address/data register clock is deasserted low.

While the state machine is in state WMIS, if the slave preemption SLV_PRE or the bus master preemption signal BM_PRE is asserted, then the signal D_IDE_SD_REQ remains low to keep the EDMA controller 204 off the SD bus, the signal D_XFER_EN remains low to keep the IDE state machine 252 in the IDLE state, and the signal D_IDE_WS is set low to prevent the IDE state machine 252 from entering its wait state.

The EDMA state machine 250 transitions from state WMIS to state IDLE if the signal WRADR is asserted and one of the following conditions is true: the signal PSID_TC is asserted to indicate completion of a data transfer cycle; the bus master preemption signal BM_PRE is asserted; or the IDE SD request line IDE_SD_REQ is deasserted and the slave preemption signal SLV_PRE is asserted indicating that slave preemption has occurred requiring the EDMA controller 204 to rearbitrate for the SD bus. In the transition to state IDLE, the signals D_IDE_REQ, D_XFER_EN, D_IDE_WS, and D_IDE_SD_REQ are set low. The signal D_IDE_VB_CLR is set high to clear the read data valid bits.

If the term (PSID_TC ||BM_PRE||(!IDE_SD_REQ & SLV_PRE)) is not true, but the signal S_DRQ is asserted, then that indicates that the data buffers have been emptied and the IDE devices are ready to transfer some more data. As a result, the EDMA state machine 250 transitions to state WDAT, setting the signals D_IDE_REQ and D_IDE_WS low.

If neither of the above two conditions is true, then that indicates that the write buffers have been emptied, but the request signal S_DRQ remains deasserted. In this case, the EDMA state machine 250 transitions from state WMIS to state WDRQ to wait for the assertion of the signal S_DRQ. In the transition, the signals D_IDE_REQ, D_XFER_EN, and D_IDE_WS are set low.

Proceeding now to the read portion of the EDMA state machine 250, the valid bit clear signal D_IDE_VB_CLR is set low in state RDRQ. State RDRQ is the state in which the state machine waits for the assertion of the signal S_DRQ. If the slave preemption signal SLV_PRE is asserted, then the EDMA state machine 250 transitions from state RDRQ to state NGNT. In the transition, the signal D_BLK_MASK is set high to block the masking of the IDE SD request signal IDE_SD_REQ, and the signals D_XFER_EN and D_IDE_WS are set low to stop the IDE state machine 252. In addition, the D_IDE_SD_REQ is set low to allow the SD arbiter 212 to give control of the SD bus to another master.

The EDMA state machine 250 transitions from state RDRQ to state IDLE if the slave preemption SLV_PRE is deasserted and one of the following two conditions is true: the signal BM_PRE is asserted and the signal S_DRQ is deasserted indicating a bus master preemption while the request line S_DRQ is deasserted; or, the signal DRQ_MASKED is asserted for masking the primary and secondary request lines IDE_DRQ_P and IDE_DRQ_S. In the transition back to state IDLE, the signals D_XFER_EN, D_IDE_SD_REQ, and D_IDE_WS are set low. The signal D_IDE_VB_CLR is set high.

If the conditions triggering the transitions from state RDRQ to either state NGNT or state IDLE are not true, and the signal S_DRQ is asserted, then the state machine transitions from state RDRQ to state RDAT. This indicates that the PCI master logic 206 is no longer busy, allowing more data to be transferred to the read buffer 211. In the transition to RDAT, the signal D_XFER_EN is set high to enable the IDE state machine 252, and the signal D_IDE_WS is set low to allow the IDE state machine 252 to come out of its wait state.

There are four possible transitions out of state RDAT. The EDMA state machine 250 remains in state RDAT until the signal D_DATA_VLD is asserted. The IDE state machine 252 asserts the signal D_DATA_VLD at the end of the active period if a data transfer has occurred. If the signal D_DATA_VLD is asserted, then the state machine transitions from state RDAT back to state IDLE if one of the following two conditions occur: the signal PSID_TC is asserted indicating completion of the data transfer; or the signal BM_PRE is asserted and the signal HIT_MISS_ is deasserted indicating a bus master preemption and read buffer miss. In the transition to state IDLE, the signal D_XFER_EN is set low, and the signal D_IDE_SD_REQ is set low to allow the EDMA controller 204 to get off the SD bus. In addition, the signal D_IDE_VB_CLR is set high to clear the read data valid bits.

If the signal D_DATA_VLD is asserted but the term (PSID_TC||(BM_PRE & !HIT_MISS_)) is not true, and the slave preemption signal SLV_PRE is asserted, then the EDMA state machine 250 transitions from state RDAT to state NGNT. In the transition to state NGNT, the signal D_BLK_MASK is set high, and the signals D_XFER_EN and D_IDE_SD_REQ are set low.

If the signal D_DATA_VLD is asserted, the term (PSID_TC||(BM_PRE & !HIT_MISS_)) is not true, the signal SLV_PRE is deasserted, and the signal HIT_MISS_ is deasserted low, then that indicates a read buffer miss which requires more read data to be obtained by the PCI master logic 206 from main memory 114. This causes the EDMA state machine 250 to transition from state RDAT to state RMIS. On the read buffer miss, the valid bit clear signal D_IDE_VB_CLR is set high to clear the valid bits. The PCI master request signal D_IDE_REQ is set high to request control of the PCI bus P. In the transition, if the signal S_DRQ is asserted, that indicates the IDE device is ready to accept more data, i.e., a multi-data transfer transaction is occurring. As a result, the IDE acknowledge signal IDE_DAK_P_ or IDE_DAK_S_ is maintained asserted by placing the IDE state machine 252 in its wait state. This is accomplished by setting the signal D_IDE_WS high.

If, however, a read buffer miss has occurred but the signal S_DRQ is deasserted, then a single data transfer is probably indicated. As a result, in the transition from state RDAT to state RMIS, the signal D_XFER_EN is set low to allow the IDE state machine 252 to transition back to its IDLE state and deassertion of the corresponding IDE_DAK_P_ or IDE_DAK_S_ signals.

If the signal D_DATA_VLD is asserted, but the terms (PSID_TC||(BM_PRE & !HIT_MISS_)), SLV_PRE, and !HIT_MISS_ are all not true, and if the signal S_DRQ is deasserted, then that indicates the IDE request line IDE_DRQ_P or IDE_DRQ_S has been deasserted. In response, the EDMA state machine 250 transitions from state RDAT to state RDRQ, setting the signal D_XFER_EN low to place the IDE state machine 252 back into the IDLE state.

The EDMA state machine 250 remains in state RMIS if the signal WRADR remains deasserted. In state RMIS, the signal D_IDE_VB_CLR is set low. If the signal WRADR is asserted, then the state machine transitions to state RBSY to wait for the PCI master logic 206 to receive the read data from the main memory 114. In the transition to state RBSY, the PCI master request signal D_IDE_REQ is set low.

In state RBSY, the PCI master logic 206 is either waiting to obtain the PCI bus P or is actually performing the PCI cycle to retrieve the read data from main memory 114. The PCI master logic 206 indicates this by asserting a signal IDE_BUSY. Thus, if the signal IDE_BUSY is asserted, the EDMA state machine 250 remains in state RBSY. If the signal IDE_BUSY is deasserted, and the signal IDE_SD_REQ is asserted indicating a request for the SD bus and the slave preemption signal SLV_PRE is deasserted, and further the signal S_DRQ is asserted, the EDMA state machine 250 transitions from state RBSY to state RDAT. In the transition, the signal D_IDE_WS is set low to take the IDE state machine 252 out of its wait state, and the signal D_XFER_EN is set high to enable the IDE state machine 252 to perform the data transfer.

However, if the term (IDE_SD_REQ & !SLV_PRE) is true but the signal S_DRQ is deasserted, then that indicates the bus master logic 206 has received the data, but the IDE device has not yet asserted its request line. As a result, the EDMA state machine 250 transitions from state RBSY to state RDRQ to await assertion the signal S_DRQ. In the transition, the signal D_XFER_EN is set low.

If the signal IDE_BUSY is deasserted, but the term (IDE_SD_REQ & !SLV_PRE) is not true, that indicates the request signal for the SD bus is not asserted or the slave preemption signal SLV_PRE is asserted. In response, the EDMA state machine 250 transitions from state RBSY to state NGNT. In the transition, the signal D_IDE_SD_REQ is set low, and the block mask signal D_BLK_MASK is set high. In the transition from state RBSY to state NGNT, the signals D_XFER_EN and D_IDE_WS are set low.

One PCICLK clock after we have entered into NGNT, the signal IDE_SD_GNT is deasserted since the signal IDE_SD_REQ was set low one clock earlier. When the signal IDE_SD_GNT is deasserted, the EDMA state machine 250 transitions from state NGNT to state GNT. In the transition, the signal D_IDE_SD_REQ is set high to rerequest the SD bus.

Figure 23A:
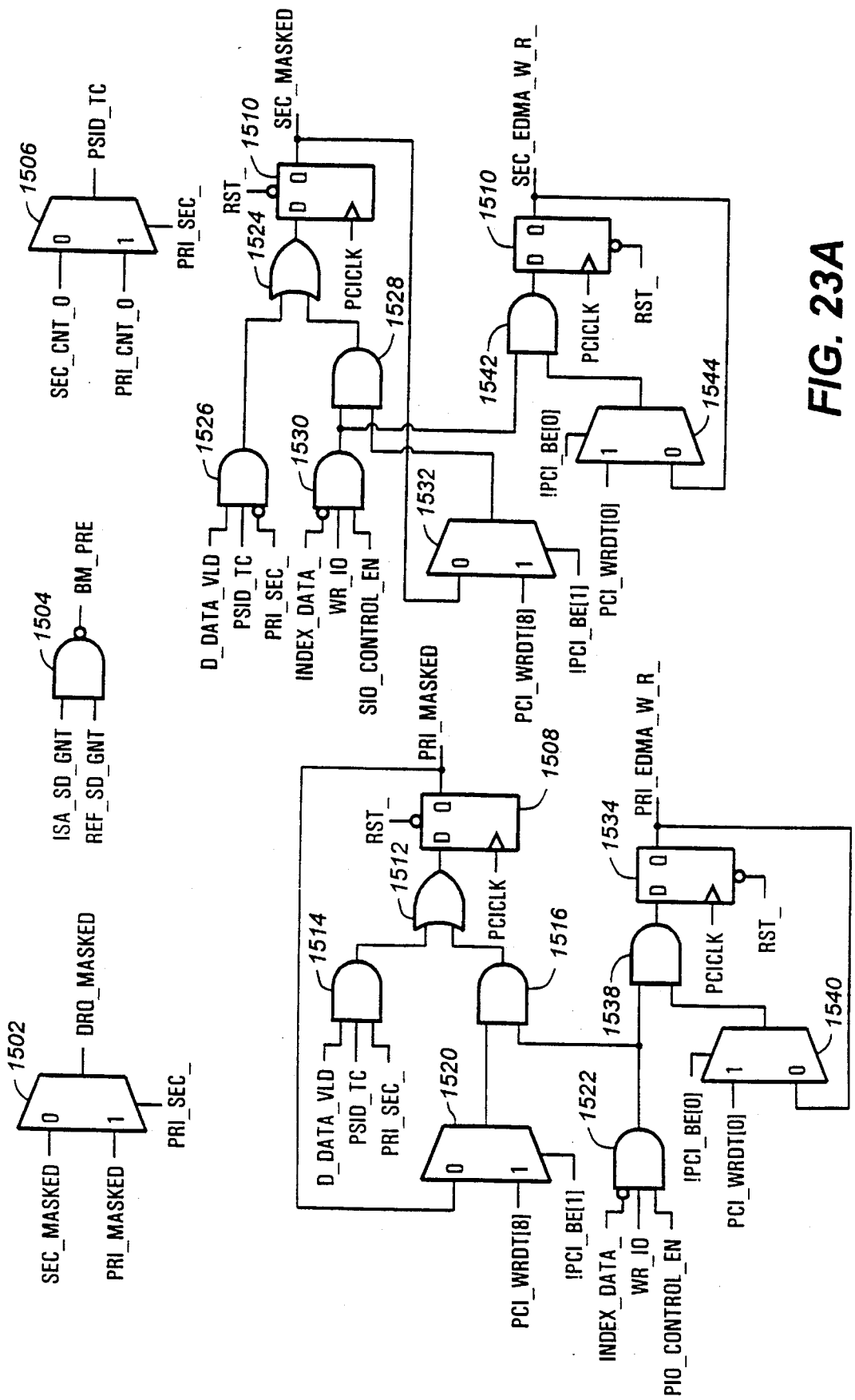
FIGS. 23A and 23B are a schematic diagram of logic for interfacing with the EDMA state machine of FIG. 22.
Figure 23B:
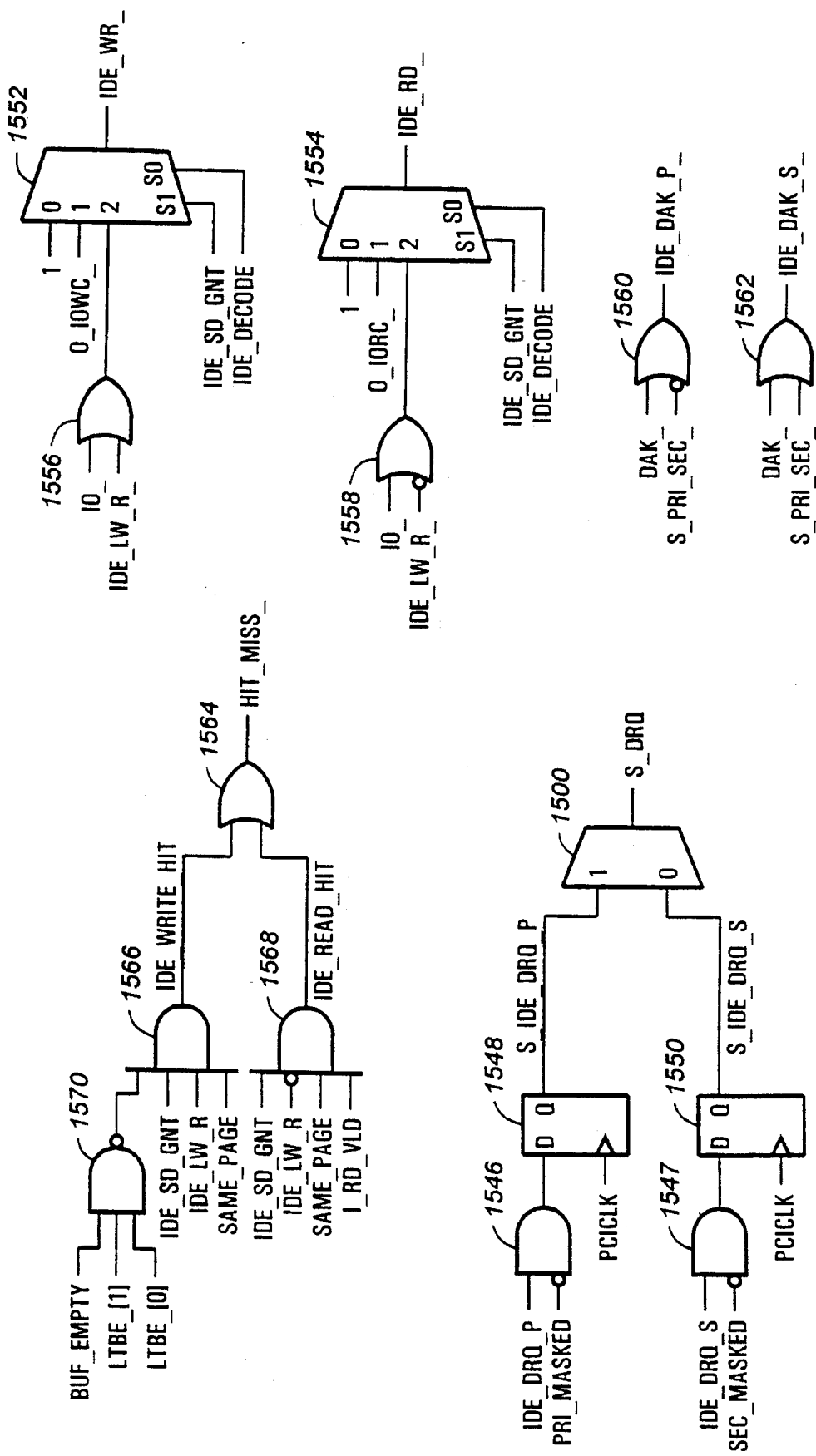

Referring now to FIGS. 23A and 23B, logic used to generate various relevant signals is shown. The mask bits PRI_MASKED and SEC_MASKED used to generate the signal DRQ_MASKED are provided by D-type flip-flops 1508 and 1510, respectively. The signal PRI_MASKED corresponds to a control register bit for the primary IDE devices, while the signal SEC_MASKED corresponds to a control register bit for the secondary IDE devices. Both flip-flops 1508 and 1510 are clocked by PCICLK and preset by the system reset signal RST_. Thus, by default, the mask bits PRI_MASKED and SEC_MASKED are set high to mask the primary and secondary channels of the EDMA controller 204. The D input of the flip-flop 1508 is connected to the output of an OR gate 1512, whose inputs are connected to the outputs of AND gates 1514 and 1516. The three inputs of the AND gate 1514 receive signals D_DATA_VLD, PSID_TC, and PRI_SEC_. Thus, upon completion of a data transfer cycle, the mask bit PRI_MASKED is set high.

The first input of the AND gate 1516 is connected to the output of a 2-to-1 multiplexor 1520 and the second input is connected to the output of a 3-input AND gate 1522. The 0 input of the multiplexor 1520 is connected to the signal PRI_MASKED, and the 1 input receives a latched version of PCI data bit 8 or PCI_WRDT[8]. The select input of the multiplexor 1520 receives an inverted byte enable signal !PCI_BE_[1]. The inputs of the AND gate 1522 receive the inverted state of a signal INDEX_DATA_ which when set high indicates a write to an index register in the PCI-ISA bridge 130; a signal WR_IO indicating an I/O write; and a signal PID_CONTROL_EN to enable writing to the primary control register. Thus, whether the primary IDE devices are masked depend on the state of bit PCI_WRDT [8] in an I/O write to the primary IDE control register.

The logic associated with the secondary mask bit SEC_MASKED is similar. The D input of the flip-flop 1510 is connected to the output of an OR gate 1524, whose inputs are connected to the outputs of AND gates 1526 and 1528. The three inputs of the AND gate 1526 receive signals D_DATA_VLD, PSID_TC, and the inverted state of the signal PRI_SEC_. The first input of the AND gate 1528 is connected to the output of an AND gate 1530, and the second input is connected to the output of a multiplexor 1532. The inputs of the AND gate 1530 receive the inverted state of the signal INDEX_DATA_, the signal WR_IO, and the signal SIP_CONTROL_EN which enables an I/O write to the secondary control register. The 0 input of the multiplexor 1532 is connected to the signal SEC MASKED, and the 1 input receives the latched PCI data bit PCI WRDT[8]. The select input of the multiplexor 1532 receives the inverted byte enable signal !PCI_BE_[1].

The primary and secondary IDE control registers each further contains a bit indicating whether a memory write or memory read transfer is occurring. To that end, signals PRI_EDMA_W_R_ and SEC_EDMA_W_R_ are provided by D-type flip-flops 1534 and 1536, respectively. Both flip-flops are clocked by PCICLK and cleared by RST_. An EDMA write to main memory 114 is indicated if either of signals PRI_EDMA_W_R_ or SEC_EDMA_W_R_ is asserted high. The D input of the flip-flop 1534 is connected to the output of a two-input AND gate 1538, whose first input is connected to the output of the AND gate 1522 and whose second input is connected to the output of a multiplexor 1540. The 0 input of the multiplexor 1540 is connected to the signal PRI_EDMA_W_R_, and the 1 input receives the PCI latched data bit PCI_WRDT[0]. The multiplexor 1540 is selected by the PCI byte enable signal !PCI_BE_[0]. Thus, an EDMA write or read is indicated by the state of bit PCI_WRDT[0] during an I/O write to either the primary or secondary control registers.

The D input of the flip-flop 1536 is provided by the output of an AND gate 1542, whose first input is connected to the output of a multiplexor 1544 and whose second input is connected to the output of the AND gate 1530. The 0 input of the multiplexor 1544 is connected to the signal SEC_EDMA_W_R_, and the 1 input receives the latched PCI data bit PCI_WRDT[0]. The multiplexor 1544 is selected by the byte enable signal !PCI_BE[0].

The mask bit PRI_MASKED is further provided to an inverted input of an AND gate 1546 (FIG. 23B), whose other input receives the primary IDE request signal or IDE_DRQ_P. The output of the AND gate 1546 is connected to the D input of a D-type flip-flop 1548, which is clocked by PCICLK. The output of the flip-flop 1548 provides the signal SIDE_DRQ_P. Similarly, the mask bit SEC_MASKED is provided to an inverted input of a NAND gate 1547, whose other input receives the secondary IDE request signal IDE_DRQ_S. The output of the AND gate 1547 is connected to the D input of a D-type flip-flop 1550, which is clocked by PCICLK and whose output provides the signal S_IDE_DRQ_S. Thus, the primary and secondary request lines S_IDE_DRQ_P and S_IDE_DRQ_S provided to the EDMA state machine 250 contain the masking information.

The write and read strobes IDE_WR_ and IDE_RD_ provided to the IDE devices are driven by 3-to-1 multiplexors 1552 and 1554, respectively. The 0 input of the multiplexor 1552 is tied high, the one input receives a signal IOWC_, and the 2 input is connected to the output of an OR gate 1556. The two inputs of the OR gate 1556 receive an I/O strobe signal IO_ and write/read signal IDE_LW_R_. The signal IO_ is provided by the IDE state machine 252 and is provided to enable assertion of the write and read strobes. The S1 and S0 inputs of the multiplexor 1552 receive signals IDE_SD_GNT and IDE_DECODE, respectively. As noted above, when the CPU/main memory system 101 requests a transfer to the IDE devices, it generates a read or write sector I/O command on the PCI bus P which is transmitted via the ISA bus I to an IDE device. The I/O command includes an I/O address corresponding to one of the command registers in the selected IDE channel, which then causes a signal IDE_DECODE in the EDMA controller 204 to be asserted. When that occurs, the state of an internally generated signal O_IOWC_ which mirrors the IOWC signal of the ISA bus I determines the state of the write strobe IDE_WR_. This initial assertion of the IDE_WR strobe writes the necessary command bytes into the selected IDE device. In the EDMA data transfer mode, the signal IDE_SD_GNT is asserted, and the state of the write/read signal IDE_LW_R determines if the command strobe IDE_WR_ is asserted.

Similarly, the 0 input of the multiplexor 1554 is tied high, the 1 input receives an internally generated read command signal O_IORC_, and the 2 input is connected to the output of an OR gate 1558. The inputs of the OR gate 1558 receive the signal IO_ and the inverted state of the signal IDE_LW_R. The S1 and S0 inputs of the multiplexor 1554 also receive signals IDE_SD_GNT and IDE_DECODE.

Once the selected IDE device is ready to perform the data transfer, it responds by asserting request lines IDE_DRQ_P or IDE_DRQ_S, which prompts the EDMA controller 204 to request the SD bus. When the IDE SD request is granted, the EDMA controller 204 provides acknowledge signals IDE_DAK_P_ or IDE_DAK_S_ back to the IDE devices. The acknowledge signals are provided by OR gates 1560 and 1562, respectively. The inputs of the OR gate 1560 receive a signal DAK_ and the inverted state of the synchronized primary/secondary signal S_PRI_SEC_. The inputs of the OR gate 1562 receive the signals DAK_ and S_PRI_SEC_. The signal DAK_ is provided by the IDE state machine 252 to indicate when data transfer is enabled as indicated by the signal XFER_EN.

The hit/miss signal HIT_MISS_ is provided by the OR gate 1564, whose inputs receive signals IDE_WRITE_HIT and IDE_READ_HIT provided by the outputs of AND gates 1566 and 1568, respectively. The first input of the AND gate 1566 is connected to the output of a NAND gate 1570, which receives the write buffer empty signal BUF_EMPTY and latched byte enable signals LTBE_[1] and LTBE_[0] to indicate an odd word address. The output of the NAND gate 1570 if high indicates that the write buffer is not empty. The remaining inputs of the AND gate 1566 receive signals IDE_SD_GNT, IDE_LW_R, and SAME_PAGE. Thus, a write hit occurs only when an odd word address is not indicated, the IDE grant signal is asserted, a write operation is in progress, and the EDMA write is to the same page. The inputs of the AND gate 1568 receive the signal IDE_SD_GNT, the inverted state of the signal IDE_LW_R_, the signal SAME_PAGE, and the signal I_RD_VLD. Thus, a read hit occurs if the SD grant signal is asserted, a read operation is in progress, the EDMA read address is to the same page as the previous address, and the read data bits are valid.

Figure 24:
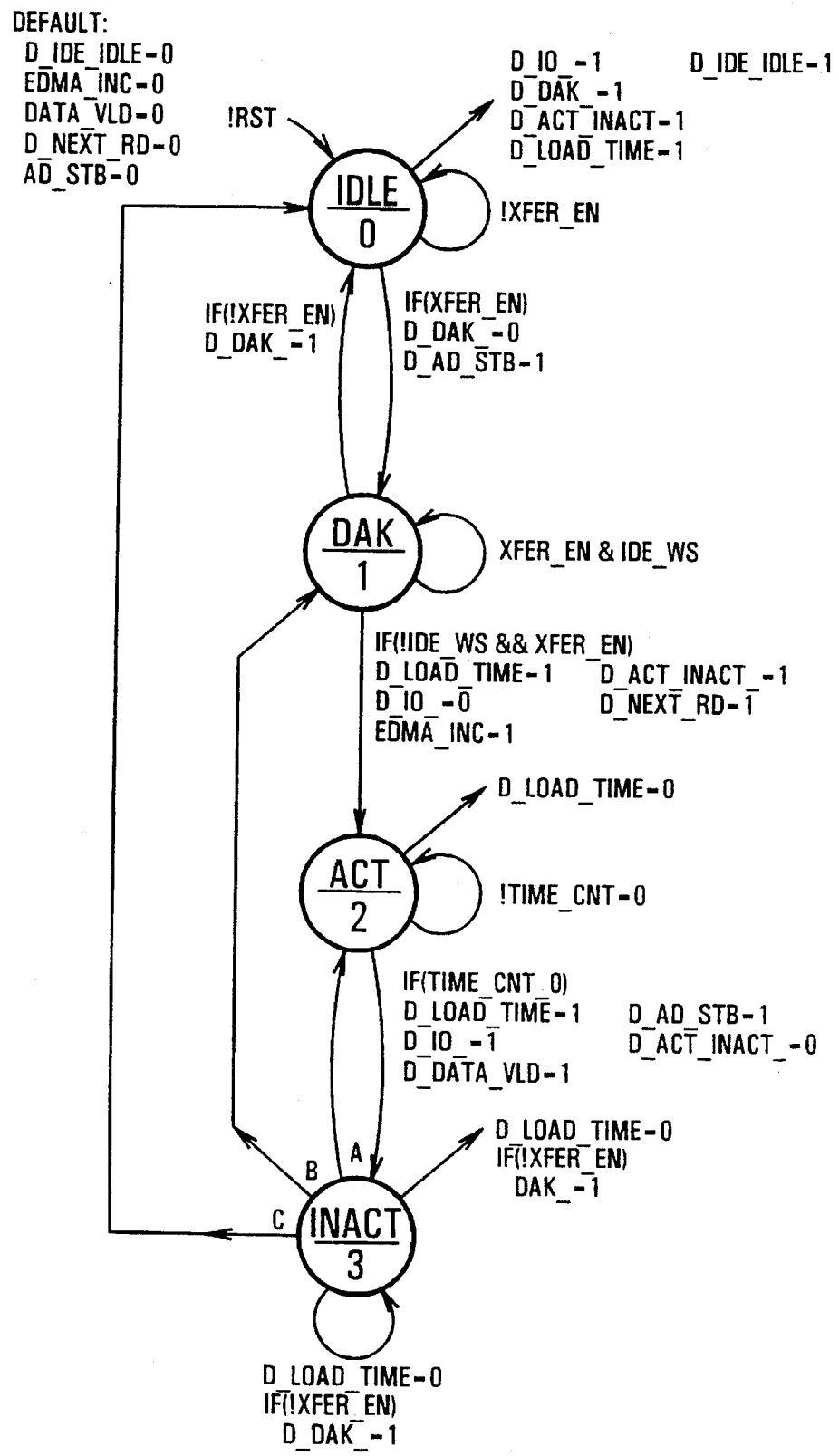
FIG. 24 is a state diagram of an IDE state machine for monitoring if the improved DMA controller of FIG. 2 is in an idle, acknowledge, active or inactive state.

Referring now to FIG. 24, the state diagram of the IDE state machine 252 is shown. The IDE state machine 252 provides the following output signals: IDE I/O strobe or D_IO_ signal; an acknowledge signal or D_DAK_ signal; a signal D_ACT_INACT_ indicating the active or inactive period of an EDMA data transfer cycle; an address strobe D_AD_STB signal; a signal D_LOAD_TIME for loading the active or inactive time into the countdown timer 1631 (FIG. 21); a signal D_DATA_VLD asserted during the last cycle of the active period to indicate that data will be valid on the next rising PCICLK edge; a signal D_NEXT_RD indicating decode for the next read cycle; a signal EDMA_INC for incrementing and decrementing the address and byte count registers keeping track of data transfer from the read and write buffers; and a signal D_IDE_IDLE indicating that the IDE state machine 252 is in the IDLE state. All the signals having "D_" prefixes provide the D inputs of a series of D flip-flops clocked by PCICLK and cleared by RST_ which provide corresponding output signals having the exact same nomenclature except without the "D_" prefix.

The following signals maintain their state unless otherwise noted: D_IO_, D_DAK_, D_ACT_INACT_, and D_LOAD_TIME. The following signals are set low unless otherwise noted: D_DATA_VLD, D_AD_STB, D_NEXT_RD, EDMA_INC, and D_IDE_IDLE.

On system reset, indicated by the signal !RST_, the IDE state machine 252 enters state IDLE. In state IDLE, the signals D_IO_, D_ACT_INACT_, D_LOAD_TIME, and D_IDE_IDLE are all set high. The state machine remains in state IDLE until the transfer enable or XFER_EN signal is asserted by the EDMA state machine 250. If the signal XFER_EN is detected asserted, the state machine transitions from state IDLE to state DAK. In the transition, the acknowledge or D_DAK signal is set low and the address strobe or D_AD_STB signal is set high. As noted, assertion of the signal DAK causes either the IDE_DAK_P or IDE_DAK_S signal to be asserted, depending on the state of the primary/secondary signal PRI_SEC_. Assertion of the signal D_AD_STB strobes in the EDMA address to determine if a hit or miss has occurred in the read or write data buffers.

In state DAK, if the signal XFER_EN is deasserted by the EDMA state machine 250, then the IDE state machine 252 returns to state IDLE. In the transition from state DAK to state IDLE, the signal D_DAK_ is set high. If the signal XFER_EN is asserted but the signal IDE_WS is also asserted, then the state machine remains in state DAK. The IDE state machine 252 waits until the wait state signal IDE_WS is deasserted by the EDMA state machine 250.

If the signal IDE_WS is deasserted and the signal XFER_EN is asserted, then the IDE state machine 252 transitions from state DAK to state ACT. In the transition, the signal D_LOAD_TIME is set high. As discussed with respect to FIG. 21, asserting the signal LOAD_TIME causes the active/inactive timer 1631 (FIG. 21) to be loaded with the appropriate value from either the primary or secondary active timing register 1600 or 1602. Further, the signal D_IO_ is set low to enable the IDE I/O write and read commands IDE_WR_ and IDE_RD_; the signal D_ACT_INACT_ is set high to indicate the active period; the signal D_NEXT_RD is set high to latch in the next read address to select (RD_SEL[1:0]) the appropriate double word of the read data buffer 211; and the signal EDMA_INC is set high to increment or decrement the address and byte counters.

The IDE state machine 252 remains in state ACT while the signal TIME_CNT_0 is deasserted. In state ACT, the signal D_LOAD_TIME is set low. When the active/inactive timer 1631 counts down to zero and asserts the signal TIME_CNT_0 to indicate the end of the active period, the state machine transitions from state ACT to INACT. In the transition, the signal D_LOAD_TIME is set high to load in the inactive time period into the timer 1631 from either the primary or secondary inactive timing register 1604 or 1606; the signal D_AD_STB is set high to strobe in the EDMA address; the signal D_IO_ is set high to disable the IDE I/O command strobe IDE_WR_ or IDE_RD_; the signal D_ACT_INACT is set low to indicate the inactive period; and a signal D_DATA_VLD is set high to indicate that data has been transferred.

In state INACT, the signal D_LOAD_TIME is set low, and if the signal XFER_EN is deasserted, the signal D_DAK_ is set high to deactive the IDE acknowledge signals IDE_DAK_P_ or IDE_DAK_S_. There are three possible transitions out of state INACT. If the signal TIME_CNT_0 is asserted indicating that the inactive period has elapsed, the signal XFER_EN is asserted, the signal !DAK_ is true indicating that the signal XFER_EN has not been deasserted by the EDMA state machine 250, and the signal IDE_WS is asserted indicating a wait state, the IDE state machine 252 transitions from state INACT to state DAK. If the signal TIME_CNT_0 and XFER_EN are asserted, but the signal DAK_ is deasserted, then that indicates that XFER_EN signal must have been deasserted by the EDMA state machine 250 and reasserted again. In this case, the state machine also transitions from state INACT to state DAK, setting the signal D_DAK_ low to re-enable the acknowledge signals provided to the IDE devices.

If, however, the signals TIME_CNT_0, XFER_EN, and DAK_ are asserted, but the signal IDE_WS is deasserted, then that indicates that the next data transfer cycle can continue. As a result, the state machine transitions from state INACT to state ACT. In the transition from state INACT to state ACT, the signal D_LOAD_TIME is set high to load the active/inactive timer 1631 with the active time period; the signal D_IO_ is set low to enable the IDE I/O command strobe IDE_WR_ or IDE_RD_; the signal D_ACT_INACT_ is set high to indicate the active period; the signal EDMA_INC is set high to enable the increment and decrement of the address and byte counters; and the signal D_NEXT_RD is set high to latch in the next read address for selecting the appropriate double word.

Finally, if the signal TIME_CNT_0 is asserted but the signal XFER_EN is deasserted, the IDE state machine 252 returns from state INACT to state IDLE.

Figure 25:
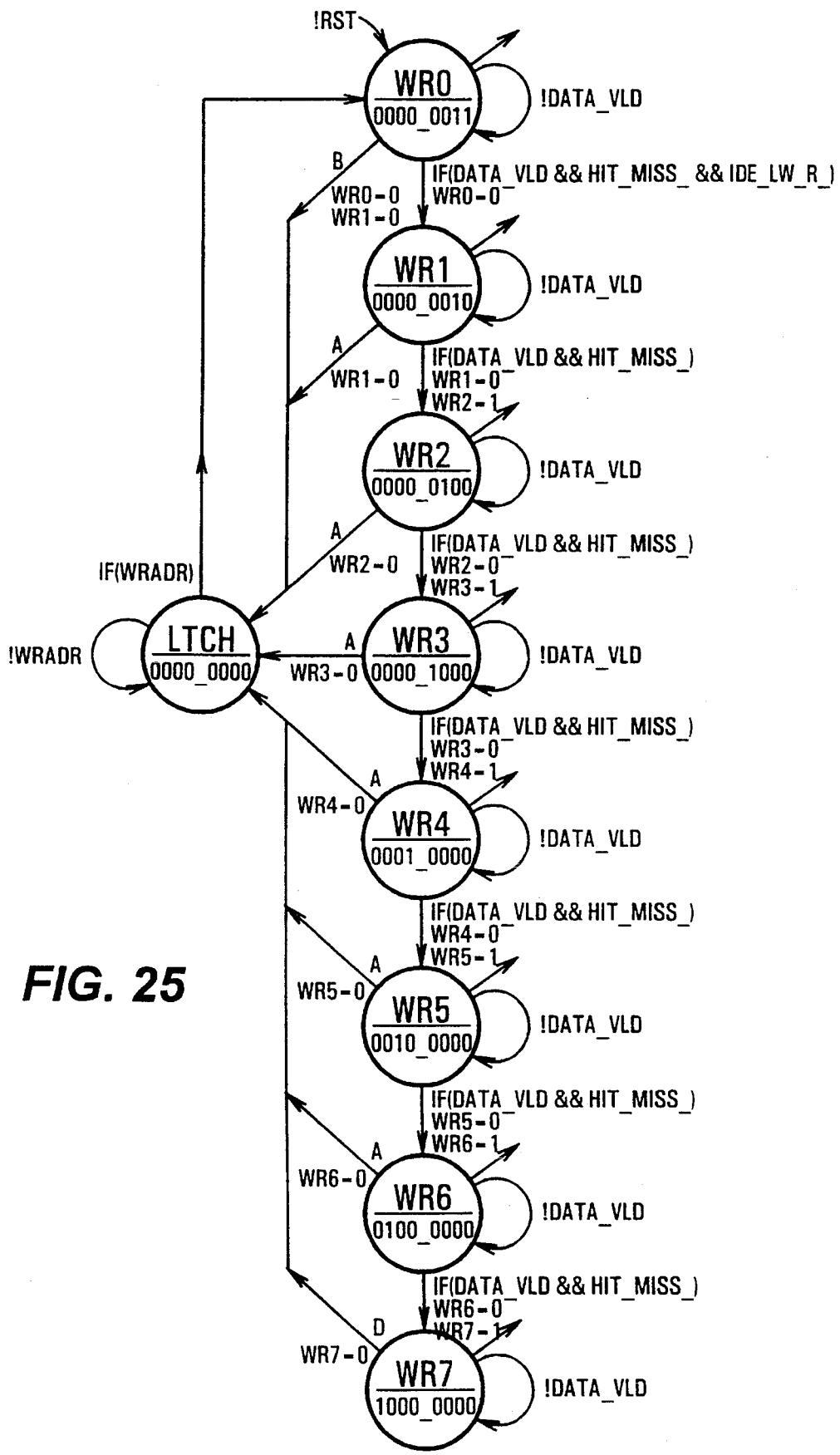
FIG. 25 is a state diagram of a state machine that controls the write latching enable signals of the write data buffers of FIG. 19.

Referring now to FIG. 25, a state diagram of the write latch enable state machine 254 is shown. As noted above, the state machine 254 provides the write latch enable signals IDE_WR_LE[7:0] for latching data into the first stage of the write buffers comprising latches 1302A-H in FIG. 19. In state WR0, the signals IDE_WR_LE[7:0] are set equal to the value 0x03. This enables latches 1302A-B. The state machine 254 also provides signals IDE_WR_BE[7:0] which are multiplexed onto the byte enable bits C/BE_[3:0] on the PCI bus P. In state WR0, the byte enable signals IDE_WR_BE[7:0] are assigned the value 0x00.

If the signal DATA_VLD is asserted indicating a valid data transfer, the signal IDE_LW_R_ is set high indicating a write, and the signal HIT_MISS_ is high indicating a hit to the data write buffers, then the state machine 254 transitions to state WR1. In the transition, the write latch enable signals IDE_WR_LE[7:0] are assigned the value 0x02 and the byte enable signal IDE_WR_BE[0] is set high, indicating a valid word of data has been latched. If a miss occurs, indicated by the signal HIT_MISS_ being set low and the signals DATA_VLD and IDE_LW_R_ being high, then the state machine transitions from state WR0 to state LTCH, where the write latch enable signals IDE_WR_LE[7:0] are assigned a value 0x00 and the byte enable bit IDE_WR_BE[1] is set high, indicating this was odd word aligned as this is the only time a miss will occur on the first transfer.

The state machine remains in state LTCH until the PCI master logic 206 asserts the address/data register clock WRADR. As explained above in relation to the EDMA state machine 250, a miss indicated by the signal HIT_MISS_ causes the EDMA state machine 250 to assert the PCI master request signal IDE_REQ, which in turn causes the PCI master logic 206 to post the data in the second level write buffers and run the cycle on the PCI bus P. The PCI master logic 206 asserts the signal WRADR when it transitions out of its IDLE state to latch in the PCI address on the next PCI cycle. When that occurs, the state machine 254 transitions from state LTCH to state WR0 with the signals IDE_WR_LE[7:0] being assigned the value 0x03 and the byte enable signals IDE_WR_BE[7:0] being assigned the value 0x00.

Next, in state WR1, the state machine transitions to state WR2 if the signal DATA_VLD is asserted and the signal HIT_MISS_ is asserted high. In this transition, the write latch enable signals IDE_WR_LE are set equal to the value 0x04 while the byte enable signal IDE_WR_BE[1] is set high. The state machine transitions from state WR1 to state LTCH if the signal DATA_VLD is high and the signal HIT_MISS_ is low indicating a miss. In the transition, the signal IDE_WR_BE[1] is asserted. The state machine also transitions to state LTCH if the signal DRQ_PRE is asserted high indicating a bus master preemption. Otherwise, if the signal DATA_VLD is deasserted, the state machine remains in state WR1.

The same conditions causing transitions out of state WR1 apply to state WR2. The state machine remains in state WR2 if the signal DATA_VLD is deasserted low. The state machine transitions from state WR2 to state WR3 if a data transfer is indicated by the signal DATA_VLD and the signal HIT_MISS_ is asserted high. In the transition to state WR3, the write latch enable signals IDE_WR_LE[7:0] are assigned the value 0x08, while the byte enable signal IDE_WR_BE[3] is set high. If the signal DATA_VLD is asserted and a miss is indicated by the signal HIT_MISS_, the state machine transitions to state LTCH, setting the signal IDE_WR_BE[3] high. Additionally, if a bus master preemption occurs and S_DRQ is not asserted, which is indicated by the signal DRQ_PRE, the state machine also transitions to state LTCH.

The conditions for transitioning out of state WR3, WR4, WR5 and WR6 are the same as those for WR1 or WR2, except that the write latch enable signals IDE_WR_LE are assigned the value 0×10 in the transition from state WR3 to state WR4, the value 0×20 in the transition from state WR4 to state WR5, the value 0×40 in the transition from state WR5 to state WR6, and the value 0×80 in the transition from state WR6 to state WR7. Further, the signal IDE_WR_BE [3] is set high in the transition out of state WR3 with the signal DATA_VLD asserted, the signal IDE_WR_BE[4] is set high in a transition out of state WR4 with the signal DATA_VLD asserted, the signal IDE_WR_BE[5] is set high in a transition out of state WR5 with the signal DATA_VLD asserted, and the signal IDE_WR_BE[6] is set high in a transition out of state WR6 with the signal DATA_VLD set high.

The state machine remains in state WR7 until the final data transfer has occurred as indicated by the signal DATA_VLD. On the assertion of the signal DATA_VLD, the state machine transitions from state WR7 to state LTCH, setting the signal IDE_WR_BE[7] high. The state machine also transitions from state WR7 to state LTCH if a bus preemption occurs and S_DRQ is not asserted, which is indicated by the signal DRQ_PRE.

Thus, an improved DMA controller has been described having programmable data transfer timings. Not only is the total cycle time programmable, but the active and inactive period of the cycle are also programmable. An active timing register and an inactive timing register are used in conjunction with a countdown timer to determine the active and inactive periods of the data transfer cycle. The active time period is loaded into the timer during the active phase, with the end of the active phase being indicated by the timer timing out. Next, the inactive time period is loaded into the timer, which similarly times out to indicate the end of the inactive phase of the data transfer cycle.

While the preferred embodiment uses identical timings for the master and slave devices on the primary and secondary IDE buses, individual timings for master and slave devices could be provided if desired by providing additional timing registers and multiplexers to the timing circuitry of FIG. 21.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

We claim:

1. A controller for controlling data transfers between a memory device and an I/O device in a computer system, the memory device and I/O device coupled to a bus on which write cycles and read cycles are run, wherein each data transfer is performed in one data transfer cycle defined by an active period and an inactive period, the controller comprising:

a first storage device for storing a value representing the active period, said active period value capable of being any one of a number of different values;

a second storage device for storing a value representing the inactive period, said inactive period value capable of being any one of a number of different values;

a data transfer circuit coupled to the bus and transferring data from the I/O device to the memory device in a data transfer cycle if a write cycle and from the memory device to the I/O device in a data transfer cycle if a read cycle, said transfer of data occurring during the active period of the data transfer cycle; and a timer coupled to said first and second storage devices and to said data transfer circuit for indicating when the end of the active period occurs and when the end of the inactive period occurs based on said active period and inactive period values stored in said first and second storage devices.

2. The controller of claim 1, further comprising:

a signal provider coupled to said timer and to said data transfer circuit and providing an active/inactive signal, said active/inactive signal being at a first state if the active period is in progress, and said active/inactive signal being at a second state if the inactive period is in progress; and a multiplexor having a select input receiving said active/inactive signal, a first input connected to said first storage device, a second input connected to said second storage device, and an output connected to said timer, wherein said active period value is loaded into said timer if said active/inactive signal is at said first state, and wherein said inactive period value is loaded into said timer if said active/inactive signal is at said second state.

3. The controller of claim 1, wherein said first storage device is a first register having a plurality of bits, and wherein said second storage device is a second register having a plurality of bits.

4. The controller of claim 1, wherein said first and second storage devices are loaded with said active period and inactive period values during a configuration write cycle on the bus.

5. The controller of claim 4, wherein the bus is according to the peripheral connect interface (PCI) standard, and wherein said configuration write cycle is a PCI configuration write cycle.

6. The controller of claim 1, wherein the I/O device is an integrated drive electronics (IDE) device.

7. The controller of claim 1, wherein the computer system includes a plurality of I/O devices, and wherein said data transfer circuit is capable of transferring data between any of said plurality of said I/O devices and the memory device, the controller further comprising:

an indicator coupled to said data transfer circuit and indicating which of said plurality of I/O devices is selected.

8. The controller of claim 7, wherein each of said plurality of I/O devices provides a request signal, a request signal being asserted indicating that the corresponding I/O device is requesting a transfer of data between the I/O device and the memory device, and wherein said indicator receives said plurality of request signals to determine which of said plurality of I/O devices is selected.

9. The controller of claim 7, further comprising:

a plurality of first storage devices corresponding to said plurality of I/O devices each for storing a value representing the active period for a corresponding I/O device, wherein said active period value stored in each of said plurality of first storage devices is capable of being any one of a different number of values; and a plurality of second storage devices corresponding to said plurality of I/O devices each for storing a value indicating the inactive period for a corresponding I/O device, wherein said inactive period value stored in each of said plurality of second storage devices is capable of being any one of a different number of values; and a multiplexor having inputs coupled to said plurality of first and second storage devices and an output coupled to said timer, wherein said multiplexor loads a value from one of said plurality of first and second storage devices depending on the I/O device selected and if the data transfer cycle is in the active or inactive period.

10. The controller of claim 9, wherein each of said plurality of I/O devices is an integrated drive electronics (IDE) device.

11. A method of controlling data transfers between a memory device and an I/O device in a computer system, the memory device and I/O device coupled to a bus on which write cycles and read cycles are run, wherein each data transfer is performed in one data transfer cycle defined by an active period and an inactive period, the method comprising the steps of:

storing a value representing the active period, said active period value capable of being any one of a number of different values;

storing a value representing the inactive period, said inactive period value capable of being any one of a number of different values;

starting a transfer cycle beginning with the active period;

loading said active period value into a timer when said transfer cycle is started, said timer starting to count upon loading of said active period value, wherein said timer asserts a timeout signal when said active period indicated by said active period value has elapsed;

transferring data from the I/O device to the memory device if a write cycle and from the memory device to the I/O device if a read cycle during the active period of the data transfer cycle; and loading said inactive period value into said timer after the active period has elapsed, said timer beginning to count after loading said inactive period value, wherein said timer asserts said timeout signal to indicate when said inactive period indicated by said inactive period value has elapsed, the end of said inactive period indicating the end of the data transfer cycle.

12. The method of claim 11, wherein said active period and inactive period values are stored during a configuration write cycle on the bus.

13. The method of claim 12, wherein the bus is according to the peripheral connect interface (PCI) standard, and wherein said configuration write cycle is a PCI configuration write cycle.

14. The method of claim 11, wherein the I/O device is an integrated drive electronics (IDE) device.

15. The method of claim 11, wherein the computer system includes a plurality of I/O devices, and wherein said step of transferring data transfers data between one of said plurality of I/O devices and the memory device, the method further comprising the step of:

indicating which of said plurality of I/O devices is selected in the data transfer cycle.

16. The method of claim 15, further comprising the steps of:

storing a plurality of values representing the active periods for said plurality of I/O devices, wherein each stored active period value is capable of being any one of a different number of values; and storing a plurality of values representing the inactive period for said plurality of I/O devices, wherein each stored inactive period value is capable of being any one of a different number of values, wherein said step of loading said timer with said active period value loads in the active period value of the selected I/O device, and wherein said step of loading said timer with said inactive period value loads in the inactive period value of the selected I/O device.

17. The method of claim 16, wherein each of said plurality of I/O devices is integrated drive electronics (IDE) device.

* * * * *

UNITED STATES PATENT AND TRADEMARK OFFICE
CERTIFICATE OF CORRECTION

PATENT NO. : 5,603,050
DATED : FEBRUARY 11, 1997
INVENTOR(S) : JEFF W. WOLFORD, ROBERT A. LESTER

It is certified that error appears in the above-identified patent and that said Letters Patent is hereby corrected as shown below:

Claim 7, line 41, delete "transfer circuit" and insert --transferring means--.

Claim 17, line 34, insert --an-- before "integrated".

Signed and Sealed this

Fifth Day of August, 1997

*Attest:*

BRUCE LEHMAN

*Attesting Officer*     *Commissioner of Patents and Trademarks*